(12) United States Patent
Isshiki et al.

(10) Patent No.: US 8,448,140 B2
(45) Date of Patent: May 21, 2013

(54) EXECUTION TIME ESTIMATION METHOD AND DEVICE

(75) Inventors: Tsuyoshi Isshiki, Meguro-ku (JP);
Hiroaki Kunieda, Meguro-ku (JP);
Naoto Kobayashi, Meguro-ku (JP)

(73) Assignee: Tokyo Institute of Technology, Tokyo (JP)

( * ) Notice: Subject to any disclaimer, the term of this patent is extended or adjusted under 35 U.S.C. 154(b) by 357 days.

(21) Appl. No.: 13/002,283

(22) PCT Filed: Jun. 23, 2009

(86) PCT No.: PCT/JP2009/061419
§ 371 (c)(1),
(2), (4) Date: Dec. 30, 2010

(87) PCT Pub. No.: WO2010/001766
PCT Pub. Date: Jan. 7, 2010

(65) Prior Publication Data
US 2011/0113224 A1    May 12, 2011

(30) Foreign Application Priority Data
Jul. 2, 2008    (JP) .................................. 2008-173885

(51) Int. Cl.
*G06F 9/44* (2006.01)
(52) U.S. Cl.
USPC ............ 717/124; 717/127; 717/128; 717/130; 717/131; 717/132; 717/133; 717/151; 717/154; 717/158
(58) Field of Classification Search
None
See application file for complete search history.

(56) References Cited

U.S. PATENT DOCUMENTS 6,173,395 B1 * 1/2001 Wisor et al. .................. 712/236
6,332,212 B1 * 12/2001 Organ et al. .................. 717/128
(Continued)

FOREIGN PATENT DOCUMENTS

JP    4-241637    8/1992
JP    2000-222245    8/2000
(Continued)

OTHER PUBLICATIONS

V. Sarkar. 1989. Determining average program execution times and their variance. In Proceedings of the ACM SIGPLAN 1989 Conference on Programming language design and implementation (PLDI '89), R. L. Wexelblat (Ed.). ACM, New York, NY, USA, 298-312.*

(Continued)

*Primary Examiner* — Isaac Tecklu
*Assistant Examiner* — Adam Conkey
(74) *Attorney, Agent, or Firm* — Merchant & Gould P.C.

(57) ABSTRACT

An execution time estimation device includes a program partitioning section that extracts partial programs partitioned by a conditional branch instruction or a function call instruction from a target program, a partial program execution time estimation calculating section that calculates the execution time of each of the partial programs to associate the leading instruction and the end instruction of each of the partial programs, and the calculated execution time with one another, a branch history information generating section that generates a branch history bit sequence which is a sequence of the true-false of the conditional branch instruction of when the target program is executed, an execution trace reproducing section that generates the execution sequences of the partial programs based on the branch history bit sequence, and an execution time estimation calculating section that adds the execution time of the partial programs based on the execution sequences of the partial programs.

10 Claims, 52 Drawing Sheets

U.S. PATENT DOCUMENTS

| | | | |
|---|---|---|---|
| 6,973,417 B1* | 12/2005 | Maxwell et al. | 703/2 |
| 2002/0095666 A1* | 7/2002 | Tabata et al. | 717/149 |
| 2004/0015978 A1* | 1/2004 | Orii | 718/105 |
| 2005/0188364 A1* | 8/2005 | Cockx et al. | 717/159 |
| 2006/0064692 A1* | 3/2006 | Sanchez et al. | 718/100 |
| 2009/0055630 A1 | 2/2009 | Isshiki et al. | |
| 2009/0113404 A1* | 4/2009 | Takayama et al. | 717/149 |
| 2009/0276766 A1* | 11/2009 | Song et al. | 717/159 |
| 2009/0327673 A1 | 12/2009 | Yoshimatsu et al. | |

FOREIGN PATENT DOCUMENTS

| | | |
|---|---|---|
| JP | 2002-182906 | 6/2002 |
| JP | 2002-229818 | 8/2002 |
| JP | 2007-193423 | 8/2007 |
| JP | 2007-193430 | 8/2007 |
| KR | 10-2008-0034020 | 4/2008 |

OTHER PUBLICATIONS

Eric Sprangle, Robert S. Chappell, Mitch Alsup, and Yale N. Patt. 1997. The agree predictor: a mechanism for reducing negative branch history interference. SIGARCH Comput. Archit. News 25, 2 (May 1997), 284-291.*

Eigenmann et al. "On the Automatic Parallelization of the Perfect Benchmarks" *IEEE Trans. on Parallel and Distributed Systems.* vol. 9. No. 1. 1998. pp. 5-21.

Gehani et al. "Concurrent C." *Software, Practice and Experience.* vol. 16. No. 9. 1986. pp. 821-844.

Hall et al. "Maximizing Multiprocessor Performance with the SUIF Compiler." *IEEE.* vol. 29. No. 12. 1996. pp. 84-89.

Iwashita. "A View of VPP Fortran in Contrast with HPF." *Information Processing.* vol. 38. No. 2. 1997. pp. 114-121. Abstract Provided.

Kraemer et al. "HySim: A Fast Simulation Framework for Embedded Software Development." *CODES+ISSS 07: Conference on Hardware/Software Codesign and System Synthesis.* New York, NY 2007.

Kempf et al. "A SW performance estimation framework for early System-Level-Design using fine-grained instrumentation." *In Date 06: Conference on Design, Automation and Test in Europe, Belgium. European Design and Automation Association.* 2006. pp. 468-473.

Mong et al. "DynamoSim: A Trace-based Dynamically Compiled Instruction Set Simulator." *IEEE.* 2004. pp. 131-136.

Nohl et al. "A Universal Technique for Fast and Flexible Instruction-Set Architecture Simulation." *DAC 02: Conference on Design and Automation.* New York, NY. 2002. pp. 22-27.

Okamoto et al. "Hierarchical Macro Dataflow Processing in OSCAR Multigrain Compiler." *J. of Info. Processing Society of Japan.* vol. 35, No. 4. 1994. pp. 513-521. Abstract Provided.

Qin et al. "A Multiprocessing Approach to Accelerate Retargetable and Portable Dynamic-complied Instruction-set Simulation." *CODES+ISSS: Conf. on Hardware/Software Codesign.* New York, NY. 2006. pp. 193-198.

Reshadi et al. "Instruction Set Compiled Simulation: A Technique for Fast and Flexible Instructions Set Simulation." *DACC 03: Conference on Design Automation.* New York, NY. 2003. pp. 758-763.

Sherwood et al. "Automatically Characterizing Large Scale Program Behavior." *ASPLOS-X: Proceedings of the $10^{th}$ International Conf. on Architectural Support for Programming Languages and Operating Systems.* New York, NY. 2002. pp. 1-13.

Sherwood et al. "Discovering and Exploiting Program Phases." *IEEE.* 2003. pp. 84-93.

Wunderlich et al. "SMARTS: Accelerating Microarchitecture Simulation via Rigorous Statistical Sampling." *IEEE.* 2003. pp. 1-12.

HPF Promoting Consortium (HPFPC). http://www.hpfpc.org./index-E.html. Aug. 31, 2007.

Message Passing Interface Forum—MP12—http//www.mpi-forum.org/index.html. Aug. 31, 2007.

PVM: Parallel Virtual Machine. http//www.csm.ornl.gov/pvm/pvm_home.html. Aug. 31, 2007.

Yi et al. "Simulation of Computer Architectures: Simulators, Benchmarks, Methodologies, and Recommendations." *IEEE.* vol. 55. No. 3. 2006. pp. 268-280.

Korean Office Action for KR 10-2011-7002112 mailed Jul. 17, 2012.

Matsumoto, Y. et al. "Program Abstraction for Performance Evaluation of Large-Scale Parallel Systems", Information Processing Society of Japan, IPSI SIG Technical Report, vol. 2007, No. 80, Aug. 1, 2007, pp. 55-60.

Iwabuchi, T. et al. "MPIETE2: Improvement of the MPI Execution Time Estimator in Prediction Error of Communication Time", Information Processing Society of Japan, IPSI SIG Technical Report, vol. 2005, No. 19, Mar. 9, 2005, pp. 175-180.

Duesterwald, E. et al. "Software Profiling for Hot Path Prediction: Less is More", ACM SIGARCH Computer Architecture News, vol. 28, Issue 5, 2000, pp. 202-210.

* cited by examiner

FIG.4

```
main(){
  /*code area 1*/
  for(i=0;(A=i<N);i++){ // loop 1
    if(B){/*code area 2*/}
    else if(C){func1();}
    /*code area 3*/
  }
  ...
}
func1(){
  /*code area 4*/
  for(i=0;(D=i<M);i++){ // loop 2
    /*code area 5*/
  }
  if(E){/*code area 6*/}
  else{/*code area 6*/}
  /*code area 8*/
}
```

FIG.5

| ID | Partial program leading instruction | Partial program end instruction | Partial program execution time estimate value |
|---|---|---|---|
| 1 | main:start | branch(A) | T1 |
| 2 | branch(A)[T] | branch(B) | T2 |
| 3 | branch(A)[F] | main:end | T3 |
| 4 | branch(B)[T] | branch(A) | T4 |
| 5 | branch(B)[F] | branch(C) | T5 |
| 6 | branch(C)[T] | func1:start\|branch(A) | T6a,T6b |
| 7 | branch(C)[F] | branch(A) | T7 |
| 8 | func1:start | branch(D) | T8 |
| 9 | branch(D)[T] | branch(D) | T9 |
| 10 | branch(D)[F] | branch(E) | T10 |
| 11 | branch(E)[T] | func1:end | T11 |
| 12 | branch(E)[F] | func1:end | T12 |

FIG.6

```
bool EmitBit(int cond) {
WriteBitToFile(cond !=0); // file output of condition truth value
return (cond !=0);
}
```

FIG.7

```
for(i=0;(A=i<N);i++){ // loop 1
    if(B){/*code area 2*/}
```

FIG.8

```
for(i=0;EmitBit(A=i<N);i++){ // loop 1
    if(EmitBit(B)){/*code area 2*/}
```

| ID | Partial program leading instruction | Partial program end instruction | Code included in loop |
|---|---|---|---|
| 13 | WW | branch(X) | c1,c2 |
| 14 | branch(X)[T] | branch(X) | c4,c2 |
| 12 | branch(X)[F] | YY | c5 |

FIG.13

| ID | Partial program leading instruction | Partial program end instruction | Type II loop ID | Partial program execution time estimate value |
|---|---|---|---|---|
| 8 | func1:start | branch(D) | 0 | T8 |
| 9 | branch(D)[T] | branch(D) | 02 | T9 |
| 10 | branch(D)[F] | branch(E) | 02 | T10 |
| 11 | branch(E)[T] | func1:end | 0 | T11 |
| 12 | branch(E)[F] | func1:end | 0 | T12 |

FIG.14A

| ID | Partial program leading instruction | Partial program end instruction | Type II loop ID | Partial program execution time estimate value |
|---|---|---|---|---|
| 8 | func1:start | branch(D) | 0 | T8 |
| 9 | branch(D)[T] | branch(D) | 0 | T9 |
| 10 | branch(D)[F] | branch(E) | 0 | T10 |
| 11 | branch(E)[T] | func1:end | 0 | T11 |
| 12 | branch(E)[F] | func1:end | 0 | T12 |

FIG.14B

| ID | Partial program leading instruction | Partial program end instruction | Type II loop ID | Partial program execution time estimate value |
|---|---|---|---|---|
| 8 | func1:start | Reduce_L2 | 0 | T8 |
| 9' | Reduce_L2 | branch(E) | 0 | T9'=T9 × 2+T10 |
| 11 | branch(E)[T] | func1:end | 0 | T11 |
| 12 | branch(E)[F] | func1:end | 0 | T12 |

FIG.16A

```
for(i=0;(D=i<M);i++){ //loop 2 (type II loop)
```

FIG.16B

```
for(i=0;EmitLoopCount(D=i<M,2);i++){ //loop 2 (type II loop)
```

FIG.16C

```
bool EmitLoopCount(int cond, int loopID){ // loopID: take value of one or more
  static int ID = 0, loopCount; //static variable (global variable exclusive to the function)
  if(loopID != ID){                // start of loop count evaluation
    ID = loopID; loopCount = 0;    // initialization
  }
  if(cond != 0)                    // loop continue condition
    loopCount ++;                  // count of loop iteration count
  else{                            // loop termination condition
    if(loopCountTable[ID] != loopCount){ //file output if different from previous loop count
      WriteLoopCountToFile(ID, loopCount); //record loop ID and loop count
      loopCountTable[ID] = loopCount; //update loop count table
    }
    ID = 0; // initialization executed next time without fail by ID=0
  }
  return (cond != 0);
}
```

FIG.17

| | Currently-read type II loop ID | Currently-referenced type II loop count data | Determination | Type II loop execution time estimate value | Subsequent currently-referenced type II loop count data |
|---|---|---|---|---|---|
| 601 | 01 | [01,5] | identical | 5 × t1(write) | updated to [02, 8] |
| 602 | 02 | [02,8] | identical | 8 × t2(write) | updated to [03, 10] |
| 603 | 02 | [03,10] | not identical | 8 × t2(read) | not updated |
| 604 | 01 | [03,10] | not identical | 5 × t1(read) | not updated |
| 605 | 03 | [03,10] | identical | 10 × t3(write) | updated to [02, 4] |
| 606 | 03 | [02,4] | not identical | 10 × t3(read) | not updated |
| 607 | 01 | [02,4] | not identical | 5 × t1(read) | not updated |
| 608 | 02 | [02,4] | identical | 4 × t2(write) | updated to [03, 20] |
| 609 | 03 | [03,20] | not identical | 10 × t3(read) | updated to [02, 8] |
| 610 | 01 | [02,8] | not identical | 5 × t1(read) | not updated |
| 611 | 02 | [02,8] | identical | 8 × t2(write) | terminate processing |

FIG.21

```
func2(){
  for(i=0;(G=i<K);i++){ // loop 6
    if(H){
      ...
      if(J){...}
      else{...}
      ...
    }
    else{...}
    ...
  }
}
main(){
  ...
  func2();
  ...
}
```

FIG.22

| ID | Partial program leading instruction | Partial program end instruction | Partial program execution time estimate value |
|---|---|---|---|
| 40 | func2:start | branch(G) | T40 |
| 41 | branch(G)[T] | branch(H) | T41 |
| 42 | branch(G)[F] | func2:end | T42 |
| 43 | branch(H)[T] | branch(J) | T43 |
| 44 | branch(H)[F] | branch(G) | T44 |
| 45 | branch(J)[T] | branch(G) | T45 |
| 46 | branch(J)[F] | branch(G) | T46 |
| 47 | main:start | func2:start\|main:end | T47a,T47b |

FIG.24

```
func2(){
  for(i=0;(G=i<K);i++){  // loop 3
    if(H){…}
    else {…}
    …
  }
}
```

FIG.25

| ID | Partial program leading instruction | Partial program end instruction | Partial program execution time estimate value |
|---|---|---|---|
| 20 | func2:start | branch(G) | T20 |
| 21 | branch(G)[T] | branch(H) | T21 |
| 22 | branch(G)[F] | func2:end | T22 |
| 23 | branch(H)[T] | branch(G) | T23 |
| 24 | branch(H)[F] | branch(G) | T24 |

FIG.26A

| ID | Partial program leading instruction | Partial program end instruction | Partial program execution time estimate value |
|---|---|---|---|
| 40 | func2:start | branch(G) | T40 |
| 41 | branch(G)[T] | branch(H) | T41 |
| 42 | branch(G)[F] | func2:end | T42 |
| 43 | branch(H)[T] | Reduce_B_J | T43 |
| 44 | branch(H)[F] | branch(G) | T44 |
| 45' | Reduce_B_J | branch(G) | T45'=j × 45+(1−j) × T46 |
| 47 | main:start | func2:start\|main:end | T47a,T47b |

FIG.26B

| ID | Partial program leading instruction | Partial program end instruction | Partial program execution time estimate value |
|---|---|---|---|
| 40 | func2:start | branch(G) | T40 |
| 41 | branch(G)[T] | branch(H) | T41 |
| 42 | branch(G)[F] | func2:end | T42 |
| 43' | branch(H)[T] | branch(G) | T43'=T43+T45' |
| 44 | branch(H)[F] | branch(G) | T44 |
| 47 | main:start | func2:start\|main:end | T47a,T47b |

FIG.26C

| ID | Partial program leading instruction | Partial program end instruction | Partial program execution time estimate value |
|---|---|---|---|
| 40 | func2:start | branch(G) | T40 |
| 41 | branch(G)[T] | Reduce_B_H | T41 |
| 42 | branch(G)[F] | func2:end | T42 |
| 43" | Reduce_B_H | branch(G) | T43"=h × T43'+(1−h) × T44 |
| 47 | main:start | func2:start\|main:end | T47a,T47b |

FIG.26D

| ID | Partial program leading instruction | Partial program end instruction | Partial program execution time estimate value |
|---|---|---|---|
| 40 | func2:start | branch(G) | T40 |
| 41' | branch(G)[T] | branch(G) | T41'=T41+T43" |
| 42 | branch(G)[F] | func2:end | T42 |
| 47 | main:start | func2:start\|main:end | T47a,T47b |

```
func3(){
  for(i=0;(S=i<X);i++){ // "loop 4"
    Y=...; // "update variable Y"
    for(j=0;(Q=j<Y);j++){ // "loop 5"
      if(R){...}
      else {...}
      ...
    }
  }
}
```

FIG.31

| ID | Partial program leading instruction | Partial program end instruction | Partial program execution time estimate value |
|---|---|---|---|
| 30 | func3:start | branch(S) | T30 |
| 31 | branch(S)[T] | branch(Q) | T31 |
| 32 | branch(S)[F] | func3:end | T32 |
| 33 | branch(Q)[T] | branch(R) | T33 |
| 34 | branch(Q)[F] | branch(S) | T34 |
| 35 | branch(R)[T] | branch(Q) | T35 |
| 36 | branch(R)[F] | branch(Q) | T36 |

FIG.32

| Condition S | Probability of "True":s | Probability of "False":(1-s) |
|---|---|---|
| Condition Q | Probability of "True":q | Probability of "False":(1-q) |
| Condition R | Probability of "True":r | Probability of "False":(1-r) |

FIG.33A

| ID | Partial program leading instruction | Partial program end instruction | Partial program execution time estimate value |
|---|---|---|---|
| 30 | func3:start | branch(S) | T30 |
| 31 | branch(S)[T] | branch(Q) | T31 |
| 32 | branch(S)[F] | func3:end | T32 |
| 33 | branch(Q)[T] | Reduce_B_R | T33 |
| 34 | branch(Q)[F] | branch(S) | T34 |
| 35' | Reduce_B_R | branch(Q) | $T35' = r \times T35 + (1-r) \times T36$ |

FIG.33B

| ID | Partial program leading instruction | Partial program end instruction | Partial program execution time estimate value |
|---|---|---|---|
| 30 | func3:start | branch(S) | T30 |
| 31 | branch(S)[T] | branch(Q) | T31 |
| 32 | branch(S)[F] | func3:end | T32 |
| 33' | branch(Q)[T] | branch(Q) | $T33' = T33 + T35'$ |
| 34 | branch(Q)[F] | branch(S) | T34 |

FIG.34A

| ID | Partial program leading instruction | Partial program end instruction | Partial program execution time estimate value |
|---|---|---|---|
| 30 | func3:start | branch(S) | T30 |
| 31 | branch(S)[T] | Reduce_L5 | T31 |
| 32 | branch(S)[F] | func3:end | T32 |
| 33″ | Reduce_L5 | branch(S) | T33″=T33′×C_L5+T34 |

FIG.34B

| ID | Partial program leading instruction | Partial program end instruction | Partial program execution time estimate value |
|---|---|---|---|
| 30 | func3:start | branch(S) | T30 |
| 31′ | branch(S)[T] | branch(S) | T31′=T31+T33″ |
| 32 | branch(S)[F] | func3:end | T32 |

FIG.34C

| ID | Partial program leading instruction | Partial program end instruction | Partial program execution time estimate value |
|---|---|---|---|
| 30 | func3:start | Reduce_L4 | T30 |
| 31″ | Reduce_L4 | branch(S) | T31″=T31′×C_L4+T32 |

FIG.34D

| ID | Partial program leading instruction | Partial program end instruction | Partial program execution time estimate value |
|---|---|---|---|
| 30′ | func3:start | func3:end | T30′=T30+T31″ |

FIG.36

```
main(){
   for(i = 0;(U = i < X); i ++){ // "loop 10"
     if(V) func4();
     else break;
   }
}
func4(){
   for(i =0; (W = i < Y); i ++){ // "loop 11"
     if(Z) return;
       ...
   }
}
```

FIG.38

| ID | Partial program leading instruction | Partial program end instruction | Partial program execution time estimate value | Partial program execution frequency |
|---|---|---|---|---|
| 60 | main:start | branch(U) | T60 | C60 |
| 61 | branch(U)[T] | branch(V) | T61 | C61 |
| 62 | branch(U)[F] | main:end | T62 | C62 |
| 63 | branch(V)[T] | func4:start\|branch(U) | T63a,T63b | C63 |
| 64 | branch(V)[F] | main:end | T64 | C64 |
| 65 | func4:start | branch(W) | T65 | C65 |
| 66 | branch(W)[T] | branch(Z) | T66 | C66 |
| 67 | branch(W)[F] | func4:end | T67 | C67 |
| 68 | branch(Z)[T] | func4:end | T68 | C68 |
| 69 | branch(Z)[F] | branch(W) | T69 | C69 |

FIG.39A

| ID | Partial program leading instruction | Partial program end instruction | Partial program execution time estimate value | Partial program execution frequency |
|---|---|---|---|---|
| 60 | main:start | branch(U) | T60 | C60 |
| 61 | branch(U)[T] | branch(V) | T61 | C61 |
| 62 | branch(U)[F] | main:end | T62 | C62 |
| 63 | branch(V)[T] | func4:start\|branch(U) | T63a,T63b | C63 |
| 64 | branch(V)[F] | main:end | T64 | C64 |
| 65' | func4:start | func4:end | T65'=T_func4 | C65'=C65 |

FIG.39B

| ID | Partial program leading instruction | Partial program end instruction | Partial program execution time estimate value | Partial program execution frequency |
|---|---|---|---|---|
| 60 | main:start | branch(U) | T60 | C60 |
| 61 | branch(U)[T] | branch(V) | T61 | C61 |
| 62 | branch(U)[F] | main:end | T62 | C62 |
| 63' | branch(V)[T] | branch(U) | T63'=T63a+T65'+T63b | C63'=C63 |
| 64 | branch(V)[F] | main:end | T64 | C64 |

FIG.39C

| ID | Partial program leading instruction | Partial program end instruction | Partial program execution time estimate value | Partial program execution frequency |
|---|---|---|---|---|
| 60 | main:start | main:end | T60'=Total_main/C60 | C60'=C60 |

FIG.43

| ID | Partial program leading instruction | Partial program end instruction | Degeneration disable flag | Partial program execution time estimate value |
|---|---|---|---|---|
| 30 | func3:start | branch(S) | 0 | T30 |
| 31 | branch(S)[T] | branch(Q) | 1 | T31 |
| 32 | branch(S)[F] | func3:end | 1 | T32 |
| 33 | branch(Q)[T] | branch(R) | 1 | T33 |
| 34 | branch(Q)[F] | branch(S) | 1 | T34 |
| 35 | branch(R)[T] | branch(Q) | 1 | T35 |
| 36 | branch(R)[F] | branch(Q) | 1 | T36 |

FIG.45

| Program name | Prime500000 | Alphabet | Permutation | JPEG |
|---|---|---|---|---|
| Target program size (number of instructions) | 241 | 151 | 188 | 2,354 |
| Program execution time (total number of clock cycles) | 665,374,487 | 1,046,438,724 | 287,292,827 | 133,766,734 |
| Instruction set simulator execution time (second) | 47.05 | 110.02 | 28.69 | 12.81 |
| Instruction set simulator processing speed (clock cycle/second) | $14.14 \times 10^6$ | $9.51 \times 10^6$ | $10.01 \times 10^6$ | $10.44 \times 10^6$ |

FIG.46

| Program name | Prime500000 | Alphabet | Permutation | JPEG |
|---|---|---|---|---|
| Partial program table size | 34 | 23 | 29 | 366 |
| Branch history bit sequence length (number of bits) | 53,993,105 | 151,668,954 | 24,024,512 | 7,055,187 |
| Partial program average execution time (number of clock cycles) | 12.32 | 6.90 | 11.96 | 18.96 |
| Estimate calculation time of program execution time (second) | 2.22 | 6.81 | 1.20 | 0.28 |
| Speed improvement ratio to instruction set simulator | 21.19 | 16.16 | 23.91 | 45.75 |

FIG.47

| Program name | Prime500000 | Alphabet | Permutation | JPEG |
|---|---|---|---|---|
| Partial program table size | 16 | 9 | 2 | 28 |
| Branch history bit sequence length (number of bits) | 52,492,397 | 259,182 | 0 | 1,981 |
| Partial program average execution time (number of clock cycles) | 12.68 | 4,037.47 | 287,292,827.00 | 67,524.85 |
| Estimate calculation time of program execution time (second) | 2.09 | 0.047 | 0.000 | 0.000 |
| Speed improvement ratio to instruction set simulator | 22.51 | 2340.85 | — | — |

FIG.48

| Embodiment | Partial program table size | Branch history bit sequence length (number of bits) | Estimate calculation time of program execution time (second) | Speed improvement ratio to instruction set simulator |
|---|---|---|---|---|
| First Embodiment [No_Merge] | 366 | 7,055,187 | 0.281 | 45.59 |
| Second Embodiment [Loop_Merge] | 319 | 3,874,688 | 0.171 | 74.91 |
| Third Embodiment [Branch_Merge] | 126 | 2,142,011 | 0.062 | 206.61 |
| Fourth Embodiment [Full_Merge] | 28 | 1,981 | 0.000 | — |
| Sixth Embodiment [Param_Merge] | 187 | 3,247,638 | 0.080 | 160.13 |

FIG.55

| Communication synchronization instruction | Condition of transition from executable state to execution standby state |
|---|---|
| Data transmission instruction, Thread start-up instruction | No receive buffer space in receive processor → Buffer space wait state |
| Data reception synchronization instruction | Appropriate data in receive buffer not yet reached → Data wait state |
| Thread terminate instruction | Thread activation token (for starting thread processing) not yet reached → Thread activation token wait state |

FIG.56

| | Update contents of communication synchronization resource state information | Condition of processor for returning from execution standby state to executable state |
|---|---|---|
| Communication synchronization instruction | | |
| Data transmission instruction | Add "+1" to receive buffer state of corresponding receive buffer | Receive processor in wait state for appropriate transmit data |
| Thread start-up instruction | Add "+1" to receive buffer state of corresponding receive buffer | Receive processor in wait state for thread activation token |
| Thread terminate instruction | Add "-1" to receive buffer state of all receive buffers | Processor in wait state for its own buffer space |

FIG.57

| Program name | FIR (5 processors) | JPEG (19 processors) |
|---|---|---|
| Target program size (number of instructions) | 368 | 2,359 |
| Program sequential execution time (total number of clock cycles) | 7,398,367 | 133,774,410 |
| Program parallel execution time (total number of clock cycles) | 2,166,523 | 13,461,664 |
| Parallel processing speed improvement ratio | 3.41 | 9.94 |
| Multiprocessor instruction set simulator execution time (second) | 3.214 | 49.171 |
| Instruction set simulator processing speed (clock cycle/second) | $0.674 \times 10^6$ | $0.274 \times 10^6$ |

FIG.58

| Program name | FIR (5 processors) [Loop_Merge] | JPEG (19 processors) [Loop_Merge] | JPEG (19 processors) [Full_Merge] |
|---|---|---|---|
| Partial program table size (total of all processors) | 125 | 1,043 | 646 |
| Branch history bit sequence length (number of bits) | 5577 | 3,876,887 | 4,527 |
| Program parallel execution time estimate value (total number of clock cycles) | 2,207,275 | 13,449,293 | 13,032,994 |
| Estimate calculation time of program execution time (second) | 0.078 | 0.531 | 0.328 |
| Speed improvement ratio to instruction set simulator | 41.21 | 92.60 | 149.91 |

EXECUTION TIME ESTIMATION METHOD AND DEVICE

This application is a National Stage Application of PCT/JP2009/061419, filed on Jun. 23, 2009, which claims benefit of Serial No. 2008-173885, filed Jul. 2, 2008 in Japan, and which applications are incorporated herein by reference. To the extent appropriate, a claim of priority is made to each of the above disclosed applications.

TECHNICAL FIELD

The present invention relates to an execution time estimation method, an execution time estimation program, and an execution time estimation device for use in estimating an execution time of a program.

BACKGROUND ART

There have been proposed methods of estimating an execution time of a program (see, for example, Non-Patent Document 1).

One of the methods of estimating an execution time of a program is an instruction set simulator (see, for example, Non-Patent Documents 2 to 6). In another method, an execution time is calculated by executing estimated execution time information embedded in a program (see, for example, Non-Patent Document 7). In other method, a portion of a program is executed, from which an execution time of the entire program is estimated (see, for example, Non-Patent Documents 8 to 10).

RELATED ART DOCUMENTS

[Non-Patent Documents]
[Non-Patent Document 1] J. J. Yi and D. J. Lilja. Simulation of Computer Architectures: Simulators, Benchmarks, Methodologies, and Recommendations. IEEE Trans. Comput., 55(3), 2006.
[Non-Patent Document 2] A. Nohl, g. Braun, O. Schliebusch, R. Leupers, H. Meyr, and A. Hoffmann. A Universal Technique FOR Fast and Flexible Instruction-Set Architecture Simulation. In DAC' 02: Conference on Design Automation, New York, N.Y., USA, 2002. ACM Press.
[Non-Patent Document 3] W. S. Mong and J. Zhu. Dynamo-Sim: A Trace-based Dynamically Compiled Instruction Set Simulator. In ICCAD' 04: Proceedings of the 2004 IEEE/ACM International Conference on Computer-aided Design, Washington, D.C., USA, 2004. IEEE Computer Society.
[Non-Patent Document 4] W. Qin, J. D'Errico, and X. Zhu. A Multiprocessing Approach to Accelerate Retargetable and Portable Dynamic-compiled Instruction-set Simulation. In CODES+ISSS' 06: Conference on Hardware/Software Codesign and System Synthesis, New York, N.Y., USA, 2006. ACM Press.
[Non-Patent Document 5] M. Reshadi, P. Mishra, and N. Dutt. Instruction Set Compiled Simulation: A Technique for Fast and Flexible Instruction Set Simulation. In DACC' 03: Conference on Design Automation, New York, N.Y., USA, 2003. ACM Press.
[Non-Patent Document 6] HySim: A Fast Simulation Framework for Embedded Software Development Stefan Kraemer, Lei Gao, Jan Weinstock, Rainer Leupers, Gerd Ascheid and Heinrich Meyr In CODES+ISSS' 07: Conference on Hardware/Software Codesign and System Synthesis, New York, N.Y., USA, 2007. ACM Press.
[Non-Patent Document 7] T. Kempf, K. Karuri, S. Wallentowitz, G. Ascheid, R. Leupers, and H. Meyr. A SW Performance Estimation Framework for Early System-Level-Design using Fine-Grained Instrumentation. In DATE' 06: Conference on Design, Automation and Test in Europe, 3001 Leuven, Belgium, Belgium, 2006. European Design and Automation Association.
[Non-Patent Document 8] T. Sherwood, E. Perelman, G. Hamerly, and B. Calder. Automatically Characterizing Large Scale Program Behavior. In ASPLOS-X: Proceedings of the 10th International Conference on Architectural Support for Programming Languages and Operating Systems, New York, N.Y., USA, 2002. ACM Press.
[Non-Patent Document 9] T. Sherwood, E. Perelman, G. Hamerly, S. Sair, and B. Calder. Discovering and Exploiting Program Phases. IEEE Micro, December 2003.
[Non-Patent Document 10] R. Wunderlich, T. Wenisch, B. Falsafi, and J. Hoe. SMARTS: Accelerating Microarchitecture Simulation via Rigorous Statistical Sampling. In 30th Annual International Symposium on Computer Architecture, June 2003.

DISCLOSURE OF THE INVENTION

Problems to be Solved by the Invention

In the instruction set simulator described in Non-Patent Documents 2 to 6, an accurate estimate value of an execution time can be calculated. There is a problem, however, that an execution time of simulation takes a long time. In the methods described in Non-Patent Documents 7 to 10, the execution time of simulation can be shortened, however, accuracy of an estimate value becomes low.

In light of the above problems, the present invention has been made in an attempt to realize an accurate estimation of an execution time of a program in a short processing time.

Means for Solving the Problems

In order to solve the above problems, the present invention provides an execution time estimation method. The execution time estimation method is performed by an execution time estimation device which estimates an execution time of a program. The execution time estimation method includes the steps, performed by the execution time estimation device, of: extracting, from the program, a plurality of partial programs which are obtained by partitioning the program using at least one of a conditional branch instruction and a function call instruction as a boundary point; calculating an execution time of each partial program and storing the calculated execution time in a storage section; storing a leading instruction and an end instruction of the each partial program, and the calculated execution time of each of the partial programs, in the storage section, such that the leading instruction, the end instruction, and the execution time are associated with each other; generating a branch history bit sequence which is a sequence of "True" and "False" on the conditional branch instruction if the program is executed, and storing the generated branch history bit sequence in the storage section; generating a partial program execution sequence in which an execution order of the partial programs is written, based on the branch history bit sequence; and adding up the execution times of the partial programs, based on the partial program execution sequence.

In the configuration described above, the execution time estimate value is calculated by adding up execution times of partial programs which are calculated with a high accuracy. This makes it possible to estimate an execution time of a program with a high accuracy. Further, generated branch history bit sequences are much less in amount than a program execution instruction count. This makes it possible to take much shorter time in estimating an execution time than an actual program execution time.

In the execution time estimation method, if the partial program is a loop which is repeated a constant number of times, if the loop does not include therein the conditional branch instruction, and if an iteration count of the partial program in the loop is a constant number of times in the program, the execution time estimation method further includes the steps of: calculating a loop execution time by multiplying an execution time of the partial program in the loop by the iteration count, and degenerating the calculated loop execution time into one partial program execution time; and compiling, in the branch history bit sequence, the sequence of "True" and "False" relevant to a partial program corresponding to the loop which has been degenerated, into a piece of information on "True" and "False".

In the configuration described above, a loop in which the same partial program is repeated can be integrated into and dealt with as one partial program. This makes it possible to estimate an execution time of a program in a short processing time.

In the execution time estimation method, if the partial program is a loop which is repeated a constant number of times, if the loop does not include therein the conditional branch instruction, and if an iteration count of the partial program in the each loop is a constant number of times, the execution time estimation method further includes the steps of: generating a sequence of an iteration count of each loop; calculating an execution time of the loop by multiplying an execution time of the partial program in the loop by an iteration count in the sequence of the iteration count; adding up the calculated execution time of the each loop; and skipping a write of the sequence of "True" and "False" relevant to the partial program corresponding to the loop, in the branch history bit sequence.

In the configuration described above, even if a loop has a difficulty in being integrated into and dealt with as one partial program because there is a possibility that an iteration count of the loop is changed outside the loop, an execution time of the loop can be estimated based on a sequence of the iteration count or the like, separately from the other partial programs. This makes it possible to deal with such a loop as one partial program and to estimate an execution time of a program in a short processing time.

In the execution time estimation method, if the partial program is a loop which is repeated a constant number of times, and if the loop includes therein an if-else branch instruction, the execution time estimation method further includes the steps of: calculating a probability that the if-else branch instruction is "True" and a probability that the if-else branch instruction is "False"; adding a product which is obtained by multiplying an execution time of a partial program executed if the if-else branch instruction is "True", by a probability that the if-else branch instruction is "True", and a product which is obtained by multiplying an execution time of a partial program executed if the if-else branch instruction is "False", by a probability that the if-else branch instruction is "False"; and degenerating the partial program executed if the if-else branch instruction is "True" and the partial program executed if the if-else branch instruction is "False", into one partial program.

In the configuration described above, even if a loop which has a difficulty in being integrated into and dealt with as one partial program because an if-else branch instruction is included in the loop, partial programs each to be executed according to "True" and "False" of an if-else branch instruction can be integrated into one. This makes it possible to integrate loops each including therein an if-else branch instruction into one partial program.

In the execution time estimation method, if the partial program is a loop which is repeated a constant number of times, and if the loop is a multiple loop which is constituted only by a loop including one loop continue conditional instruction which determines whether or not the loop is continued, the execution time estimation method further includes the steps of: calculating a probability that an if-else branch instruction in the loop is "True" and a probability that the if-else branch instruction is "False"; sequentially calculating an average execution time of the loop in an order of loop position from innermost to outermost, based on the probabilities, and degenerating the calculated average execution times of the loop into one execution time of the partial program; and skipping a write of a sequence corresponding to the degenerated loop, in the branch history bit sequence.

In the configuration described above, even if a loop is a multiple loop which includes therein another loop, and a block of multiple loops has a difficulty in being integrated into one partial program, an average execution time for each loop can be calculated in order of position of the multiple loop from innermost to outermost. This makes it possible to integrate plural multiple loops into one partial program.

In the execution time estimation method, in a function including a plurality of the partial programs, the execution time estimation method includes the steps of: calculating an appearance frequency of the partial program; calculating an entire execution time estimate value of the partial programs in the function by multiplying the calculated execution time of the partial program by the appearance frequency of the partial program; calculating an entire execution time estimate value of the function by calculating a sum of the entire execution time estimate values of the partial programs in the function; and skipping a write of a sequence corresponding to the function of which entire execution time estimate value has been calculated, in the branch history bit sequence.

In the configuration described above, if a program does not include a recursive function call (for example, in a case where a function itself is called in the function), the entire program can always be degenerated into one partial program.

In the execution time estimation method, if the partial program is a loop which is repeated a constant number of times, the execution time estimation method performs a first partial program degeneration processing and a second partial program degeneration processing with respect to the loop. If a first loop is a multiple loop which is constituted only by a loop including one loop continue conditional instruction which is a branch for determining whether or not a repeat processing in the first loop is continued, and if the program includes at least one first loop, the first partial program degeneration processing includes the steps of: calculating, if the first loop includes therein an if-else branch instruction, a probability that the if-else branch instruction is "True" and a probability that the if-else branch instruction is "False"; sequentially calculating an average execution time of the first loop in an order of loop position from innermost to outermost, based on the probabilities, and degenerating the calculated average execution times of the first loop into one execution time of the partial program; and skipping a write of a sequence corresponding to the degenerated partial program, in the branch history bit sequence. If the second loop does not include therein the conditional branch instruction, if an iteration count in each second loop is a constant number of times, and if the program includes therein at least one second loop, the second partial program degeneration processing includes the steps of: generating a sequence of an iteration count of the partial program in the each second loop; calculating a loop execution time estimate value by multiplying an execution time of a partial program corresponding to the second loop by an iteration count in the sequence of the iteration count; adding up the calculated execution time estimate value of the each second loop; and skipping a write of a sequence corresponding to the loop, in the branch history bit sequence.

In the configuration described above, an if-else branch block can be integrated into one partial program. Loops can also be integrated into one partial program. This makes it possible to estimate an execution time of a program in a short processing time.

The execution time estimation method further includes the steps of: calculating an if-else execution time weighting degree which is a weighting degree of an execution time of the partial program depending on "True" or "False" of the if-else branch instruction; and skipping an execution of the first partial program degeneration processing, if the if-else execution time weighting degree is not less than a prescribed value.

In the configuration described above, it is possible to prevent an influence of fluctuations of an execution time of a partial program brought about by using probability, from disappearing. It is also possible to confirm a local program execution time.

In the execution time estimation method, the if-else execution time weighting degree is a value obtained by multiplying an absolute value of a difference between an execution time of the partial program if the if-else branch instruction is "True" and an execution time of the partial program if the if-else branch instruction is "False", by the number of executions of the if-else branch instruction.

In the configuration described above, it is possible to accurately calculate an execution time weighting degree.

The execution time estimation method further includes the steps of: calculating a loop execution time weighting degree based on a weighting degree of an iteration count of the each first loop; and skipping an execution of the second partial program degeneration processing, if the loop execution time weighting degree is larger than a prescribed value.

In the configuration described above, it is possible to prevent an influence of fluctuations of an execution time of a partial program brought about by using an average execution time of a loop, from disappearing.

In the execution time estimation method, the loop execution time weighting degree is a value obtained by multiplying a variance of an iteration count in each loop in the first loop, by the iteration count of the loop, and by an average execution time of the loop.

In the configuration described above, it is possible to accurately calculate a loop execution time weighting degree.

In the execution time estimation method, the execution time estimation device is a single processor computer.

In the configuration described above, it is possible to realize the execution time estimation method using a single processor and to enhance versatility.

In the execution time estimation method, the execution time estimation device is a multiprocessor computer, and estimated execution times of a plurality of programs are calculated in parallel.

In the configuration described above, it is possible to realize the execution time estimation method using a multiprocessor and to perform a processing of estimating execution times of a plurality of programs in parallel, thus allowing a high-speed processing.

In the execution time estimation method: the program is a program which is executed in conjunction with other program while performing communication synchronization; the partial program includes a communication synchronization partial program which is a program that instructs communication synchronization with other program; and the execution time estimation device updates an execution state of a processor constituting the multiprocessor according to a type of the communication synchronization partial program, when an execution sequence of the partial program is generated based on the branch history bit sequence, if the partial program targeted for the processing is the communication synchronization partial program.

In the configuration described above, it is possible to estimate an execution time of a program constituted by a plurality of processes, while accurately reproducing communication synchronization between the processes.

An execution time estimation program makes a computer execute the execution time estimation method.

In the configuration described above, it is possible to provide a program which makes a computer execute the execution time estimation method.

An execution time estimation device which estimates an execution time of a program includes: a program partitioning section that extracts, from the program, a plurality of partial programs which are obtained by partitioning the program using at least one of a conditional branch instruction and a function call instruction as a boundary point; a partial program execution time estimation calculating section that calculates an execution time of each partial program and stores a leading instruction and an end instruction of the each partial program, and the calculated execution time of each of the partial programs, in a storage section, such that the leading instruction, the end instruction, and the execution time are associated with each other; a branch history information generating section that generates a branch history bit sequence which is a sequence of "True" and "False" on the conditional branch instruction if the program is executed, and stores the generated branch history bit sequence in the storage section; an execution trace reproducing section that generates a partial program execution sequence in which an execution order of the partial programs is written, based on the branch history bit sequence; and an execution time estimation calculating section that adds up the execution times of the partial programs, based on the partial program execution sequence.

In the configuration described above, the execution time estimate value is calculated by adding up execution times of partial programs which are calculated with a high accuracy. This makes it possible to estimate an execution time of a program with a high accuracy. Further, generated branch history bit sequences are much less in amount than a program execution instruction count. This makes it possible to take much shorter time in estimating an execution time than an actual program execution time.

Advantageous Effects of the Invention

The present invention can realize an accurate estimation of an execution time of a program in a short processing time.

BRIEF DESCRIPTION OF THE DRAWINGS

FIG. 4 An example of a target program according to the first embodiment.

FIG. 5 An example of a partial program table according to the first embodiment.

FIG. 6 A diagram illustrating an example of a file input/output function for outputting a branch history bit sequence according to the first embodiment.

FIG. 7 A diagram illustrating a portion of the target program of FIG. 4 according to the first embodiment.

FIG. 8 A diagram illustrating an example of a program after the program of FIG. 7 is rewritten according to the first embodiment.

FIG. 12 Diagrams each regarding to a loop in a target program according to the second embodiment.

FIG. 13 An example of a partial program table used in the second embodiment.

FIG. 14 Diagrams illustrating degeneration of a type I loop. FIG. 14A and FIG. 14B shows a partial program table before and after the degeneration, respectively, according to the second embodiment.

FIG. 16 Diagrams illustrating an example of rewriting a target program for generating a type II loop count data sequence according to the second embodiment. FIG. 16A and FIG. 16B illustrate the target program before and after rewritten, respectively. FIG. 16C illustrates a function for generating a type II loop count data sequence and a branch history bit sequence.

FIG. 17 A diagram for specifically illustrating a processing performed by a type II loop execution time estimation calculating section according to the second embodiment.

FIG. 21 A diagram illustrating a target program including another example of a type III loop according to the third embodiment.

FIG. 22 A diagram illustrating an example of a partial program table generated from the target program of FIG. 21 according to the third embodiment.

FIG. 24 A diagram illustrating an example of a target program including a type III loop according to the third embodiment.

FIG. 25 A diagram illustrating an example of a partial program table generated from the target program of FIG. 24 according to the third embodiment.

FIG. 26 Diagrams each illustrating an example of a partial program table which is are subjected to a degeneration processing according to the third embodiment. FIG. 26A illustrates a result of performing an if-else degenerating processing to "J". FIG. 26B illustrates a result of performing an adjacency degenerating processing to the result shown in FIG. 26A. FIG. 26C illustrates a result of performing an if-else degenerating processing to "H". FIG. 26D illustrates a result of performing an adjacency degenerating processing to the result shown in FIG. 26C.

FIG. 31 A diagram illustrating an example of a partial program table generated from the target program of FIG. 28 according to the fourth embodiment.

FIG. 32 A diagram illustrating branch probabilities of condition variables in tabular form according to the fourth embodiment.

FIG. 33 Diagrams illustrating examples of partial program tables which are subjected to an if-else degenerating processing and an adjacency degenerating processing, respectively. FIG. 33A illustrates an example in which a partial program table is subjected to the if-else degenerating processing. FIG. 33B illustrates an example of a partial program table obtained as a result of the adjacency degenerating processing performed to the resultant partial program table of FIG. 33A according to the fourth embodiment.

FIG. 34 Diagrams illustrating examples of partial program tables each obtained by performing a degeneration processing to the partial program table of FIG. 33B according to the fourth embodiment. FIG. 34A illustrates an example of a partial program table obtained by performing a type IV loop degenerating processing to the partial program table of FIG. 33B. FIG. 34B illustrates an example of a partial program table obtained by performing an adjacency degenerating processing to the partial program table of FIG. 34A. FIG. 34C illustrates an example of a partial program table obtained by performing a type IV loop degenerating processing to the partial program table of FIG. 34B. FIG. 34D illustrates an example of a partial program table obtained by performing an adjacency degenerating processing to the partial program table of FIG. 34C.

FIG. 36 A diagram illustrating an example of a target program having a loop including a "break" statement and a "return" statement according to the fifth embodiment.

FIG. 38 A diagram illustrating an example of a partial program table in which information on partial program execution frequency is written according to the fifth embodiment.

FIG. 39 Diagrams illustrating examples in which the partial program table of FIG. 38 is subjected to the degeneration processing according to the fifth embodiment. FIG. 39A illustrates an example in which a function "func4" degeneration processing is performed. FIG. 39B illustrates an example in which a degeneration processing of a partial program "63" is performed. FIG. 39C illustrates an example of a resultant partial program table after the degeneration processing is completed.

FIG. 40 Schematic diagrams each illustrating a code execution time when a code in a target program is repeatedly executed according to the fifth embodiment.

FIG. 43 A diagram illustrating an example of a partial program table generated as a result of operations in step S503 and step S504 according to the sixth embodiment.

FIG. 45 A table illustrating experimental results using an instruction set simulator as a comparative example.

FIG. 46 A table illustrating an example of experimental results according to the first embodiment.

FIG. 47 A table illustrating an example of experimental results according to the fourth embodiment.

FIG. 48 A table wrapping up experimental results according to the first to fourth, and sixth embodiments.

FIG. 55 A table illustrating a condition under which a processor transfers from an executable state to an execution standby state according to the seventh embodiment.

FIG. 56 A table illustrating update contents of communication synchronization resource state information and conditions of processor for returning from the execution standby state to the executable state according to the seventh embodiment.

FIG. 57 A table illustrating experimental results using an instruction set simulator as a comparative example.

FIG. 58 A diagram illustrating an example of experimental results according to the seventh embodiments.

BEST MODE FOR CARRYING OUT THE INVENTION

Next is described in detail the best mode for carrying out the invention (which is referred to as an "embodiment" hereinafter) with reference to related drawings. In the embodiments of the present invention, a block means a range of a program dominated by a loop, an if-else branch instruction, or the like. For example, some loop blocks include therein an if-else instruction or a loop. Some if-else blocks include therein other if-else instruction. The term "block" is to be used hereinafter where necessary. Note that, an if-else block is assumed to include a range dominated by an if statement and a range dominated by an else statement.

(First Embodiment: Configuration)

Figure 1:
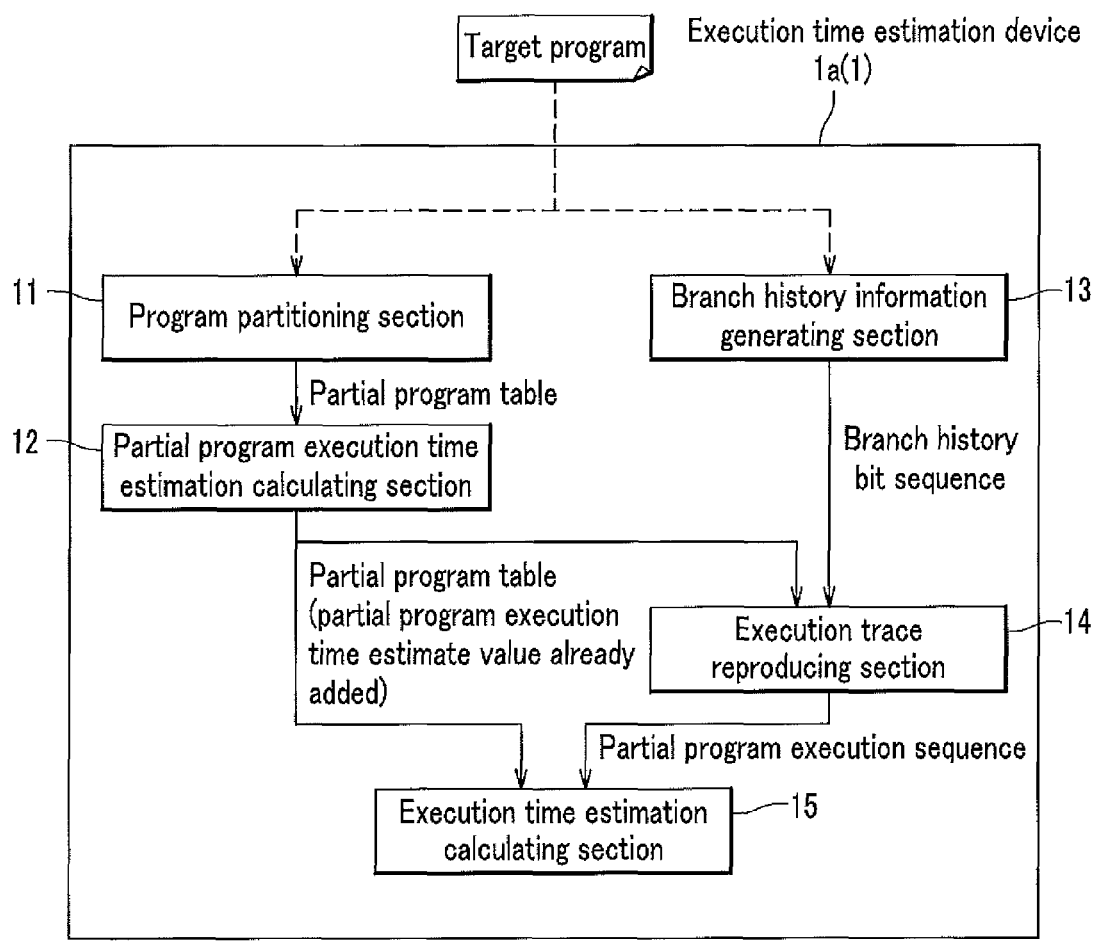
FIG. 1 A diagram illustrating a configuration example of a execution time estimation device according to a first embodiment of the present invention.

FIG. 1 is a diagram illustrating a configuration example of an execution time estimation device according to a first embodiment.

An execution time estimation device $1a$ (1) includes a program partitioning section 11, a partial program execution time estimation calculating section 12, a branch history information generating section 13, an execution trace reproducing section 14, and an execution time estimation calculating section 15. Next is outlined the above-mentioned components of the execution time estimation device $1a$. Detailed processings performed by the components will be described later with reference to FIG. 3 to FIG. 8.

The program partitioning section 11: partitions a program targeted for an execution time estimation (which will be referred to as a target program hereinafter) into a plurality of partial programs, using a conditional branch instruction and a function call instruction as a boundary point; and generates a partial program table in which each partial program is shown in a table. The partial program table will be described later with reference to FIG. 5. The conditional branch instruction used in this embodiment includes an if-else branch instruction and a loop continue conditional instruction which is a conditional instruction whether or not a loop is continued in a "for" statement.

The partial program execution time estimation calculating section 12: calculates an execution time for each of the partial programs generated by the program partitioning section 11 (which may also be referred to as a partial program execution time estimate value); and adds the calculated partial program execution time estimate value to the partial program table. The partial program execution time estimation calculating section 12 also transmits the partial program table with the partial program execution time estimate value already having been added thereto, to the execution trace reproducing section 14 or the execution time estimation calculating section 15.

The branch history information generating section 13 generates a branch history bit sequence which is a sequence of truth values (which are represented by binary values, namely, "1" and "0") of a condition variable in a conditional branch instruction in the target program; and transmits the generated sequence to the execution time estimation calculating section 15.

The execution trace reproducing section 14 reads an execution time estimate value of each partial program from a partial program table in order of execution of the partial programs, based on the partial program table which is transmitted from the calculating section 12 and to which a partial program execution time estimate value has already been added and a branch history bit sequence generated by the branch history information generating section 13; and sequentially transmits the read partial program execution time estimate value to the execution time estimation calculating section 15.

The execution time estimation calculating section 15 sequentially adds up the partial program execution time estimate value transmitted from the execution trace reproducing section 14 and thereby estimates an execution time of the entire target program.

Figure 2:
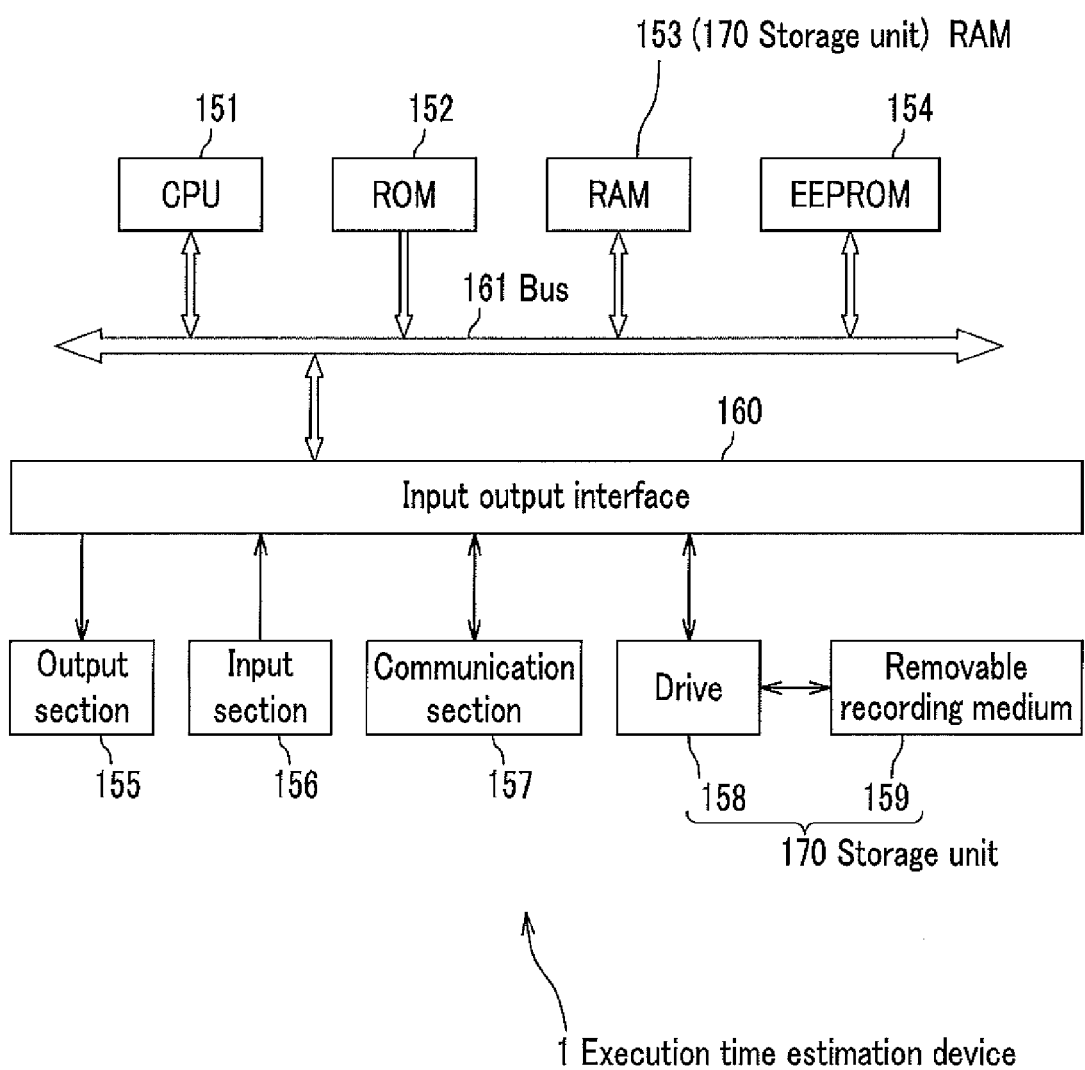
FIG. 2 A diagram illustrating a hardware configuration of execution time estimation device according to the first embodiment.

FIG. 2 is a diagram illustrating an example of a hardware configuration of an execution time estimation device according to this embodiment.

The hardware configuration shown in FIG. 2 may be a hardware configuration of the execution time estimation device 1a shown in FIG. 1 or may be any one of hardware configurations of execution time estimation devices 1b to 1e and 1g shown in FIG. 9, FIG. 18, FIG. 27, FIG. 35, and FIG. 41, respectively.

The execution time estimation device 1 includes a CPU (central Processing Unit) 151, a ROM (Read Only Memory) 152, a RAM (Random Access Memory) 153, and an EEPROM (Electrically Erasable and Programmable Read Only Memory) 154, which are connected to each other via a bus 161. The execution time estimation device 1 also includes an output section 155 such as a display, an input section 156 such as a keyboard and a mouse, a communication section 157 as a communication interface such as a NIC (Network Interface Card), and a drive 158 which reads information from a removable recording medium 159, which are connected to an input output interface 160. The input output interface 160 is connected to the bus 161, to thereby control a flow of information between: the output section 155, the input section 156, the communication section 157, and the drive 158; and the CPU 151, the ROM 152, the RAM 153, and the EEPROM 154. Note that, in this embodiment, a combination of the RAM 153, the drive 158, and the removable recording medium 159 may also be referred to as a storage unit 170.

Respective components 11 to 15 shown in FIG. 1 are embodied when an execution time estimation program stored in the storage unit 170 or the like is loaded into the RAM 153 and the CPU 151 executes the loaded program.

Figure 3:
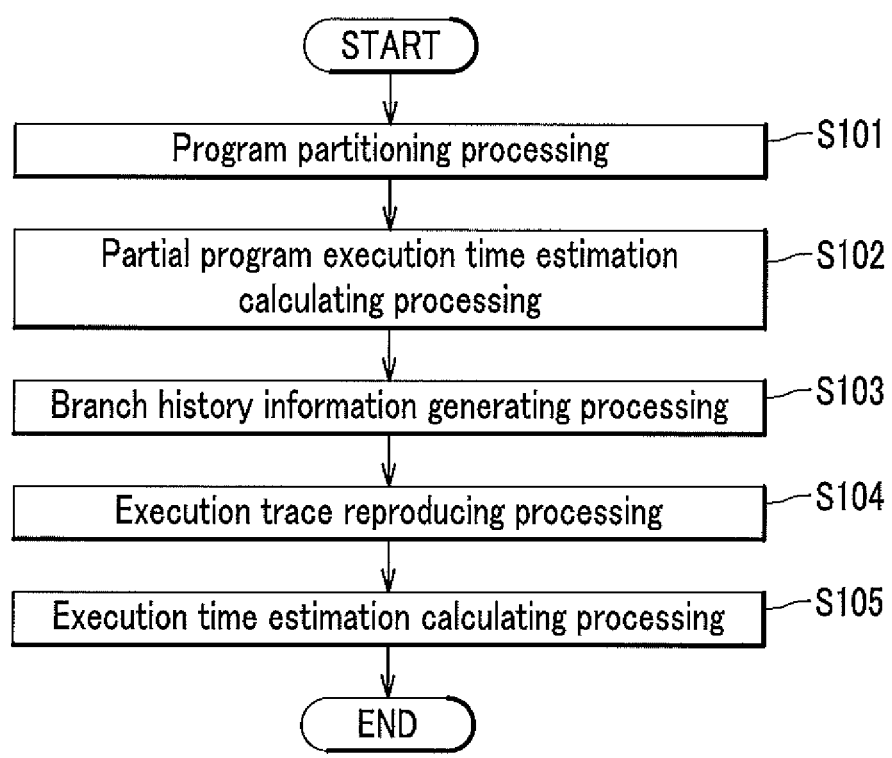
FIG. 3 A flowchart illustrating a flow of a program execution time estimation method according to the first embodiment.

Next is described a program execution time estimation method with reference to FIG. 3 as well as FIG. 1.

FIG. 3 is a flowchart illustrating a flow of a program execution time estimation method according to the first embodiment.

(Program Dividing Processing)

The program partitioning section 11 performs a program partitioning processing (S101), to thereby partition a target program into partial programs. The partial program herein is an execution instruction sequence having a conditional branch instruction and a function call instruction as a boundary point but not including therein the conditional branch instruction or the function call instruction.

<<Details of Program Dividing Processing>>

FIG. 4 is an example of a target program according to the first embodiment.

The target program shown in FIG. 4 has five conditional branch instructions with respect to condition variables "A", "B", "C", "D", and "E".

If the program partitioning section 11 performs the program partitioning processing of step S101 in FIG. 3 to the target program of FIG. 4, the partial program table of FIG. 5 is outputted.

<Partial Program Table>

Next is described a partial program table of FIG. 5 also with reference to FIG. 4.

FIG. 5 is a diagram illustrating an example of a partial program table according to the first embodiment.

The partial program table has such fields (columns) as "partial program ID (Identification) (to be referred to as "ID" in related drawings of the partial program table)", "partial program leading instruction", "partial program end instruction", and "partial program execution time estimate value". Note that the partial program table is made up of data generated by the program partitioning section 11 and stored in the storage unit 170 (FIG. 2) such as the RAM 153 (FIG. 2).

The "partial program ID" is an ID which is uniquely assigned to each partial program by the program partitioning section 11.

The "partial program leading instruction" is a field in which a initial instruction of each partial program is written.

For example, in FIG. 5, partial programs with partial program IDs "1" and "8" (hereinafter, a partial program with a partial program ID "n" will be referred to as a partial program "n") have a "main:start" and a "func1:start" as initial instructions of respective functions (a main function and a function func1, respectively). A "branch (A) [T]" of a partial program "2" represents a conditional branch instruction if the condition variable "A" in FIG. 4 is "True". A "branch (A) [F]" of a partial program "3" represents a conditional branch instruction if the condition variable "A" in FIG. 4 is "False".

The "partial program end instruction" herein is a field in which a terminal instruction of each partial program is written.

For example, in the partial program "1" of FIG. 5, an end instruction of the partial program is a "branch (A)". That is, it is shown that the partial program "1" starts with the "main:start" (a partial program leading instruction) and ends with the "branch (A)" (a partial program end instruction). Similarly, the partial program "2" starts with that the "branch (A)" has a value corresponding to "True", and ends with the "branch (B)".

Note that, if a plurality of instructions are written like a "func1:start|branch (A)" (herein, the instructions are separated with a sign "|") as the "partial program end instruction" of the partial program "6", this means that: control is transferred from a function written as the "partial program leading instruction" to an initial instruction "func1:start" of a calling function "func1"; and finally reaches the branch (A), after execution of the function "func1" is completed (that is, after reaching "func1:end").

Note that "partial program execution time estimate value" of FIG. 5 is an estimate value of an execution time of a partial program calculated by the partial program execution time estimation calculating section 12 in step S102. A field of the partial program execution time estimate value is still blank in step S101.

(Partial Program Execution Time Estimation Calculating Processing)

Referring back to FIG. 3, after step S101, the partial program execution time estimation calculating section 12 performs a partial program execution time estimation calculating processing (S102).

In step S102, the partial program execution time estimation calculating section 12 calculates an estimate value of an execution time in a target processor of each partial program generated in step S101. Note that the partial program execution time estimation calculating section 12 calculates the estimate value by actually executing the partial program. Herein, if a partial program repeatedly appears in the target program, it is enough to calculate an execution time of the repeated partial program just once. This makes it possible to take much shorter time in completing step S102, compared to an estimation by calculating an overall execution time of the target program. For example, if a partial program "α" is executed more than once in form of a loop or a conditional branch instruction, it is only necessary in step S102 to calculate an execution time of the partial program "α" just once. Note that, if a compiler for generating an execution machine code of the target program is already existing, a processing time of each partial program can be estimated with high precision, because the each partial program does not include a conditional branch instruction or a function calling. Further, if a compiler dedicated to the target processor is not yet developed, the processing time of the each partial program is calculated by first calculating a predicted value of an execution time of each instruction based on structural features of the target processor (such as an execution time of each operation instruction or a memory access time) and then calculating an estimate value of the execution time based on the predicted value.

The partial program execution time estimation calculating section 12 writes the calculated partial program execution time estimate value in the field of "partial program execution time estimate value" of the partial program table of FIG. 5.

Herein, the field of "partial program execution time estimate value" of FIG. 5 shows an execution time from a leading instruction to an end instruction of a given partial program. For example, "T1" of the partial program "1" represents an execution time from the "main:start" to the "branch (A)", which includes operation instructions such as "code area 1", "i=0", and "i<N" (FIG. 4).

"T4" of the partial program "4" represents an execution time from a branch instruction in which the condition "B" is "True", to the "branch (A)", which includes operation instructions such as "code area 2", "code area 3", "i++", and "i<N" (FIG. 4).

"T6*a*" of the partial program "6" of FIG. 5 represents an execution time from a branch instruction in which the condition "C" is "True", to a start instruction "func1:start" of the calling function "func1".

Similarly, "T6*b*" of the partial program "6" represents an execution time from a time when control returns from the function "func1" to "main", to the "branch (A)", which includes operation instructions such as "code area 3", "i++", and "i<N" (FIG. 4).

(Branch History Information Generating Processing)

Referring back to FIG. 3, after completion of the processing of step S102, the branch history information generating section 13 performs a branch history information generating processing (S103).

In step S103, the branch history information generating section 13: executes the target program; represents "True" and "False" in all conditional branch instructions in executing the target program by 1-bit information; and stores a branch history bit sequence which is generated by combining the obtained 1-bit information in order of the execution, in the storage unit 170 such as the RAM 153. The branch history bit sequence herein is a sequence of 1-bit information, for example, "1110111010" in which "True" and "False" are represented by "1" and "0", respectively.

The number of conditional branch instruction executions in a target program generally accounts for a small percentage of a total number of instruction executions. Also, results of execution of a branch condition can be represented by 1-bit information. Thus, even if a lengthy target program is executed, a branch history bit sequence thereof can be represented with a relatively small data capacity. This is effective in drastically reducing an overhead time for storing program execution history information, even if the information is stored in an information storage medium which requires an extremely long delay time such as a hard disk. Further, the branch history information generating section 13 does not directly store a truth value of a condition variable one bit at a time, in an external storage device such as a hard disk. Instead, the branch history information generating section 13 stores branch history information via a memory hierarchy such as an internal register, a cache memory, a main storage unit (a main memory), or the like, and finally, in an external storage device (such as a hard disk). This allows a delay time to be reduced, as compared to sequential storage in a hard disk.

<<Details of Branch History Information Generating Processing>>

The branch history information generating processing can be realized when the branch history information generating section 13 adds, if a leading instruction of each partial program is a conditional branch instruction, an instruction program which records a truth value (a value represented by binary values, namely, "1" and "0") of a corresponding condition variable in the storage unit 170, to the target program. The instruction program added is, for example, a file output function program as shown in FIG. 6. That is, the branch history information generating section 13 can be embodied when the execution time estimation device 1*a* invokes the file output function program of FIG. 6.

FIG. 6 is a file input/output function for outputting a branch history bit sequence. FIG. 7 is a diagram illustrating a portion of the target program of FIG. 4. FIG. 8 is a diagram illustrating an example of a program after the program of FIG. 7 is rewritten.

Note that FIG. 7 shows lines 3 to 4 of the target program of FIG. 4.

The branch history information generating section 13, after defining the file output function shown in FIG. 5, rewrites portions where the condition variables "A" and "B" appear in the program of FIG. 6, as shown in FIG. 8. The branch history information generating section 13 can function when the execution time estimation device 1*a* executes the target program rewritten as shown in FIG. 8 and can acquire a branch history bit sequence.

(Execution Trace Reproducing Processing)

Referring back to FIG. 3, after step S103, the execution trace reproducing section 14 performs an execution trace reproducing processing based on the partial program table and the branch history bit sequence (S104). In step S104, the execution trace reproducing section 14: sequentially reads bits of the branch history bit sequence generated in step S103; reproduces a program execution trace based on the partial program table generated in step S102; and thereby generates a partial program execution sequence.

<<Details of Execution Trace Reproducing Processing>>

Next are described details of an execution trace reproducing processing assuming that the branch history bit sequence is "1110111010", with reference to FIG. 5.

The execution trace reproducing section 14 reads the partial program "1" in the partial program table and reaches the "partial program end instruction" of "branch (A)". The execution trace reproducing section 14 then reads the partial program execution time estimate value of "T1" of the partial program "1" and transmits a partial program execution time thereof to the execution time estimation calculating section 15.

An initial bit "1" of the branch history bit sequence represents that the condition variable "A" is "True". The execution trace reproducing section 14 thus transfers to the partial program "2" in which the "partial program leading instruction" is "branch (A)[T]" and reaches the "partial program end instruction" of "branch (B)". The execution trace reproducing section 14 then reads the partial program execution time estimate value "T2" of the partial program "2" and transmits a partial program execution time thereof to the execution time estimation calculating section 15.

The second bit "1" of the branch history bit sequence represents that the condition variable "B" is "True". The execution trace reproducing section 14 thus transfers to the partial program "4" in which the "partial program leading instruction" is "branch (B)[T]" and reaches the "partial program end instruction" of "branch (A)". The execution trace reproducing section 14 then reads the partial program execution time estimate value "T4" of the partial program "4" and transmits a partial program execution time thereof to the execution time estimation calculating section 15.

Similarly to the above, the third branch history bit "1" of the branch history bit sequence represents that the condition variable "A" is "True". The execution trace reproducing section 14 thus transfers to the partial program "2" in which the "partial program leading instruction" is "branch (A)[T]" and reaches the "partial program end instruction" of "branch (B)", The execution trace reproducing section 14 then reads the partial program execution time estimate value "T2" of the partial program "2" and transmits a partial program execution time thereof to the execution time estimation calculating section 15.

The fourth branch history bit "0" of the branch history bit sequence represents that the condition variable "B" is "False". The execution trace reproducing section 14 thus transfers the partial program "5" in which the "partial program leading instruction" is "branch (B)[F]" and reaches the "partial program end instruction" of "branch (C)". The execution trace reproducing section 14 then reads the partial program execution time estimate value "T5" of the partial program "5" and transmits a partial program execution time thereof to the execution time estimation calculating section 15.

The fifth branch history bit "1" of the branch history bit sequence represents that the condition variable "C" is "True". The execution trace reproducing section 14 thus transfers to the partial program "6" in which the "partial program leading instruction" is "branch (C) [T]" and reaches a calling function "func1:start" which may also be referred to as the first end instruction. At this time, the execution trace reproducing section 14 invokes the partial program by pushing the partial program in a stack and registers the partial program in an original state in the storage unit 170 (FIG. 2) such as the RAM 153. The execution trace reproducing section 14 then reads a partial program execution time estimate value "T6a" of the partial program "6" and transmits a partial program execution time thereof to the execution time estimation calculating section 15. The execution trace reproducing section 14 then transfers to the partial program "8" without any condition and reaches the "partial program end instruction" of "branch (D)".

The sixth branch history bit "1" of the branch history bit sequence represents that the condition variable "D" is "True". The execution trace reproducing section 14 thus transfers to a partial program "9" in which the "partial program leading instruction" is "branch (D) [T]" and reaches the "partial program end instruction" of "branch (D)". The execution trace reproducing section 14 then reads a partial program execution time estimate value "T9" of the partial program "9" and transmits a partial program execution time thereof to the execution time estimation calculating section 15.

The seventh branch history bit "1" of the branch history bit sequence represents that the condition variable "D" is "True". The execution trace reproducing section 14 thus transfers to a partial program "9" in which the "partial program leading instruction" is "branch (D) [T]" and reaches a "partial program end instruction" of "branch (D)". The execution trace reproducing section 14 then reads a partial program execution time estimate value "T9" of the partial program "9" and transmits a partial program execution time thereof to the execution time estimation calculating section 15.

The eighth branch history bit "0" of the branch history bit sequence represents that the condition variable "D" is "False". The execution trace reproducing section 14 thus transfers to a partial program "10" in which the "partial program leading instruction" is "branch (D)[F]" and reaches a "partial program end instruction" of "branch (E)". The execution trace reproducing section 14 then reads a partial program execution time estimate value "T10" of the partial program "10" and transmits a partial program execution time thereof to the execution time estimation calculating section 15.

The ninth branch history bit "1" of the branch history bit sequence represents that a condition variable "E" is "True". The execution trace reproducing section 14 thus transfers to a partial program "11" in which the "partial program leading instruction" is "branch (E)[T]" and reaches the "partial program end instruction" of "func1:end". The execution trace reproducing section 14 then pops off the partial program "6" from the stack and reaches the "branch (A)" which may also be referred to as a second partial program end instruction. The execution trace reproducing section 14 then reads a second partial program execution time estimate value "T6b" of the partial program "6" and transmits a partial program execution time thereof to the execution time estimation calculating section 15.

The tenth branch history bit "0" of the branch history bit sequence represents that the condition variable "A" is "False". The execution trace reproducing section 14 thus transfers to the partial program "3" in which the "partial program leading instruction" is "branch (A) [F]" and reaches the "partial program end instruction" thereof which is "main:end". At this time, the program execution is terminated. The execution trace reproducing section 14 then reads a partial program execution time estimate value "T3" of the partial program "3" and transmits a partial program execution time thereof to the execution time estimation calculating section 15.

After the above described processings, the execution trace reproducing section 14 sequentially acquires the partial program execution time estimate values corresponding to the partial program IDs from the partial program table. As a result, a partial program execution sequence as follows is transmitted to the execution time estimation calculating section 15:

main:start→[T1]→A(1)→[T2]→B(1)→[T4]→A(1)→[T2]→B(0)→[T5]→c(1)→[T6a]→func1:start→[T8]→D(1)→[T9]→D(1)→[T9]→D(0)→[T10]→E(1)→[T11]→func1:end→[T6b]→A(0)→[T3]→main:end Herein, [Tx] represents an execution time of the partial program (the "partial program execution time estimate value" in the partial program table of FIG. 5). A(1) represents that the condition variable "A" is "True". A(0) represents that the condition variable "A" is "False". Note that, actually, each time the execution trace reproducing section 14 reads a partial program execution time estimate value from the partial program table, the value is sequentially transmitted to the execution time estimation calculating section 15.

By performing the execution trace reproducing processing (S104) as described above, it is possible to precisely reproduce all execution instruction sequences when a target program is actually executed. Further, by performing the execution trace reproducing processing, a secondary effect is also bought about that various program execution profile information (such as execution frequency of each instruction and each function call, and branch probability of each conditional branch instruction) can be accurately calculated.

(Execution Time Estimation Calculating Processing)

After step S104, the execution time estimation calculating section 15 performs an execution time estimation calculating processing in which the section 15 adds up the partial program execution time estimate values sequentially transmitted to the execution trace reproducing section 14 in order of the transmittance and thereby calculates an execution time estimate value of the entire target program (S105). Note that the execution time estimation calculating section 15 may read a partial program execution time estimate value from the partial program table, based on the partial program execution sequence transmitted from the execution trace reproducing section 14; substitute the partial program execution time estimate value for an execution sequence; and sequentially add up the values, to thereby calculate an execution time estimate value of the entire target program.

<<Details of Execution Time Estimation Calculating Processing>>

The partial program execution sequence generated in step S104 is described again which is as follows:

main:start→[T1]→A(1)→[T2]→B(1)→[T4]→A(1)→[T2]→B(0)→[T5]→c(1)→[T6a]→func1:start→[T8]→D(1)→[T9]→D(1)→[T9]→D(0)→[T10]→E(1)→[T11]→func1:end→[T6b]→A(0)→[T3]→main:end The execution time estimation calculating section 15 sequentially adds up each [Tx] (partial program execution time estimate value) as described above. An execution time of a program execution trace corresponding to the partial program execution sequence (an execution time estimate value of the entire target program) is therefore calculated by Expression (1.1) as follows:

$$\text{TotalTime\_1} = T1+T2+T4+T2+T5+T6a+T8+T9+T9+ T10+T11+T6b+T3 \quad (1.1)$$

Next is described another example of a branch history bit sequence assuming that the branch history bit sequence is "1001011100".

After performing the processings similar to the described above, a partial program execution sequence is generated from the branch history bit sequence as follows:

main:start→[T1]→A(1)→[T2]→B(0)→[T5]→C(0)→[T7]→A(1)→[T2]→B(0)→[T5]→c(1)→[T6a]→func1:start→[T8]→D(1)→[T9]→D(1)→[T9]→D(0)→[T10]→E(0)→[T12]→main:end An execution time (an execution time estimate value) of a program execution trace corresponding to the branch history bit sequence is therefore calculated by Expression (1.2) as follows:

$$\text{TotalTime\_2} = T1+T2+T5+T7+T2+T5+T6a+T8+T9+ T9+T10+T12 \quad (1.2)$$

(Advantageous Effects of First Embodiment)

The execution time estimate value calculated according to the first embodiment has a high precision as the partial program execution time estimate value calculated in step S102. Further, the branch history bit sequence generated in step S103 is much less in amount than a program execution instruction count. This makes it possible to take much shorter time in estimating an execution time than an actual program execution time.

In step S102, an execution time of the partial program is estimated. Even if a partial program is executed more than once in form of a loop or a conditional branch instruction in a target program, it is only necessary to calculate an execution time of the partial program just once. This makes it possible to take much shorter time in performing the execution time estimation, compared to an estimation by subjecting the target program successively from beginning to end, to a necessary processing.

(Second Embodiment)

Figure 9:
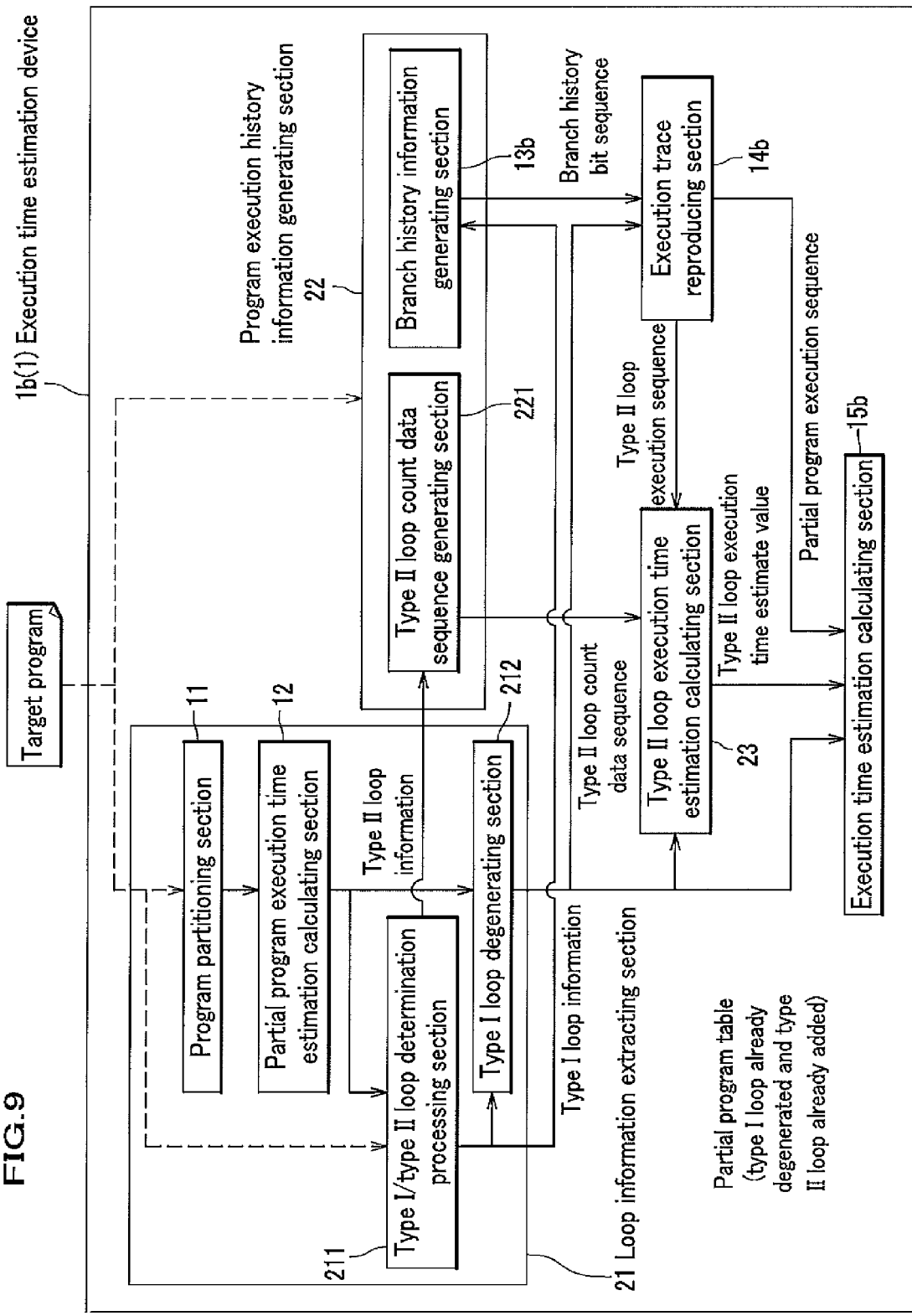
FIG. 9 A diagram illustrating a configuration example of a execution time estimation device according to a second embodiment of the present invention.

FIG. 9 is a diagram illustrating a configuration example of an execution time estimation device according to a second embodiment.

In FIG. 9, the same reference numerals are given to the components similar to those in the first embodiment, and description thereof is omitted herefrom.

The execution time estimation device 1b (1) differs from the device 1a in that the former includes: a loop information extracting section 21; a program execution history information generating section 22; and a type II loop execution time estimation calculating section 23 that estimates and calculates an execution time of a type II loop to be described later. The execution time estimation device 1b further includes: an execution trace reproducing section 14b that generates a type II loop execution sequence to be described hereinafter, in addition to the partial program execution sequence already-described in the first embodiment; and an execution time estimation calculating section 15b that estimates and calculates an execution time of the target program from a partial program execution sequence, a partial program execution time estimate value other than that of the type II loop, and a type II loop execution time estimate value to be described hereinafter.

The loop information extracting section 21 includes the program partitioning section 11 and the partial program execution time estimation calculating section 12, both of which operate similarly to those in the first embodiment. The loop information extracting section 21 further includes a type I/type II loop determination processing section 211 that: determines a type I loop and a type II loop to be described hereinafter, based on a target program; adds a type II loop ID to a partial program table; transmits type I loop information (to be described hereinafter) which is generated as a result of the determination, to the type I loop degenerating section 212; and also transmits a type II loop information (to be described hereinafter) to a type II loop count data sequence generating section 221. The loop information extracting section 21 further includes the type I loop degenerating section 212 that: performs a degeneration processing of a type I loop at a partial program table based on the type I loop information; and transmits the partial program table which has already been subjected to the type I loop generation and added with the type II loop ID, to the execution time estimation calculating section 15b.

The program execution history information generating section 22 includes: a type II loop count data sequence generating section 221 that generates a type II loop count data sequence which is a sequence of paired information of an ID of a type II loop and an iteration count of the type II loop; and a branch history information generating section 13b that generates a branch history bit sequence of a partial program other than the type II loop.

Note that the type II loop count data sequence generating section 221 and the branch history information generating section 13b are embodied when a portion of a target program (a source program) is rewritten with a prescribed function and the program execution history information generating section 22 executes the rewritten target program (to be described hereinafter in detail with reference to FIG. 15).

Note that the respective components 11, 12, 13b, 14b, 15b, 21, 22, 23, 211, 212, 221 shown in FIG. 9 are embodied when an execution time estimation program stored in the storage unit 170 of FIG. 2 or the like is loaded into the RAM 153 and the CPU 151 executes the loaded program.

Next are described a principle and an outline of processings performed in the second embodiment with reference to the target program of FIG. 4, prior to detailed description of the processings.

If a conditional branch instruction in a loop (a repetitive processing) can accurately reproduce an execution trace without storing a corresponding portion of branch history information, if conditions Z1 to Z3 shown below satisfy Z1∩(Z2∪Z3).

Condition Z1: In a loop, a conditional branch instruction such as an if-else branch instruction is not included, other than a loop continue conditional instruction. The loop continue conditional instruction used herein is a conditional branch instruction on whether exiting from the loop or not.

Condition Z2: An iteration count of the loop is a constant number of times.

Condition Z3: An iteration count of the loop is a fixed number of times.

The terms "an iteration count of the loop is a constant number of times" herein mean that a given loop count remains unchanged (or is a constant) throughout a target program.

The terms "an iteration count of the loop is a fixed number of times" herein mean that a given loop count is defined by a variable. The loop count remains unchanged in the loop but may change outside the loop.

In the example of the target program of FIG. 4, a loop corresponding to "loop 1" of function "main" (hereinafter, a loop corresponding to "loop n" will be referred to as "loop n") does not satisfy the condition Z1 (that is, an if-else branch instruction is present in the loop). Note that "loop 2" of function "func1" satisfies the condition Z1.

The condition Z2 is satisfied if "M" is a constant value in "D=i<M" of "loop 2", that is, if "M" is constant throughout the target program.

The condition Z3 is satisfied if "M" is fixed and remains unchanged during a processing of the loop, even if "M" is a variable in "D=i<M" of "loop 2" (fixed number of times: the loop unchanged).

In particular, the condition Z3 is often used in such a case as an image processing where a height or a width of an image is given as a variable. In this case, the variable and an iteration count of the loop often correspond directly to each other.

Referring to the branch history bit sequence derived from the target program of FIG. 4 (see the first embodiment), a loop count of "loop 2" is twice (see the condition variable "D").

If Z1∩Z2 is satisfied in "loop 2" (which is referred to as "type 1 loop" hereinafter), M=2 is a constant and the partial program table of FIG. 5 clearly executes "D(1)—[T9]→D(1)→[T9]→D(0)→[T10]→E" when reaching "branch (D)". Therefore, an execution time of loop 2 can be represented by Expression (2.1) as below. It is thus not necessary for the branch history information generating section 13b to register a bit sequence relevant to "branch (D)" in the branch history bit sequence.

$$T\_L2 = T9 \times 2 + T10 \qquad (2.1)$$

If Z1∩Z3 is satisfied (which is referred to as "type II loop" hereinafter), for example, the variable "M" takes a value of "M=2" immediately before "loop 2" is executed. If "M" remains unchanged during the execution of "loop 2", the type II loop count data sequence generating section 221 stores therein a type II loop ID (which is issued by the type I/type II loop determination processing section 211) and a type II loop count in the execution as a type II loop count data sequence. The type II loop execution time estimation calculating section 23 then estimates a processing time of a type II loop by, for example, Expression (2.2) as below, based on the type II loop count data sequence (of which detailed processing is to be described hereinafter).

$$T\_L2 = T9 \times M + T10 \qquad \text{Expression (2.2)}$$

At this time, "M" is a type II loop count registered as the type II loop count data sequence. Also in this case, it is not necessary for the branch history information generating section 13b to register a branch history of "branch (D)" which is a conditional branch instruction related to type II loop in the branch history bit sequence.

In the two cases described above, the branch history information in the loop is not required to be registered in the branch history bit sequence. If a program includes a large number of loops which satisfy the above-mentioned conditions (the type I loop and type II loop), it is expected that a length of the branch history bit sequence can be drastically reduced. Thus, the type I loop and type II loop are each degenerated into a single instruction, and a conditional branch instruction (a loop continue conditional instruction) thereof can be omitted from a boundary point for partitioning a partial program.

Figure 10:
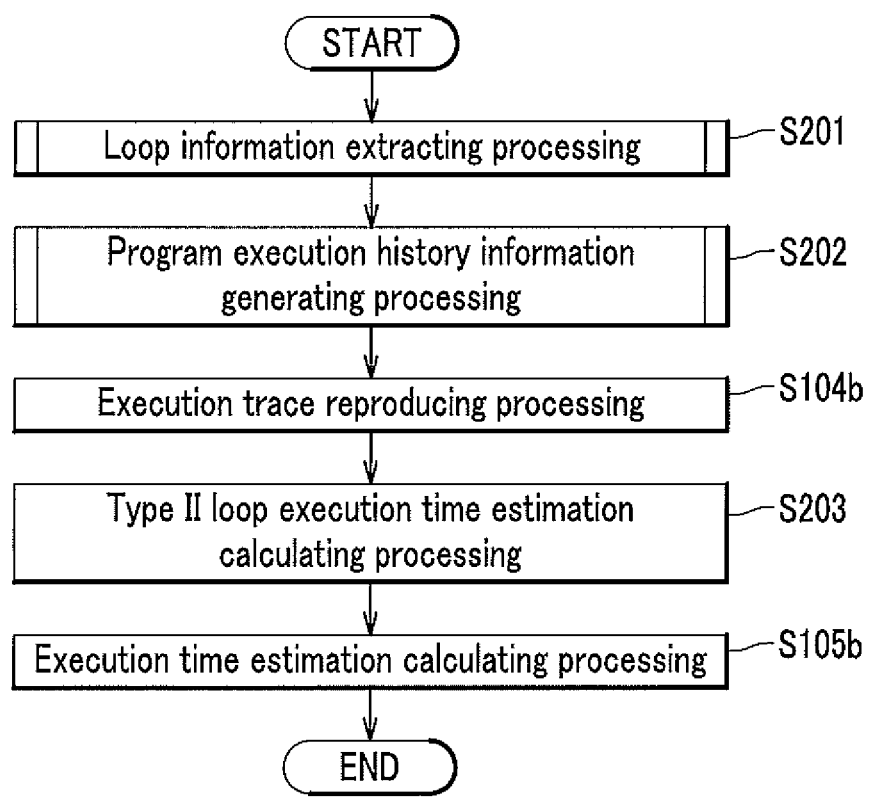
FIG. 10 A flowchart illustrating a flow of a program execution time estimation method according to the second embodiment.

Next is described a program execution time estimation method according to a second embodiment with reference to FIG. 10 as well as FIG. 9.

FIG. 10 is a flowchart illustrating a processing flow of the program execution time estimation method according to the second embodiment.

(Loop Information Extracting Processing)

The loop information extracting section 21 performs a loop information extracting processing (S201). The loop information extracting section 21 transmits type I loop information and type II loop information generated as a result of step S201, to the program execution history information generating section 22. The loop information extracting section 21 also transmits the partial program table in which, as a result of step S201, the type I loop has already been regenerated and the type II loop ID has already been written, to the execution trace reproducing section 14b, the type II loop execution time estimation calculating section 23, and the execution time estimation calculating section 15b. Although the type I loop information and the type II loop information will be described in detail later, in brief, the type I loop information is a conditional branch instruction (a loop continue conditional instruction) corresponding to a type I loop. The type II loop information is paired information on a type II loop ID and a partial program ID.

Figure 11:
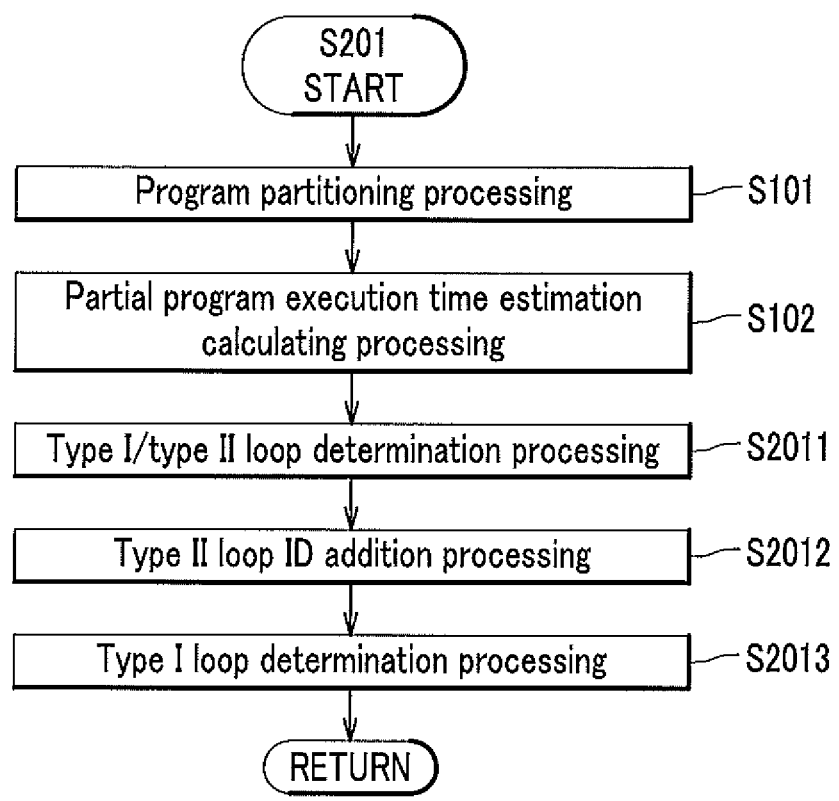
FIG. 11 A flowchart illustrating a flow of a loop information extracting processing according to the second embodiment.

Next are described details of a loop information extracting processing with reference to FIG. 11 as well as FIG. 9.

FIG. 11 is a flowchart illustrating a flow of the loop information extracting processing according to the second embodiment.

The program partitioning section 11 of the loop information extracting section 21 performs the program partitioning processing (S101). The partial program execution time estimation calculating section 12 performs the partial program execution time estimation calculating processing (S102). These processings are similar to those in the aforementioned embodiment. Thus, the same step numbers are given to the processings, and description thereof is omitted here from.

<Type I/Type II Loop Determination Processing>

The type I/type II loop determination processing section 211 of the loop information extracting section 21 then performs a type I/type II loop determination processing in which the section 211 determines whether the loop in the partial program table generated in steps S101 and S102 is a type I loop or a type II loop (S2011).

Figures 12A, 12B:
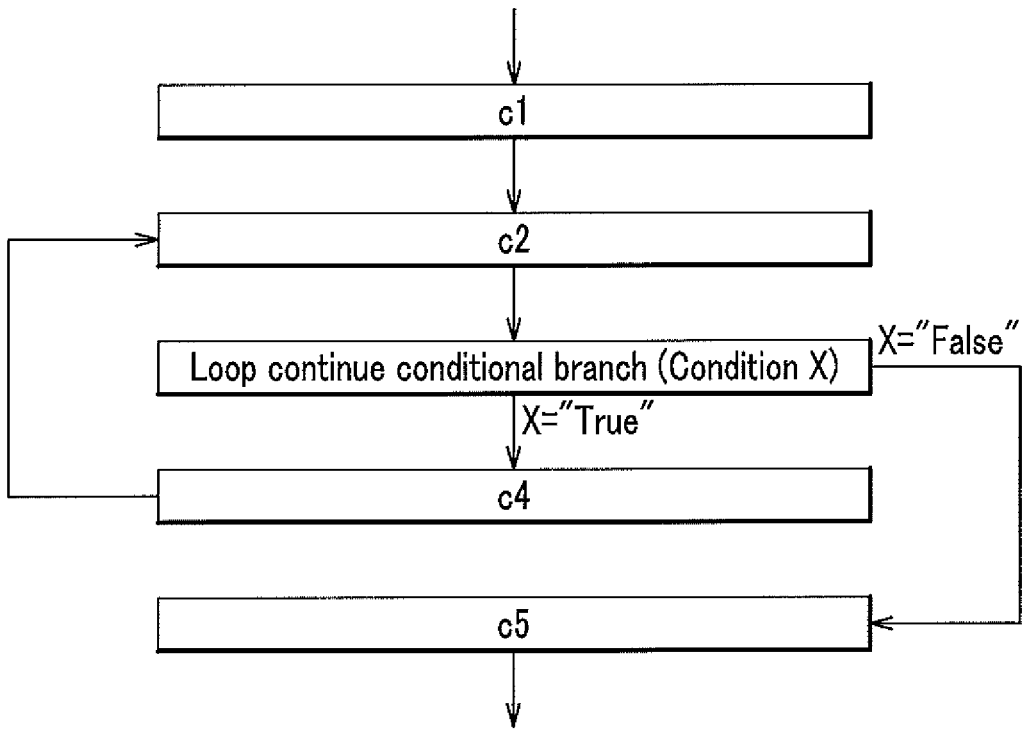
FIG. 12A is a schematic diagram illustrating a structure of a loop.
FIG. 12B is a table illustrating a configuration example of a partial program generated from a loop having the structure shown in FIG. 12A.

Next is described the type I/type II loop determination processing with reference to FIG. 12A and FIG. 12B.

FIG. 12A and FIG. 12B are diagrams each regarding to a loop in a target program. FIG. 12A is a schematic diagram illustrating a structure of a loop. FIG. 12B is a table illustrating a configuration example of a partial program generated from a loop having the structure shown in FIG. 12A.

"WW" and "YY" in FIG. 12B each represent a given processing. The condition "X" represents a condition on whether or not a loop is continued (a loop continue conditional instruction). "c1", "c2", "c3", "c4", and "c5" each represents a processing code which is a conditional branch instruction, a junction (a code point which is reachable from a plurality of codes using a go to statement or a loop), or a code block not including a function call instruction. Code blocks "c1", "c2", "c3", "c4", and "c5" may be an "empty" code block which does not include any instruction. Note that the terms "ID", "partial program leading instruction", and "partial program end instruction" are similar to those in the partial program table in the aforementioned embodiment, and description thereof is omitted herefrom.

In the partial program "14" of FIG. 12B, both the partial program leading instruction and the partial program end instruction are "branch (X)". This means that, in a loop, the same conditional branch instruction is repeated. That is, the type I/type II loop determination processing section 211 can distinguish a loop by determining whether or not the same conditional branch instruction is present at the "partial program leading instruction" and the "partial program end instruction".

The type I/type II loop determination processing section 211 distinguishes a type I loop and a type II loop by determining whether an input dependent variable to be described hereinafter is a loop invariant variable to be described hereinafter or a reduction variable.

Herein, for example, if a loop continue conditional instruction is "D=i<M", the input dependent variable is "i" and "M".

The loop invariant variable is described herein taking the structure of the target program of FIG. 12A as an example. The loop invariant variable is a variable whose value is not updated by the codes "c2" and "c4" in the loop. That is, if the codes "c2" and "c4" do not include any assignment expression with regard to the variable "M", such as "M= . . . ", the type I/type II loop determination processing section 211 identifies the variable "M" as a loop invariant variable.

The reduction variable is a variable which is initialized into a constant value prior to a start of a loop, and at the same time, such that only an assignment expression in form of "variable=variable op (constant value)" (op: binary operator) is present in a code in the loop. Description is made assuming that there is a variable "g" used in the loop of FIG. 12A (not shown in FIG. 12). If "g" is initialized into a constant value in the code "c1" prior to a start of the loop, and only an assignment expression in form of "g=g op (constant value)" with respect to the variable "g" is present in the code "c2" or "c4", the type I/type II loop determination processing section 211 determines the variable "g" as a reduction variable.

The input dependent variable, the loop invariant variable, and the reduction variable are variables obtained when the type I/type II loop determination processing section 211 searches a target program.

If all input dependent variables in a loop are a "reduction variable" or a "constant", the type I/type II loop determination processing section 211 determines that the loop is a type I loop. On the other hand, if all input dependent variables in a loop are a "reduction variable" or a "loop invariant variable", the type I/type II loop determination processing section 211 determines that the loop is a type II loop. Note that a loop which is neither the type I loop nor the type II loop is expressed as a repeated partial program.

(Type II Loop ID Adding Processing)

Referring back to FIG. 11, after step S2011, the type I/type II loop determination processing section 211 performs a type II loop ID addition processing in which the section 211 issues a type II loop ID to the partial program which has been determined as a type II loop in step S2011, and adds the issued type II loop ID to a field of a type II loop ID of a corresponding partial program of the partial program table (S2012). Note that the type I/type II loop determination processing section 211 assigns a loop ID number of "0" to a partial program other than the type II loop. At this stage, the partial program table is, for example, a table shown in FIG. 13.

FIG. 13 is an example of a partial program table used in the second embodiment.

The partial program table of FIG. 13 differs from the partial program table of FIG. 5 in that that the former has a field for storing a type II loop ID.

As described above, the field of the type II loop ID has a type II loop ID if a loop is a type II loop. On the other hand, the field of the type II loop ID has "0" if a loop is a partial program other than a type II loop (that is, including a type I loop).

The type I/type II loop determination processing section 211 (FIG. 9) transmits the type I loop information which is a conditional branch instruction corresponding to the type I loop, to the type I loop degenerating section 212 (FIG. 9) and the branch history information generating section 13b (FIG. 9). The type I/type II loop determination processing section 211 also transmits the type II loop information which is paired information of a type II loop ID and a partial program ID to the type II loop count data sequence generating section 221.

<Type I Loop Degeneration Processing>

Referring back to FIG. 11, after step S2012, the type I loop degenerating section 212 of the loop information extracting section 21 degenerates the type I loop in the partial program table transmitted from the type I/type II loop determination processing section 211 as shown in FIG. 14 (S2013). Note that the "degeneration" used in the second to sixth embodiments means that two rows in a partial program table are combined into one row based on a prescribed rule.

FIG. 14A and FIG. 14B are diagrams illustrating degeneration of a type I loop. FIG. 14A and FIG. 14B shows a partial program table before and after the degeneration, respectively. Note that the partial program table shown in FIG. 14A and FIG. 14B has a configuration similar to the partial program shown in FIG. 13. However, in order to explain degeneration of a type I loop, "0" is filled in all fields of the "type II loop ID".

Referring to FIG. 14A, the "partial program leading instruction" and the "partial program end instruction" of the partial program "9" have the same conditional instruction. As described above, a partial program in which the "partial program leading instruction" and the "partial program end instruction" have the same conditional instruction forms a loop. The partial program "9" is therefore a loop. Further, the conditional branch instruction thereof (that is, branch (D)) in the type I loop information shows that the loop is a type I loop.

The type I loop degenerating section 212 then reduces the partial program "9" and the partial program "10" which has a conditional branch instruction same as that of the partial program. "9" in the "partial program leading instruction" of FIG. 14A, into a partial program "9'" of FIG. 14B. That is, the program execution history information generating section 22 makes the partial program end instruction" branch (D)" in the partial program "9" of FIG. 14A, into "Reduce_L2" and also makes the partial program leading instruction" branch (D) [F]" in the partial program "10", into Reduce_L2. An execution time estimate value of the reduced partial program ID "9'" according to Expression (2.1) is stored.

The type I loop degenerating section 212 transmits the partial program table to which the type II loop ID has been added in step S2012 and of which type I loop has been degenerated in step S2013, to the execution trace reproducing section 14 and the execution time estimation calculating section 15.

(Program Execution History Information Generating Processing)

Referring back to FIG. 10, after step S201, a program execution history information generating processing is performed using the target program inputted via the input section 156 (FIG. 2) and the type I loop information and the type II loop information inputted from the loop information extracting section 21 (S202).

Figure 15:
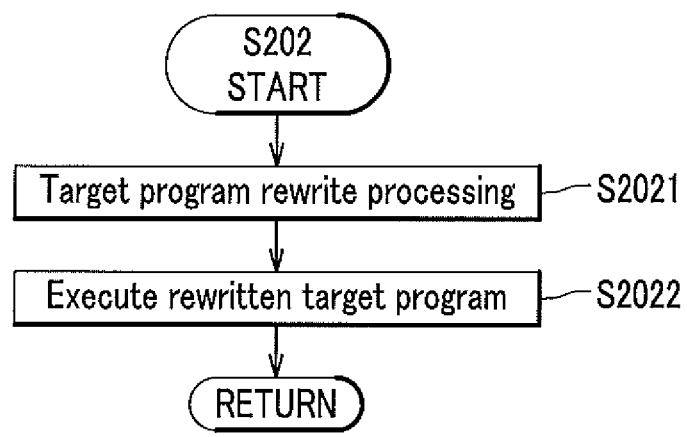
FIG. 15 A flowchart illustrating a flow of a program execution history information generating processing according to the second embodiment.

Next is described the program execution history information generating processing with reference to FIG. 15 as well as FIG. 9.

FIG. 15 is a flowchart illustrating a flow of the program execution history information generating processing according to the second embodiment.

<Target Program (Source Program) Rewrite Processing>

The program execution history information generating section 22 performs a target program rewrite processing as shown in FIG. 16A to 16C (S2021). FIGS. 16A to 16C are diagrams illustrating an example of rewriting a target program for generating a type II loop count data sequence. FIG. 16A and FIG. 16B illustrate the target program before and after rewritten, respectively. FIG. 16C illustrates a function for generating a type II loop count data sequence and a branch history bit sequence.

That is, the program execution history information generating section 22 rewrites a loop continue conditional instruction (an underlined portion) of a type II loop in FIG. 16A into an underlined portion in FIG. 16B. The underlined portion of FIG. 16B is a function shown in FIG. 16C.

The function shown in FIG. 16C operates as follows. After a loop count of a type II loop is counted, if the counted type II loop count is identical to an immediately-preceding type II loop count which has already been registered in a type II loop count data sequence and has a type II loop ID identical to that for the counted type II loop count (that is, the two loop counts remain unchanged), the function shown in FIG. 16C skips a write of the counted loop count into the type II loop count data sequence (to be described in detail hereinafter).

After step S2031, the program execution history information generating section 22 executes the target program which has been rewritten as shown in FIG. 16B (S2032). This activates the type II loop count data sequence generating section 221 shown in FIG. 9. The actual type II loop count data sequence generating section 221 generates a type II loop count data sequence.

In the type II loop count data sequence, a type II loop iteration count is registered which is an iteration count of a targeted type II loop as a sequence of information paired with a loop ID ("01"), such as, for example, [01, 250]. [01, 250] represents that a type II loop having the type II loop ID of "01" is repeated 250 times.

An initial value of the iteration count of a type II loop in a type II loop count data sequence is "−1". This is because the iteration count has not yet been counted, and the initial value is temporarily given as an impossible value.

<<Details of Type II Loop Count Data Sequence Generation>>

Next is described a specific example of generating a type II loop count data sequence in the type II loop count data sequence generating section 221.

It is herein assumed that three type II loops (with type II loop IDs: "01", "02", and "03") are present in the target program.

The type II loop count data sequence generating section 221 is assumed to generate a type II loop data sequence of "[01, 5], [02, 8], [02, 8], [01, 5], [03, 10], [03, 10], [01, 5], [02, 4], [03, 20], [01, 5], [02, 8]". Herein, data (such as [01, 5]) constituting the type II loop count data sequence is referred to as a type II loop count data. The type II loop count data means [type II loop ID, type II loop count].

The type II loop count data sequence generating section 221 then performs a processing as below to the type II loop count data sequence so as to reduce redundancy and data volume of the type II loop count data sequence. That is, if a type II loop count counted in a type II loop count data sequence is identical to a type II loop count registered in an immediately-preceding type II loop count data sequence having a type II loop ID identical to that for the counted type II loop count (that is, the two successive type II loop counts remain unchanged), the type II loop count data sequence generating section 221 performs a processing of skipping a write of the counted type II loop count data into the type II loop count data sequence. Note that, in order to simplify explanation, description herein is made using a processing of deleting an appropriate type II loop count data from a type II loop count data sequence.

The type II loop count data sequence described above is taken as an example for description as follows:

[01, 5], [02, 8], {[02, 8], [01, 5]}, [03, 10], {[03, 10], [01, 5]}, [02, 4], [03, 20], {[01, 5]}, [02, 8]

Herein, type II loop count data which are put in braces are to be deleted. For example, the type II loop count data [02, 8] which is situated in the third position in the type II loop count data sequence has a type II loop count identical to that of the type II loop count data which is situated in the second position (which is an immediately-preceding type II loop count data with respect to a type II loop ID "02") and is to be deleted.

A type II loop count data [01, 5] which is situated in the fourth position has a type II loop count identical to that of the type II loop count data which is situated in the first position (which is an immediately-preceding type II loop count data with respect to a type II loop ID "05") and is to be deleted.

A type II loop count data [02, 8] which is situated in the last position has a type II loop count different from that of an immediately-preceding type II loop count data [02, 2] (which is situated in the eighth position) with respect to the type II loop ID "02" and is thus not to be deleted.

As a result of the above-mentioned processing, the type II loop count data sequence generating section 221 finally outputs a type II loop count data sequence as follows:

[01, 5], [02, 8], [03, 10], [02, 4], [03, 20], [02, 8]

As described above, for purposes of explanation, the type II loop count data sequence generating section 221 once creates a type II loop count data sequence and then deletes the type II loop count data if the type II loop count data has a type II loop ID and a type II loop count identical to those of an immediately-preceding type II loop count data. Actually, however, the type II loop count data sequence generating section 221 determines, during a course of generating a type II loop count data sequence, whether or not a type II loop count of interest is identical to an immediately-preceding type II loop count which has a type II loop ID identical to that of the type II loop count of interest. If identical, the type II loop count data sequence generating section 221 skips a write of the type II loop count of interest in the type II loop count data sequence.

In addition to the type II loop count data sequence generation, the function shown in FIG. 16C also generates a branch history bit sequence. At this time, the function shown in FIG. 16C operates such that the function skips a storage of a branch history bit of a loop continue conditional instruction of a type II loop as a branch history bit sequence. More specifically, the program execution history information generating section 22 executes the rewritten target program of FIG. 16B. This activates the branch history information generating section 13b of FIG. 9. The activated branch history information generating section 13b generates a branch history bit sequence excluding a type II loop. That is, the branch history bit sequence generated by the branch history information generating section 13b has a smaller number of bits because a bit relevant to a type II loop is omitted. The branch history information generating section 13b activated by the function shown in FIG. 16C also generates a branch history bit sequence in which a bit corresponding to a conditional branch instruction included in the type I loop information transmitted from the type I/type II loop determination processing section 211 is omitted.

After step S202, the program execution history information generating section 22 transmits the generated branch history bit sequence to the execution trace reproducing section 14b and also transmits the type II loop count data sequence to the type II loop execution time estimation calculating section 23.

(Execution Trace Reproducing Processing)

Returning to description of FIG. 10, after step S202, the execution trace reproducing section 14b performs an execution trace reproducing processing based on the partial program table acquired from the loop information extracting section 21 and the branch history bit sequence acquired from the branch history information generating section 13b (S104b) and thereby generates a type II loop execution sequence and a partial program execution sequence.

Next is described a type II loop execution sequence generating processing performed by the execution trace reproducing section 14b according to the second embodiment. In the execution trace reproducing processing according to the second embodiment, a type II loop execution sequence is generated in addition to a partial program execution sequence.

The execution trace reproducing section 14b generates a partial program execution sequence in a manner similar to that in the aforementioned embodiment, while the execution trace reproducing section 14b reads a branch history bit sequence generated by the program execution history information generating section 22. Actually, as described above, the execution trace reproducing section 14b generates a partial program execution sequence and, in parallel, sequentially transmits a partial program execution time estimate value to the execution time estimation calculating section 15b, similarly to the aforementioned embodiment.

At this time, the execution trace reproducing section 14b: references the partial program table (FIG. 13) generated in the loop information extracting section 21 sequentially from the top; extracts a partial program having a value of 1 or more in the field of type II loop ID (that is, a partial program having a loop continue conditional instruction of a type II loop as a leading instruction); and adds the extracted type II loop ID to an end of a type II loop execution sequence. The execution trace reproducing section 14b: does not add an execution time estimate value of a partial program which is a type II loop, to a partial program execution sequence (that is, does not transmit the execution time estimate value to the execution time estimation calculating section 15b); automatically transfers to a partial program which is to be reached after the type II loop is terminated: and adds the partial program to the partial program execution sequence.

Next are described specific steps of the execution trace reproducing processing according to the second embodiment with reference to the example of FIG. 13. Note that the partial program execution sequence in this embodiment is similar to that in the first embodiment, and description thereof is omitted herefrom.

The execution trace reproducing section 14b, for example, references the partial program table sequentially from the top in a manner similar to step S104 in the first embodiment. At the time when the reference reaches the partial program "9" in the example of FIG. 13, the execution trace reproducing section 14b adds an appropriate type II loop ID of "02" to an end of the "type II loop execution sequence". The execution trace reproducing section 14b then transfers to a partial program "11" or "12", which is to reach after completion of the type II loop ID "02". Whether the section 14b transfers to the partial program "11" or "12" is determined based on a subsequent branch history bit to be read from a branch history bit sequence.

More specifically, at the time when the execution trace reproducing section 14b reaches the partial program "9" whose type II loop ID is "02", the execution trace reproducing section 14b transfers to a condition in which the partial program "9" in the partial program table terminates (that is, to the partial program "10" (branch (D) [F]). The execution trace reproducing section 14b then adds a type II loop ID of the partial program "9" to an end of the type II loop execution sequence. Note that, if a condition in a partial program leading instruction is the same as a condition in a partial program end instruction, as in the partial program "9" as described above, it means that the partial program forms a loop. The execution trace reproducing section 14b then transfers to the partial program "11" or "12" having a partial program end instruction (branch (E)) of the partial program "10" as a partial program leading instruction. The execution trace reproducing section 14b determines whether the section 14b transfers to either the partial program "11" or "12", based on the branch history bit sequence.

The processing as described above makes it possible to obtain advantageous effects as follows. If the branch history information generating section 13b generates a branch history bit sequence without recognizing a type II loop, a bit sequence corresponding to the type II loop will be "111 . . . 0 . . . ". If such a branch history bit sequence is generated, the execution trace reproducing section 14b repeatedly transfers to the partial program "9", which is disadvantageous. However, according to the execution trace reproducing processing in the second embodiment (S104b), the execution trace reproducing section 14b can realize processings at high speed by skipping a transfer as many as a loop count of a partial program (herein, the partial program "9" in the example) corresponding to a type II loop.

(Type II Loop Execution Time Estimation Calculating Processing)

Referring back to FIG. 10, after step S104b, the type II loop execution time estimation calculating section 23 performs a type II loop execution time estimation calculating processing based on the type II loop count data sequence acquired from the type II loop count data sequence generating section 221, the type II loop execution sequence acquired from the execution trace reproducing section 14b, and the partial program execution time estimate value in the partial program table outputted from the loop information extracting section 21 (S203). At this time, a partial program execution time estimate value of a corresponding type II loop is extracted from the partial program table by referencing a type II loop ID in the type II loop count data sequence. Note that the type II loop execution time estimation calculating processing is performed in parallel with the program execution time estimation calculating processing in step S105b.

Next is described the type II loop execution time estimation calculating processing more specifically.

The type II loop execution time estimation calculating section 23 sequentially reads the type II loop count data sequence acquired from the type II loop count data sequence generating section 221 from the beginning. Herein, a type II loop count data which is being read is referred to as a "currently-referenced type II loop count data" hereinafter.

The type II loop execution time estimation calculating section 23 then reads the type II loop execution sequence (a sequence of type II loop ID numbers in order of execution) generated by the execution trace reproducing section 14b sequentially from the beginning. Herein, a type II loop ID number in the type II loop execution sequence which is currently being read is referred to as a "current type II loop ID" in the type II loop execution sequence hereinafter.

A "currently-read type II loop ID" is shifted to a subsequent type II loop ID each time the type II loop execution time estimation calculating section 23 calculates an execution time of each loop in the type II loop execution sequence. Meanwhile, in this case, a "currently-referenced type II loop count data" either shifts or does not shift to a subsequent type II loop count data. More specifically, if the "currently-read type II loop ID" is identical to a type II loop ID of the "currently-referenced type II loop count data", the "currently-referenced type II loop count data" is shifted to a subsequent type II loop count data. If not identical, not shifted. More specific steps will be described later with reference to FIG. 17.

If a type II loop ID of the "currently-referenced type II loop count data" is identical to the "currently-read type II loop ID", the type II loop execution time estimation calculating section 23: calculates a type II loop execution time estimate value using a partial program execution time estimate value in the partial program table according to Expression (2.2); stores the type II loop execution time estimate value and a type II loop ID corresponding thereto as paired information in a type II loop execution time table not shown; and transmits the calculated type II loop execution time estimate value to the execution time estimation calculating section 15b. The type II loop execution time table used herein means a table for temporarily storing the calculated type II loop execution time in the RAM 153 (FIG. 2) or the like. In the example of FIG. 13, if the type II loop count is "twice", the type II loop execution time estimation calculating section 23 calculates the type II loop execution time estimate value by T9×2+T10.

If a type II loop ID of the "currently-referenced type II loop count data" is not identical to a type II loop ID of the "currently-read type II loop ID", the type II loop execution time estimation calculating section 23 takes a value registered in the "type II loop execution time table" as a type II loop execution time.

The type II loop execution time estimation calculating section 23 then shifts a reference position in the type II loop count data sequence of the "currently-referenced loop count data" by one position backward. That is, the type II loop execution time estimation calculating section 23 reads a type II loop count data subsequent to the "currently-referenced loop count data" in the type II loop count data sequence, as a currently-referenced loop count data and calculates a type II loop execution time estimate value in a similar manner. The type II loop execution time estimation calculating section 23 repeats the calculating processing of a type II loop execution time estimate value until the section 23 completes reading of all type II loop count data sequences. Next is described a specific example of a type II loop execution time estimation calculating processing.

<<Details of Type II Loop Execution Time Estimation Calculating Processing>>

Next is described in detail the processing performed by the type II loop execution time estimation calculating section 23 (FIG. 9) with reference to FIG. 17.

Assume a case where: the above-described type II loop count data sequences, [01, 5], [02, 8], [03, 10], [02, 4], [03, 20], and [02, 8] are inputted in the type II loop execution time estimation calculating section 23 from the type II loop count data sequence generating section 221 (FIG. 9); and a type II loop execution sequence "01, 02, 02, 01, 03, 03, 01, 02, 03, 01, 02" is inputted from the execution trace reproducing section 14b (FIG. 9).

As described above, in a type II loop count data sequence, with respect to loops having the same type II loop ID, if a type II loop count is identical to that of an immediately-preceding type II loop count data, such a processing is performed that a write of the type II loop count data into the type II loop count data sequence is skipped. However, in a type II loop execution sequence, such a processing is not performed. This makes a difference between an order of the type II loop count data sequence and that in the type II loop IDs in the type II loop execution sequence.

Therefore, the type II loop execution time estimation calculating section 23 performs a processing as shown in FIG. 17 for calculating a type II loop execution time estimate value.

FIG. 17 includes, from left to right, "currently-read type II loop ID", "currently-referenced type II loop count data", "determination", "type II loop execution time estimate value", and "subsequent currently-referenced type II loop count data". The "determination" used herein indicates whether the currently-read type II loop ID is identical to a type II loop ID in the currently-referenced type II loop count data.

First is described a processing in a row 601. The type II loop execution time estimation calculating section 23 acquires an initial type II loop ID "01" in the type II loop execution sequence "01, 02, 02, 01, 03, 03, 01, 02, 03, 01, 02" and takes the acquired type II loop ID "01" as a currently-read type II loop ID. The type II loop execution time estimation calculating section 23 further acquires an initial type II loop count data [01, 5] in the type II loop count data sequence [01, 5], [02, 8], [03, 10], [02, 4], [03, 20], [02, 8] and takes the acquired type II loop count data [01, 5] as a currently-referenced type II loop count data.

Because the type II loop ID "01" in the currently-referenced type II loop count data is identical to the currently-read type II loop ID "01" (see the field of "determination"), the type II loop execution time estimation calculating section 23 calculates a type II loop execution time estimate value "5×t1" using a type II loop count "5" of the type II loop count data [01, 5] and a partial program execution time estimate value of a type II loop in the partial program table. The term "t1" used herein means a partial program execution time estimate value of the type II loop ID "01". Note that the type II loop execution time estimate value in FIG. 17 is herein obtained by calculating M×t (wherein M is a type II loop count and t is a corresponding partial program execution time estimate value) in order to simplify description. Actually, however, the type II loop execution time estimate value needs to be calculated using a partial program execution time estimate value when a corresponding partial program leading instruction is "True" and a partial program execution time estimate value when a partial program leading instruction is "False", as shown in Expression (2.2).

The type II loop execution time estimation calculating section 23 then associates the calculated type II loop execution time estimate value "5×t1" with the currently-read type II loop ID "01", writes the calculated value "5×t1" in the type II loop execution time table, and transmits the calculated value "5×t1" to the execution time estimation calculating section 15b (FIG. 9). The execution time estimation calculating section 15b adds up the type II loop execution time estimate values in an order that the values are transmitted from the type II loop execution time estimation calculating section 23.

Since the currently-read type II loop ID "01" is identical to a type II loop ID in the currently-referenced type II loop count data, the type II loop execution time estimation calculating section 23 updates a subsequent currently-referenced type II loop count data to [02, 8] which is a subsequent type II count data.

The type II loop execution time estimation calculating section 23 then performs a processing in a row 602. Herein, the processing in the row 601 is similarly applied to the type II loop ID "02", and description thereof is omitted herefrom.

In the processing in the row 602, the currently-read type II loop ID "02" is identical to a type II loop ID in the currently-referenced type II loop count data. The type II loop execution time estimation calculating section 23 thus updates the currently-referenced type II loop count data to a subsequent type II loop count data [03, 10.

In a processing in a row 603, the type II loop execution time estimation calculating section 23 acquires a type II loop ID "02" which is situated at the third position in the type II loop execution sequence "01, 02, 02, 01, 03, 03, 01, 02, 03, 01, 02" and takes the acquired type II loop ID "02" as a currently-read type II loop ID.

Since the currently-read type II loop ID "02" is not identical to the type II loop ID "03" in the currently-referenced type II loop count data [03, 10], no data is written in the aforementioned type II loop count data.

The type II loop execution time estimation calculating section 23 then reads the type II loop execution time estimate value ("8×t2") of the type II loop ID "02" from the type II loop execution time table and transmits the read type II loop execution time estimate value "8×t2" to the execution time estimation calculating section 15b. The execution time estimation calculating section 15b adds up the type II loop execution time estimate values in an order that they are transmitted from the type II loop execution time estimation calculating section 23.

Since the currently-read type II loop ID "02" is not identical to the type II loop ID "03" in the currently-referenced type II loop count data [03, 10, the type II loop execution time estimation calculating section 23 updates the currently-read type II loop ID "02" to a subsequent type II loop ID "01" but does not update the currently-referenced type II loop count data [03, 10].

Also in a row 604, the currently-read type II loop ID "01" is not identical to a type II loop ID "03" in the currently-referenced type II loop count data [03, 10], the type II loop execution time estimation calculating section 23 reads a type II loop execution time estimate value "5×t1" from the type II loop execution time table by performing a processing similar to that in the 603 to the currently-read type II loop ID "01", and transmits the read type II loop execution time estimate value "5×t1" to the execution time estimation calculating section 15b.

In a row 605, the currently-read type II loop ID "03" is identical to a type II loop ID "03" in the currently-referenced type II loop count data [03, 10]. The type II loop execution time estimation calculating section 23 thus performs a processing similar to those in the rows 601, 602, to the type II loop ID "03". Since the currently-read type II loop ID "03" is identical to the type II loop ID "03" in the currently-referenced type II loop count data [03, 10], the type II loop execution time estimation calculating section 23 updates the currently-referenced type II loop count data to a subsequent type II loop count data [02, 4].

In rows 606 and 607, processings similar to those in the aforementioned rows are performed. The type II loop execution time estimation calculating section 23 transmits obtained type II loop execution time estimate values to the execution time estimation calculating section 15b.

(Execution Time Estimation Calculating Processing)

After completion of the processing of step S203, the execution time estimation calculating section 15b sequentially adds up a partial program execution sequence other than a type II loop count sequence (actually, a partial program execution time estimate value sequentially transmitted in order of partial program execution sequence) transmitted from the execution trace reproducing section 14b, and a type II loop execution time estimate value transmitted from the type II loop execution time estimation calculating section 23. The execution time estimation calculating section 15b thereby performs an execution time estimation calculating processing in which the section 15b calculates an estimate value of an execution time of the target program other than a type II loop (S105b). The execution time estimation calculating processing other than that of the type II loop is similar to that in the first embodiment. The execution time of a type II loop is calculated by adding up type II loop execution time estimate values which are sequentially transmitted from the type II loop execution time estimation calculating section 23. The execution time estimation calculating section 15b sums up the added type II loop execution time estimate value and the execution time estimate value other than that of the type II loop, to thereby finally calculate the execution time of the target program. Note that the execution time estimation calculating section 15b may calculate the execution time of the target program in such a manner that the partial program execution time estimate values other than that of the type II loop count sequence and the type II loop execution time estimate values are individually adds up, and the two values are finally added up.

(Advantageous Effects of Second Embodiment>

There is a strong correlation between a total number of instruction steps for executing a program and a branch history bit sequence length. For example, if a target program requires a great deal of execution time, a branch history bit sequence length thereof becomes lengthy. However, the processings of steps S201, step S202, and step S203 in the second embodiment make it possible to reduce the branch history bit sequence length. This enables to store a complete execution history of an entire program which runs over a long period of time, which is not possible according to the first embodiment.

Note that a calculation amount in the execution time estimation calculating section 15b is basically proportional to a branch history bit sequence length. Reduction in the branch history bit sequence length according to the second embodiment is thus directly linked to reduction of a calculation time in an execution time estimation calculating processing of the target program.

That is, if a target program runs over a long period of time, a time required for estimating an execution time of the target program can be reduced. This makes it possible to estimate and calculate the execution time of the target program with high accuracy and without taking an immense amount of time in upgrading a processor architecture design or a dedicated compiler and also to efficiently evaluate effect of the design upgrade.

Further, in a specific type II loop, there are many cases where, even if a processing interval of the loop appears repeated times, a type II loop count thereof remains unchanged. The processing interval of a loop herein means an interval in which a loop is repeated as much as the loop count and then exits the loop.

For example, in a moving image processing such as MPEG (Motion Picture Experts Group), a processing to the same image size is executed repeated times (however, it is often the case that an image size data is not a constant value but a variable). According to the second embodiment, it is possible to reduce a time required for estimating an execution time of such a moving image processing program.

Further, even if a loop has a difficulty in being integrated into and dealt with as one partial program (type II loop) because there is a possibility that an iteration count of the loop is changed outside the loop, an execution time of the loop can be estimated based on a sequence of the iteration count or the like, separately from the other partial programs. This makes it possible to deal with such a loop as one partial program and to estimate an execution time of a program in a short processing time.

(Third Embodiment: Configuration)

Figure 18:
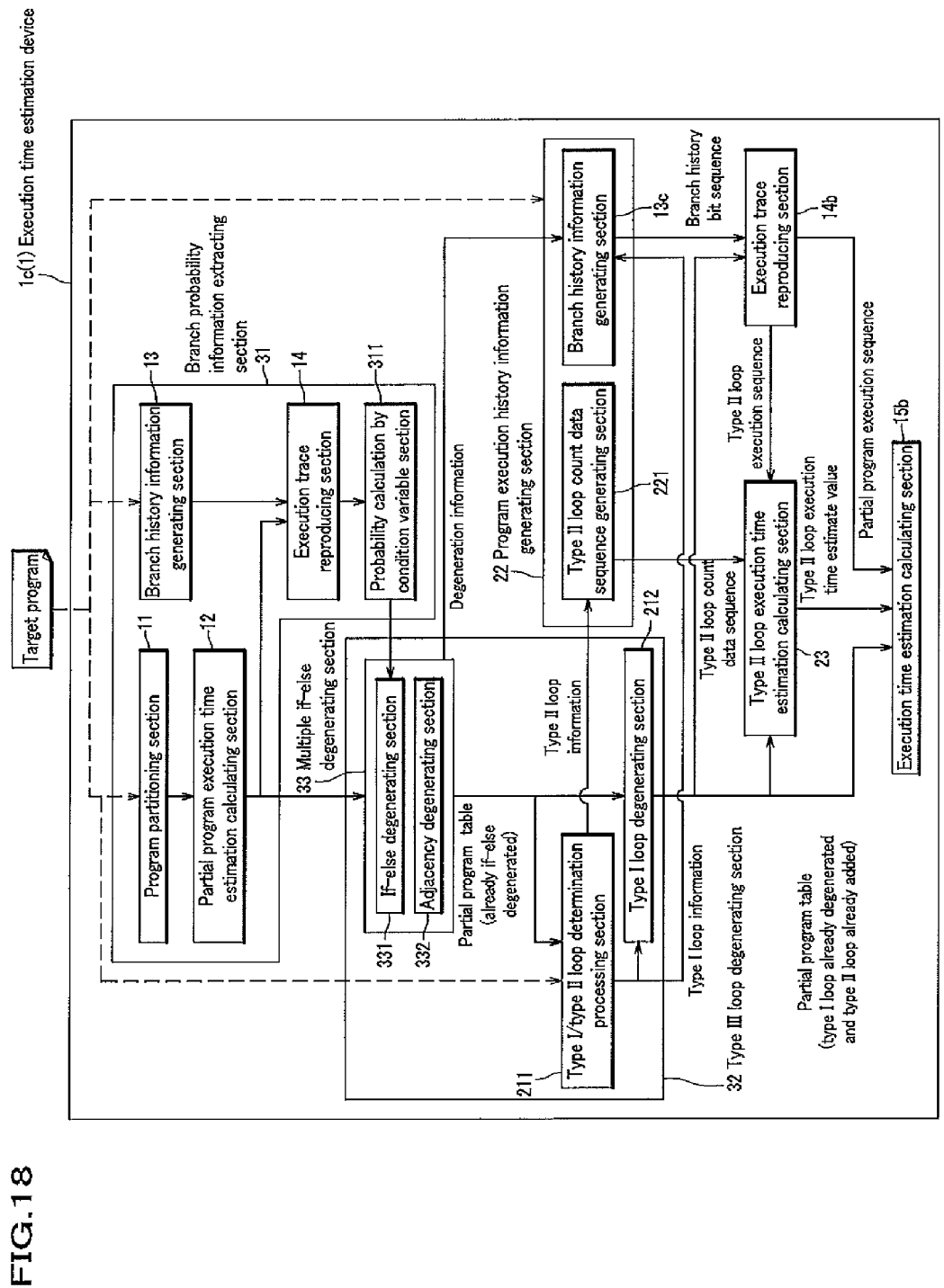
FIG. 18 A diagram illustrating a configuration example of a execution time estimation device according to a third embodiment of the present invention.

FIG. 18 is a configuration example of an execution time estimation device according to a third embodiment.

In FIG. 18, the same reference numerals are given to the components similar to those in the aforementioned embodiments, and description thereof is omitted herefrom.

An execution time estimation device 1c (1) includes: a branch probability information extracting section 31 that calculates a branch probability (to be described hereinafter) of an if-else branch instruction; and a type III loop degenerating section 32 that degenerates a type III loop (to be described hereinafter). Herein, the program execution history information generating section 22, the execution trace reproducing section 14b, the execution time estimation calculating section 15b, and the type II loop execution time estimation calculating section 23 have functions similar to those in the aforementioned embodiment. Thus, the same reference numerals are given to these components and description thereof is omitted herefrom. Note that, in addition to performing the skips described in the aforementioned embodiments, the branch history information generating section 13c also skips an addition of a branch history bit corresponding to a partial program degenerated by the multiple if-else degenerating section 33, to a branch history bit sequence, based on degeneration information (to be described hereinafter) transmitted from the multiple if-else degenerating section 33.

The branch probability information extracting section 31 includes: the program partitioning section 11, the partial program execution time estimation calculating section 12, the branch history information generating section 13, and the execution trace reproducing section 14. These components operate similarly to those in the aforementioned embodiment. Thus, the same reference numerals are given to the components and description thereof is omitted herefrom.

The branch probability information extracting section 31 also includes a probability calculation by condition variables section 311 that calculates a branch probability by condition variables which is a probability that each if-else branch instruction is "True" or "False".

The type III loop degenerating section 32 includes the type I/type II loop determination processing section 211 and the type I loop degenerating section 212. The sections 211, 212 work similarly to those in the aforementioned processing, and thus, description thereof is omitted herefrom. The type III loop degenerating section 32 also includes a multiple if-else degenerating section 33 that: performs an if-else degenerating processing (to be described hereinafter) in a partial program table; transmits a partial program which has already been if-else degenerated, to the type I/type II loop determination processing section 211 or the type I loop degenerating section 212; and also transmits degeneration information which is paired information of a degenerated partial program ID and an if-else branch instruction corresponding thereto, to the branch history information generating section 13c.

The multiple if-else degenerating section 33 includes an if-else degenerating section 331 that performs an if-else degenerating processing to be described later, and an adjacency degenerating section 332 that performs an adjacency degenerating processing also to be described later.

Note that respective components 11, 12, 13, 13c, 14, 14b, 15b, 22, 23, 31, 32, 33, 211, 212, 221, 311, 331, and 332 shown in FIG. 18 are embodied when an execution time estimation program stored in the storage unit 170 of FIG. 2 or the like is loaded into the RAM 153 and the loaded program is executed by the CPU 151.

Next is described an outline of processings in the third embodiment, prior to detailed description of the processings.

If a target program includes a loop having an if-else branch instruction, the loop does not satisfy the condition Z1 described in the second embodiment. Even if a loop count thereof takes a constant value (the condition Z2) or a fixed value (the condition Z3), the type I loop degenerating processing and the type II loop degenerating processing according to the second embodiment cannot be directly applied to the loop.

However, if a method to be described later is used, a branch probability of each if-else branch instruction can be calculated. If the branch probability is used for calculating a statistical predicted value of a processing time of an entire if-else branch block, a case may be found to which a branch degeneration processing of a loop in the second embodiment is applicable. This can enhance effects of reducing a branch history bit sequence length in the second embodiment. Note that a loop which does not meet the condition Z1 but meet the condition Z2 or the condition Z3 is hereinafter referred to as a "type III loop". How to specifically realize the method is described below.

Figure 19:
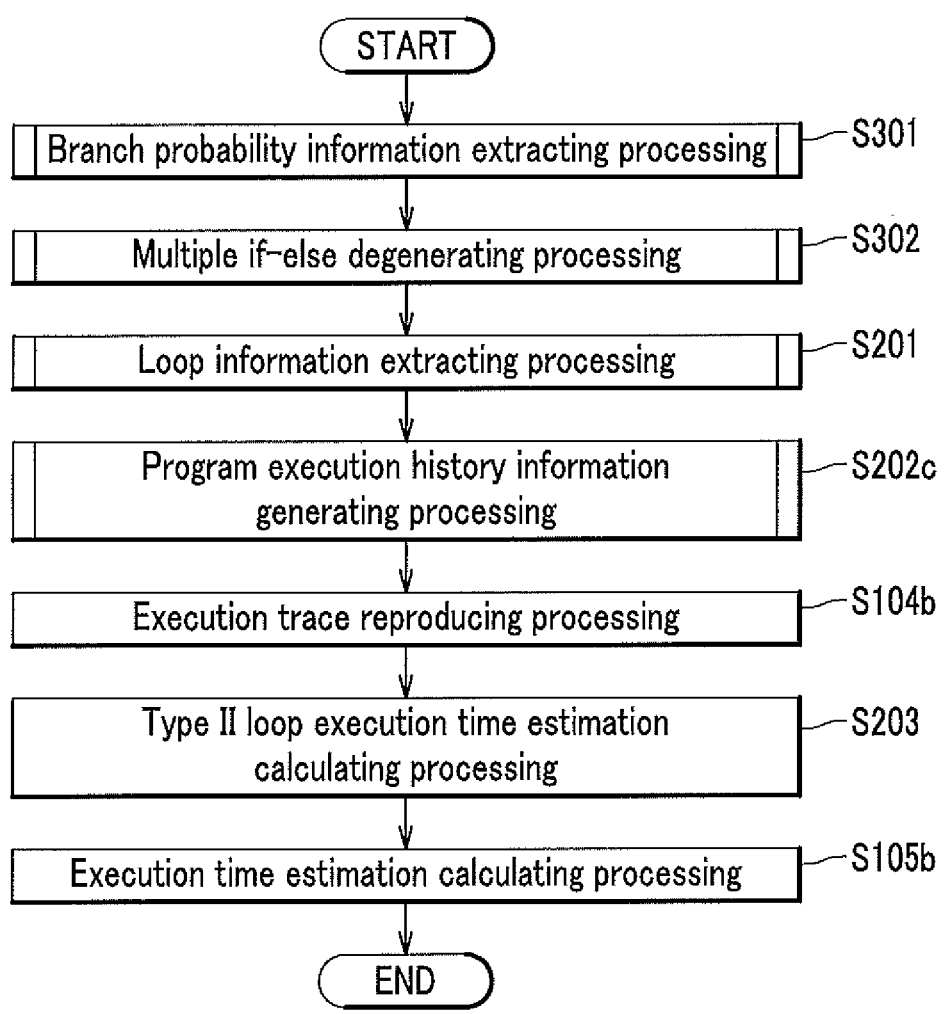
FIG. 19 A flowchart illustrating a flow of a program execution time estimation method according to the third embodiment.

Next is described a program execution time estimation method according to the third embodiment with reference to FIG. 19 as well as FIG. 18.

FIG. 19 is a flowchart illustrating a flow of the program execution time estimation method according to the third embodiment.

(Branch Probability Information Extracting Processing)

The branch probability information extracting section 31 performs a branch probability information extracting processing in which branch probabilities of all if-else branch instructions are calculated (S301).

Figure 20:
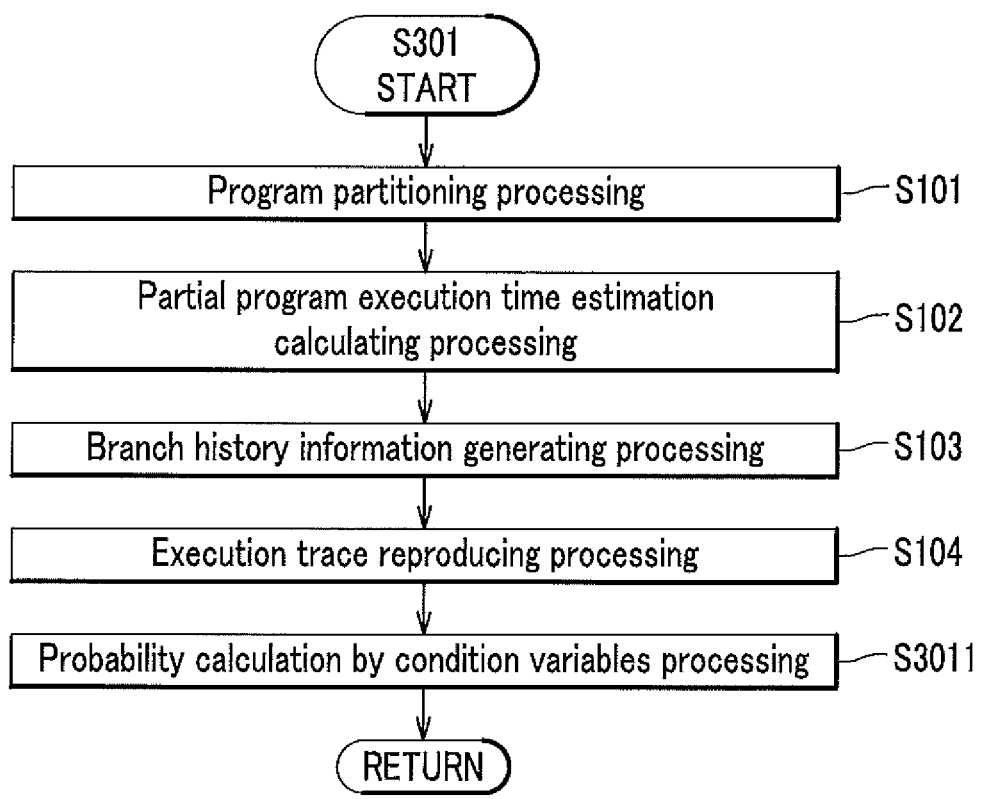
FIG. 20 A flowchart illustrating a flow of a branch probability information extracting processing according to the third embodiment.

Next are described in detail steps of the branch probability information extracting processing with reference to FIG. 20 as well as FIG. 18.

FIG. 20 is a flowchart illustrating a flow of the branch probability information extracting processing according to the third embodiment.

The program partitioning section 11 of the branch probability information extracting section 31 performs the program partitioning processing (S101). The partial program execution time estimation calculating section 12 performs the partial program execution time estimation calculating processing (S102). The branch history information generating section 13 of the branch probability information extracting section 31 performs the branch history information generating processing (S103). The execution trace reproducing section 14 performs the execution trace reproducing processing (S104). The processings in steps S101 to S104 are similar to those in the aforementioned embodiments. Thus, the same step numbers are given to the processings, and a detailed description thereof is omitted herefrom. As a result of the execution trace reproducing processing performed in step S104, a partial program execution sequence is generated.

It is assumed herein that the following partial program execution sequence which has also been used in the first embodiment is generated.

main:start→[T1]→A(1)→[T2]→B(1)→[T4]→A(1)→[T2]→B(0)→[T5]→C(1)→[T6a]→func1:start→[T8]→D(1)→[T9]→D(1)→[T9]→D(0)→[T10]→E(1)→[T11]→func1:end→[T6b]→A(0)→[T3] →main:end <Probability Calculation by Condition Variables Processing>

The probability calculation by condition variables section 311 performs a probability calculation by condition variables processing in which the section 311 calculates a probability by condition variables based on the generated partial program execution sequence according to steps to be described hereinafter (S3011).

The probability calculation by condition variables section 311 extracts each branch history bit in a partial program execution sequence and a condition variable corresponding thereto, to thereby generate a sequence as follows:

A(1) B(1) A(1) B(0) C(1) D(1) D(1) D(0) E(1) A(0)

The probability calculation by condition variables section 311 calculates a branch probability by individually adding up a frequency of "True" and "False" of each condition variable by condition variables.

Branch probabilities by condition variables (branch probabilities of all conditional branch instructions) which are calculated taking the above-mentioned partial program execution sequence as an example are as follows:

$p(A)=2/3$ ("True"=twice, "False"=once)

$p(B)=1/2$ ("True"=once, "False"=once)

$p(C)=1/1$ ("True"=once, "False"=none)

$p(D)=2/3$ ("True"=twice, "False"=once)

$p(E)=1/1$ ("True"=once, "False"=none)

Note that how to calculate a branch probability is not limited to the above-described configuration. A branch probability may be calculated by using a known method in which a calculation section directly calculates a branch probability.

FIG. 21 is a diagram illustrating a target program including another example of a type III loop. FIG. 22 is a diagram illustrating an example of a partial program table generated from the target program of FIG. 21.

Herein, if focusing on a branch (J) and a branch (H), a probability that a condition "J" is true (branch (J)"T") is expressed by "p(J)" ($0 \leq p(J) \leq 1$). A probability that a condition "H" is true (branch (H) "T") is expressed by "p(H)" ($0 \leq p(H) \leq 1$). Those probabilities may also be referred to as branch probability by condition variable information.

(Multiple If-Else Degenerating Processing)

Referring back to FIG. 19, after step S301, the multiple if-else degenerating section 33 performs a multiple if-else degenerating processing (S302).

Figure 23:
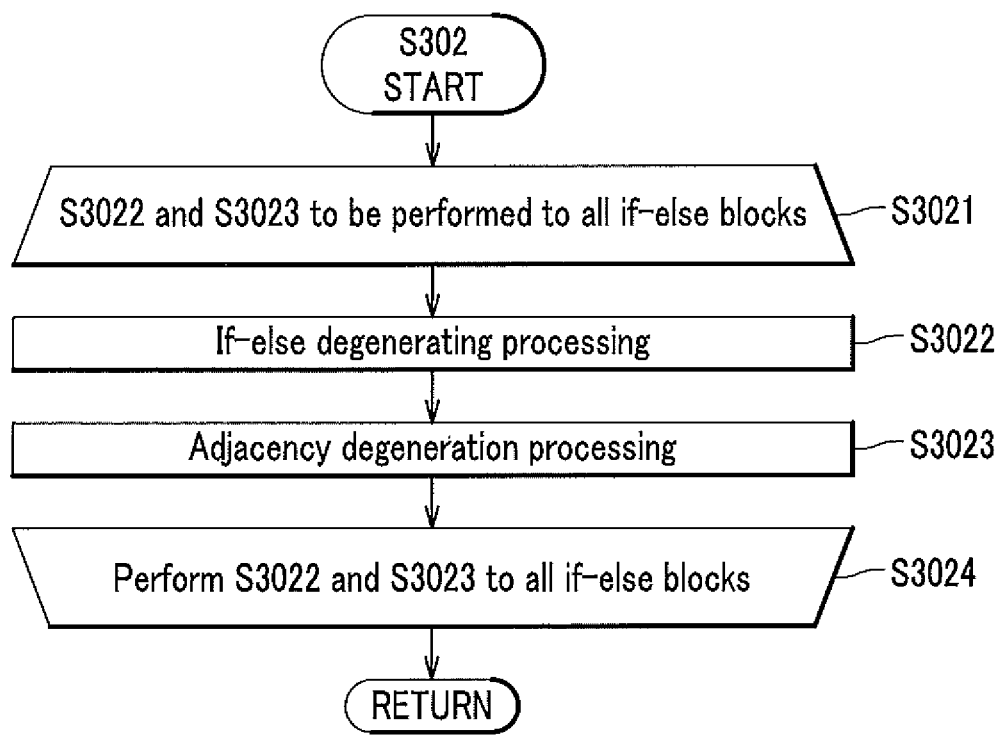
FIG. 23 A diagram illustrating an example of a multiple if-else degenerating processing according to the third embodiment.

Next is described in detail the multiple if-else degenerating processing with reference to FIG. 23 as well as FIG. 18.

FIG. 23 is a flowchart illustrating the multiple if-else degenerating processing according to the third embodiment.

In step S302, processings of step S3022 and step S3023 are performed to all if-else blocks in the partial program table (S3021).

That is, the if-else degenerating section 331 performs an if-else degenerating processing (S3022). The adjacency degenerating section 332 performs an adjacency degenerating processing (S3023). The multiple if-else degenerating section 33 then repeats, as described above, the processings of step S3022 and step S3023 to all if-else blocks in the partial program table (S3024). Although details will be described later, the if-else degenerating processing used herein means a processing in which a partial program relevant to an if-else block is degenerated by combining a plurality of rows each having the same if-else branch instruction in a "partial program leading instruction" and also having the same "partial program end instruction", into one. The adjacency degenerating processing used herein means a processing in which two adjacent partial programs not including an if-else branch instruction are degenerated, by degenerating a partial program whose partial program end instruction is not an if-else branch instruction, with another partial program whose partial program leading instruction is identical to the partial program end instruction.

The multiple if-else degenerating section 33 transmits the partial program table which has been subjected to those degeneration processings to the type I/type II loop determination processing section 211 or the type I loop degenerating section 212. The multiple if-else degenerating section 33 also transmits the degeneration information which is paired information of a degenerated partial program ID and an if-else branch instruction corresponding thereto, to the branch history information generating section 13c which is activated by the program execution history information generating section 22.

Next is described the multiple if-else degenerating processing further specifically with reference to an example of a target program of FIG. 24 and a partial program table corresponding to the example of the target program of FIG. 24.

FIG. 24 is a diagram illustrating an example of a target program including a type III loop. FIG. 25 a diagram illustrating an example of a partial program table generated from the target program of FIG. 24.

Note that the partial program table of FIG. 25 is a table generated by the branch probability information extracting section 31.

A "loop 3" of FIG. 24 is a loop corresponding to a type III loop (wherein, a variable "K" takes a constant value or is invariant during an execution of the "loop 3"). If a probability that the condition "H" in an if-else branch instruction positioned in the "loop 3" is true (T) is h(=p(H)) ($0 \leq h \leq 1$), an execution time of the loop 3 is approximated by Expression (3.1). The probability "h" can be calculated in the branch probability information extracting processing as described above.

$$T\_L3 = (T21 + h \times T23 + (1-h) \times T24) \times K + T22 \quad \text{Expression (3.1)}$$

Expression (3.1) assumes that an execution time of executing a "loop 3" once is equal to a probability-weighted sum (h×T23+(1−h)×T24) by simply adding up: an execution time "T21" of a partial program which is executed at any time when the "loop 3" of FIG. 24 is repeated; an execution time "T23" if the condition "H" is "True" (with the probability "h"); and an execution time "T24" if the condition "H" is "False" (with the probability "1−h"). If the loop count "K" is a constant value, a loop execution time estimate calculated value of the loop 3 can be regarded as a constant value at this stage (that is, the execution time estimation device 1c regards the loop of interest as a type I loop after this processing). If "K" is a variable outside the loop but is a fixed value inside the loop, a loop execution time estimate value can be calculated using the processings in the second embodiment (that is, the execution time estimation device 1c regards the loop of interest as a type II loop after this processing).

More specifically, the multiple if-else degenerating section 33 performs the if-else degenerating processing and the adjacency degenerating processing under each condition (the conditions "H" and "J" of FIG. 22).

The type III loop degenerating section 32 references the partial program table of FIG. 22 and searches therefrom partial programs which have the same conditional branch instruction as a partial program leading instruction and also have the same partial program end instructions. For example, the if-else degenerating section 331 finds partial programs "45" and "46" each of which has a condition "J" (branch (J)) as the partial program leading instruction and also has a condition "G" (branch (G)) in the partial program end instruction. In this case, a total execution time "T45'" of the partial programs "45" and "46" is represented by Expression (3.2) as shown below. Expression (3.2) is obtained by applying Expression (3.1) to the condition "J" and using: a probability "j (=p(J))" of the condition "J" acquired from the branch probability information extracting section 31; an estimated execution time "T45" of the partial program "45"; and an execution time "T46" of the partial program ID "46".

$$T45' = j \times T45 + (1-j) \times T46 \qquad \text{Expression (3.2)}$$

A partial program ID "45'" which is obtained by degenerating the partial programs "45" and "46" into a new partial program "45'" is stored in the field of partial program execution time estimate value". In response to this, the if-else degenerating section 331 generates a partial program table reflecting that the partial programs "45" and "46" of FIG. 26A have been subjected to the if-else degenerating processing.

The if-else degenerating section 331 then replaces a partial program end instruction "branch (J)" of a partial program ID "43" in FIG. 22, with "Reduce_B_J" as shown in FIG. 26A so as to indicate that the "branch (J)" is a degenerated instruction.

FIGS. 26A to 26D are diagrams each illustrating an example of a partial program table subjected to a degeneration processing. FIG. 26A illustrates a result of performing an if-else degenerating processing to "J". FIG. 26B illustrates a result of performing an adjacency degenerating processing to the result shown in FIG. 26A. FIG. 26C illustrates a result of performing an if-else degenerating processing to "H". FIG. 26D illustrates a result of performing an adjacency degenerating processing to the result shown in FIG. 26C.

The adjacency degenerating section 332 performs an adjacency degenerating processing. The adjacency degenerating processing used herein means, as described above, a processing in which a partial program whose partial program end instruction is not an if-else branch instruction is degenerated with another partial program whose partial program leading instruction is identical to the partial program end instruction of the former.

For example, in FIG. 26A, a partial program end instruction of the partial program ID "43" is identical to a partial program leading instruction of the partial program ID "45'". The type III loop degenerating section 32 thus performs an adjacency degenerating processing to partial programs corresponding to the IDs 43, 45', to thereby create a degenerated partial program "43'" shown in FIG. 26B.

The if-else degenerating section 331 similarly performs an if-else degenerating processing to a condition "H", to thereby create the partial program table of FIG. 26C. The adjacency degenerating section 332 then performs an adjacency degenerating processing to the resultant partial program, to thereby create the partial program table of FIG. 26D.

At this time, if "K" of Expression "g=i<K" in a loop continue conditional instruction of a "loop 6" of FIG. 21 is a constant number of times, the partial program table of FIG. 26D can be taken as a type I loop (can be degenerated into a type I loop). If "K" is a fixed number of times, the partial program table of FIG. 26D can be taken as a type II loop (can be degenerated into a type II loop).

Returning to FIG. 19, processings after step S302 are similar to those in the aforementioned embodiments, and description thereof is omitted herefrom. Note that, in a program execution history information generating processing in step S202c, a target program is rewritten, similarly to the second embodiment. A function to be inserted at this time will not output a branch history bit corresponding to the partial program degenerated in step S302 or step S201, using the degeneration information transmitted from the multiple if-else degenerating section 33, or the type I loop information and the type II loop information transmitted from the type I/type II loop determination processing section 211.

(Advantageous Effects of Third Embodiment>

According to the third embodiment, a statistical estimate value of a processing time of an entire if-else block is calculated using a branch probability of each if-else branch instruction. This can enhance effects of reducing a branch history bit sequence length in the second embodiment.

(Fourth Embodiment: Configuration)

Figure 27:
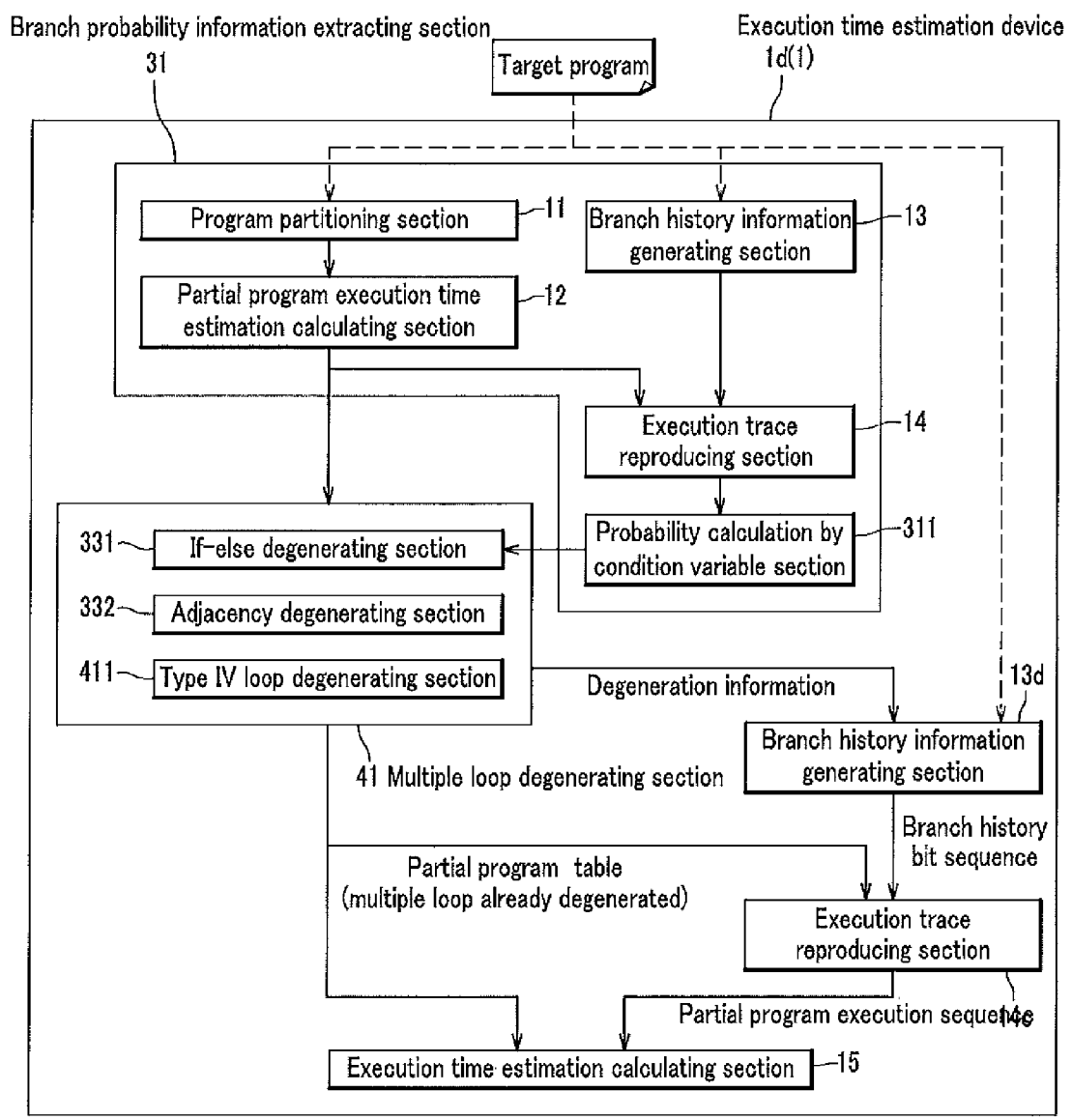
FIG. 27 A diagram illustrating a configuration example of a execution time estimation device according to a fourth embodiment.

FIG. 27 is a diagram illustrating a configuration example of an execution time estimation device according to a fourth embodiment.

An execution time estimation device 1d (1) includes the branch probability information extracting section 31, an execution trace reproducing section 14c, and the execution time estimation calculating section 15. These components operate similarly to those in the aforementioned embodiments. Thus, the same reference numerals are given to the components and description thereof is omitted herefrom.

The execution time estimation device 1d further includes: a multiple loop degenerating section 41 that executes a degeneration processing of a multiple loop; and a branch history information generating section 13d that generates a branch history bit sequence other than a partial program degenerated by the multiple loop degenerating section 41.

The multiple loop degenerating section 41 includes the if-else degenerating section 331 and the adjacency degenerating section 332. These components operate similarly to those in the aforementioned embodiments. Thus, the same reference numerals are given to the components and description thereof is omitted herefrom. The multiple loop degenerating section 41 further includes a type IV loop degenerating section 411 that performs a degeneration processing of a type IV loop (to be described hereinafter). Note that the multiple loop degenerating section 41 transmits the degeneration information which is paired information of a degenerated partial program ID and a conditional branch instruction corresponding thereto (a degenerated if-else branch instruction and a loop continue conditional instruction), to the branch history information generating section 13*d*.

Note that the respective components 11, 12, 13, 13*d*, 14, 15, 31, 41, 311, 331, 332, and 411 shown in FIG. 27 are embodied when an execution time estimation program stored in the storage unit 170 shown in FIG. 2 or the like is loaded into the RAM 153 and the CPU 151 executes the loaded program.

Next is described an outline of processings in the fourth embodiment, prior to detailed description of the processings.

There are some cases where a multiple loop structure cannot be degenerated, if the third embodiment is applied just as it is.

Figures 28, 29:
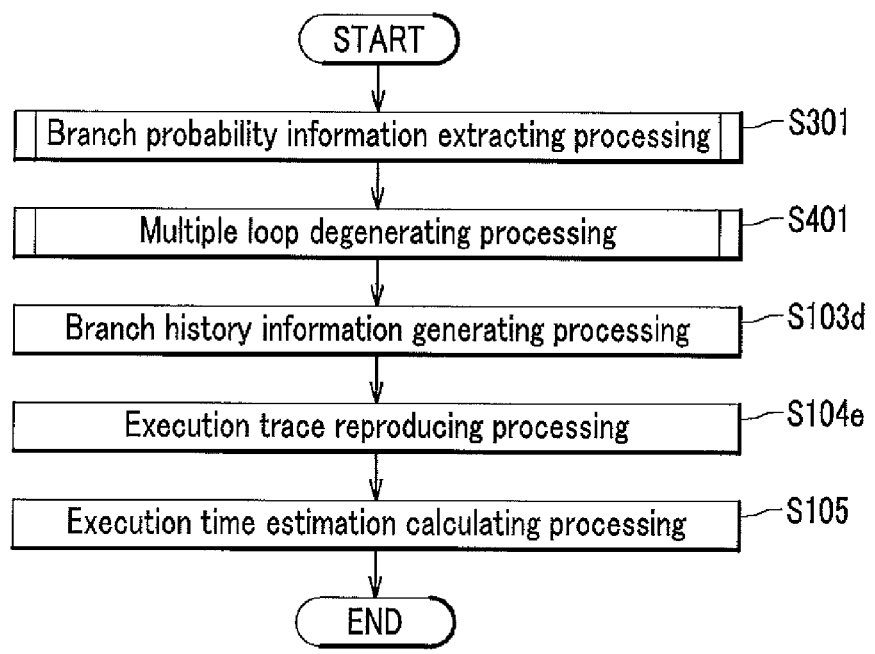
FIG. 28 A diagram illustrating an example of a target program including a type IV loop according to the fourth embodiment FIG. 29 A flowchart illustrating a flow of a program execution time estimation method according to the fourth embodiment.

For example, a case where a "loop 5" which is a type III loop is included in a "loop 4" as shown in a target program of FIG. 28.

FIG. 28 is a diagram illustrating an example of a target program including a type IV loop (to be described hereinafter).

Description is made assuming a case where a variable "Y" which determines an iteration count of the "loop 5" is updated (where there is a possibility that the "Y" changes during execution of the "loop 4"), as shown in the target program of FIG. 28. In order to estimate an execution time of the "loop 4", information on a value of the "Y" before and after the update (a type II loop count data sequence of the "loop 5") is necessary. Therefore, the double loop as a whole cannot be degenerated even if techniques described in the first to third embodiments are used.

Under the following conditions (condition X1∩condition X2), however, an "average" execution time of even a multiple loop can be accurately estimated.

Condition X1: Only one "loop continue conditional instruction" is present in a loop.

Condition X2: A loop block does not include a loop which does not meet the condition X1.

The "loop continue conditional instruction" used herein means a branch where it is determined whether or not a loop processing is continued. For example, in FIG. 28, a condition "P" is only one loop continue conditional instruction for the "loop 4". Further, a condition "Q" is only one loop continue conditional instruction for the "loop 5".

An example to which the condition X1 is not applied is a case where a "for" loop or a "while" loop includes therein a "break" statement or a "return" statement having, for example, a termination condition.

The condition X2 refers to that a loop block can include a loop which satisfies the condition X1 and serves as a condition for handling a multiple loop structure. A loop which satisfies "condition X1∩condition X2" is hereinafter referred to as a "type IV loop".

Next is described a program execution time estimation method according to the fourth embodiment with reference to FIG. 29 as well as FIG. 27.

FIG. 29 is a flowchart illustrating a flow of the program execution time estimation method according to the fourth embodiment.

(Probability Information Extracting Processing)

The branch probability information extracting section 31 performs the branch probability information extracting processing which has been described in third embodiment (S301). Step S301 is similar to the processing described in the third embodiment, and description thereof is omitted herefrom. The multiple loop degenerating section 41 then performs a multiple loop degenerating processing (S401).

(Multiple Loop Degenerating Processing)

Figure 30:
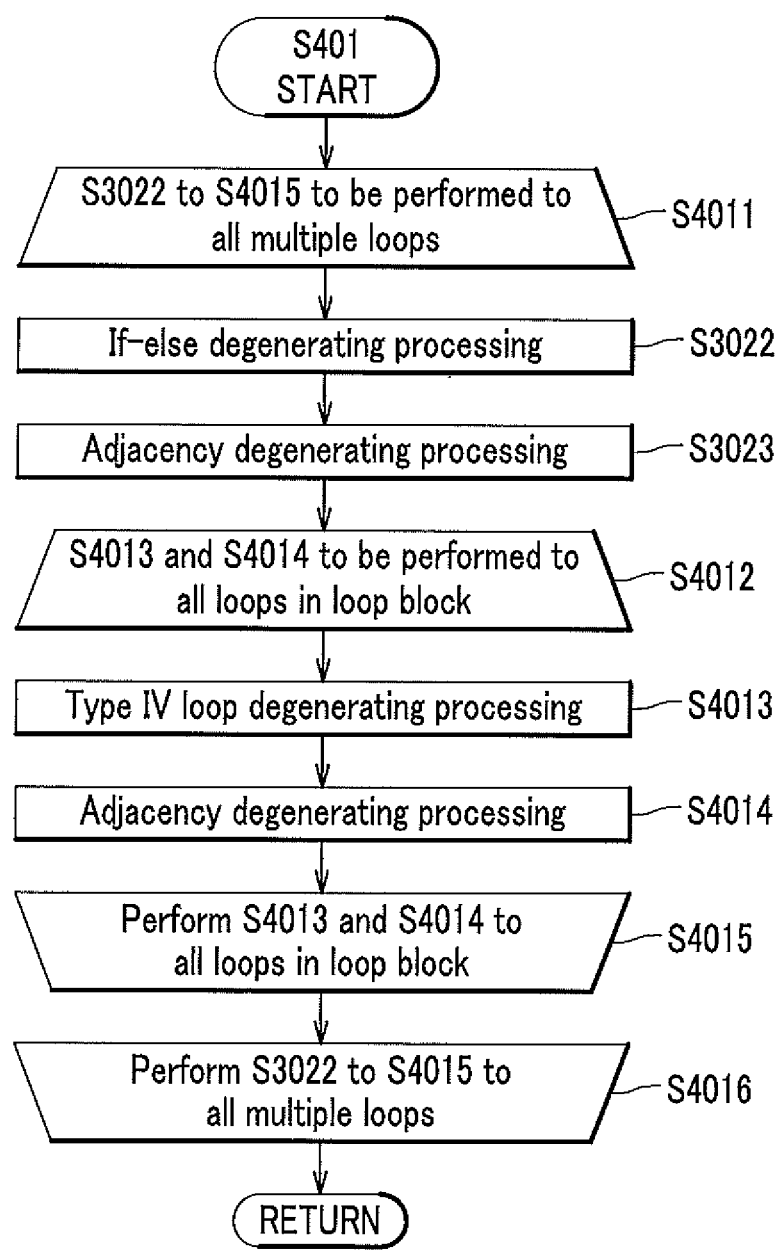
FIG. 30 A flowchart illustrating a flow of a multiple loop degenerating processing according to the fourth embodiment.

Next is described in detail the multiple loop degenerating processing with reference to FIG. 30 as well as FIG. 27.

FIG. 30 is a flowchart illustrating a flow of the multiple loop degenerating processing according to the fourth embodiment. Note that, in FIG. 30, the same step numbers are given to the processings similar to those in the aforementioned embodiments, and description thereof is omitted herefrom. Note that the multiple loop degenerating section 41 operates similarly to the aforementioned type I/type II loop determination processing section 211 (FIG. 9) and thus skips following processings performed in steps S4011 to S4016, if a loop is determined as a type II loop.

The multiple loop degenerating section 41 performs processings of steps S3022 to S4015, to all multiple loops in the partial program table (S4011).

The if-else degenerating section 331 of the multiple loop degenerating section 41 performs the if-else degenerating processing (S3022). The adjacency degenerating section 332 of the multiple loop degenerating section 41 performs an adjacency degenerating processing (S3023). The processings of steps S3022 and S3023 are similar to those described in the third embodiment.

The multiple loop degenerating section 41 then performs processings of steps S4013 and S4014 to all loops in a target loop block in order of loop position from innermost to outermost (S4012).

The type IV loop degenerating section 411 of the multiple loop degenerating section 41 performs a type IV loop degenerating processing in which a type IV loop as described above is degenerated (S4013). The adjacency degenerating section 332 of the multiple loop degenerating section 41 performs an adjacency degenerating processing to a partial program table to which the type IV loop degeneration processing has been performed (S4014). Details of the processings of steps S4013 and S4014 will be explained hereinafter. As described above, the multiple loop degenerating section 41 performs the processings of steps S4013 and S4014, to all loops in the loop block in the order of loop position from innermost to outermost (S4015).

After the processings of steps S4013 and S4014 are completed to all of the loops in the loop block in the order of loop position from innermost to outermost, the multiple loop degenerating section 41 repeats the processings of steps S3022 to S4015, to all of the multiple loops in the partial program table (S4016).

After the processings are completed, the multiple loop degenerating section 41 transmits degeneration information which is paired information of a degenerated partial program ID and an if-else branch instruction or a loop continue conditional instruction corresponding thereto, to the branch history information generating section 13*c*.

<<Details of Multiple Loop Degenerating Processing>>

Next are described details of the multiple loop degenerating processing using the target program of FIG. 28 and the partial program table of FIG. 31 corresponding to the target program of FIG. 28.

As described above, the variable "X" is constant during execution of the loop 4, and the variable "Y" is also constant during execution of the loop 5.

FIG. 32 shows conditions "S", "Q", and "R" and respective branch probabilities thereof in tabular form. Average iteration counts of the "loop 4" and the "loop 5" in FIG. 28 can be respectively calculated by Expressions (4.1) and (4.2) as follows:

$$C\_L4\text{mean}=s/(1-s) \qquad (4.1)$$

$$C\_L5\text{mean}=q/(1-q) \qquad (4.2)$$

A probability s (=p(S)) used herein means a probability that the condition "S" is "True". A probability q (=p (Q)) means a probability that the condition "Q" is "True".

Expressions (4.1) and (4.2) are based on that the conditions "P" and "Q" are loop continue conditional instructions. That is, if a frequency that a continue condition of a given loop is "True" is referred to as the number of times "ST", and if "False", the number of times "SF", the ST is a total number of times that the loop is repeated in an entire program, and the SF is the number of times of exiting from the loop in the entire program (that is, the number of executions (iteration count) of the loop). An average iteration count of the loop is therefore represented by ST/SF. This is equal to a ratio of a probability of "True" to that of "False" of the continue conditions of the loop. Thus, by using a partial program execution time estimate value shown in FIG. 31, an execution time estimate value T_L4 of the "loop 4" (an average execution time of the loop) and an execution time estimate value T_L5 of the "loop 5" can be respectively calculated by Expressions (4.3) and (4.4) as follows:

$$T\_L4=(T31+T\_L5\text{mean})\times C\_L4\text{mean} \qquad (4.3)$$

$$T\_L5=(T33+r\times T35+(1-r)\times T36)\times C\_L5\text{mean} \qquad (4.4)$$

A probability r (=p(R)) used herein means a probability that a condition "R" is "True".

With a type IV loop average execution time calculating processing as described above, an entire multiple loop including an if-else block can be degenerated into one partial program.

<<Details of Multiple Loop Degenerating Processing>>

Next is described the multiple loop degenerating processing (S401) in further detail with reference to FIG. 31 to FIG. 34D.

The if-else degenerating section 331 of the multiple loop degenerating section 41 performs the if-else degenerating processing as described above. The adjacency degenerating section 332 then performs the adjacency degenerating processing, to thereby degenerate a partial program table.

That is, the if-else degenerating section 331 sequentially detects partial programs whose condition variables in respective "partial program leading instructions" are the same each other, from the partial program table of FIG. 31 acquired from the branch probability information extracting section 31 in order from bottom to top of the partial program table (in the example of FIG. 31, partial programs "35" and "36" are detected first). The if-else degenerating section 331 then performs an if-else degenerating processing of the partial programs "35" and "36" in a manner similar to that described in the third embodiment, to thereby generate a partial program table shown in FIG. 33A.

FIG. 33A and FIG. 33B are diagrams illustrating examples of a partial program table which is subjected to an if-else degenerating processing and an adjacency degenerating processing, respectively. FIG. 33A illustrates an example in which a partial program table is subjected to the if-else degenerating processing. FIG. 33B illustrates an example of a partial program table obtained as a result of the adjacency degenerating processing performed to the resultant partial program table of FIG. 33A according to the fourth embodiment.

Note that, in FIG. 33A, an execution time estimate value of a partial program "35'" is a value to which Expression (3.2) is applied.

The type IV loop degenerating section 411 then performs the adjacency degenerating processing to partial programs "33" and "35'" in FIG. 33A whose "partial program end instructions" and "partial program leading instructions" are the same, to thereby generate a partial program table (FIG. 33B) which has a partial program "33'" in which the partial programs "33" and "35'" are degenerated.

Referring to the partial program table of FIG. 33B, the partial program "33'" can be determined as being a loop because condition variables of the "partial program leading instruction" and the "partial program end instruction" thereof are the same, as described in the second embodiment. Further, it is shown that the partial programs "33'" and "34" can be loop-degenerated because the partial programs "33'" and "34" (which correspond to the "loop 5" in FIG. 28) have the same condition variables in their respective partial program leading instructions.

The type IV loop degenerating section 411 calculates an average iteration count of the "loop 5" which corresponds to the partial programs "33'" and "34" in a manner similar to Expressions (4.1) and (4.2). The type IV loop degenerating section 411 also calculates an average execution time of the "loop 5" in a manner similar to Expressions (4.3) and (4.4). The type IV loop degenerating section 411 then generates a partial program table shown in FIG. 34A which includes the calculated average execution time of the "loop 5", in a field of an execution time estimate value of the partial program "33''" obtained by degenerating the partial programs "33'" and "34".

FIG. 34A to FIG. 34D illustrate examples of partial program tables obtained by performing a degeneration processing to the partial program table of FIG. 33B. FIG. 34A illustrates an example of a partial program table obtained by performing a type IV loop degenerating processing to the partial program table of FIG. 33B. FIG. 34B illustrates an example of a partial program table obtained by performing an adjacency degenerating processing to the partial program table of FIG. 34A. FIG. 34C illustrates an example of a partial program table obtained by performing a type IV loop degenerating processing to the partial program table of FIG. 34B. FIG. 34D illustrates an example of a partial program table obtained by performing an adjacency degenerating processing to the partial program table of FIG. 34C.

The type IV loop degenerating section 411 generates a partial program table (FIG. 34B) in which the partial programs "31" and "33''" have been adjacently degenerated as shown in FIG. 34A. Note that "C_L5" in FIG. 34A is an average iteration count in the "loop 5" in FIG. 28 (Expression (4.2)).

Similarly, the type IV loop degenerating section 411 performs a loop degeneration processing to partial programs "31'" and "32" in FIG. 34B (which correspond to the "loop 4" in FIG. 28), to thereby generate the partial program table of FIG. 34C. The type IV loop degenerating section 411 further performs an adjacency degenerating processing to the partial program table of FIG. 34C, to thereby generate the partial program table of FIG. 34D. Note that "C_L4" in FIG. 34C is an average iteration count in the "loop 4" in FIG. 28 (Expression (4.1)).

The processings described above make it possible to degenerate the partial program table of FIG. 31 into the partial program table of FIG. 34D.

The processings after step S401 are similar to those in the aforementioned embodiments except that information generated in step S301 and step S401 is used in this embodiment, and thus, description thereof is omitted herefrom (S103*d*, S104*e*, and S105).

The type IV loop degenerating processing is similar to the type I loop degenerating processing as described above, except that the loop count is a constant in the type I loop degenerating processing, and, on the other hand, the loop count is an average iteration count calculable from a branch probability in the type IV loop degenerating processing.

(Advantageous Effects of Fourth Embodiment)

According to the fourth embodiment, multiple loop degeneracy by the multiple loop degenerating section 41 can enhance effects of further reducing a branch history bit sequence length without generating a "fixed loop count sequence" and degenerate an entire program into only one partial program in some cases.

(Fifth Embodiment)

Figure 35:
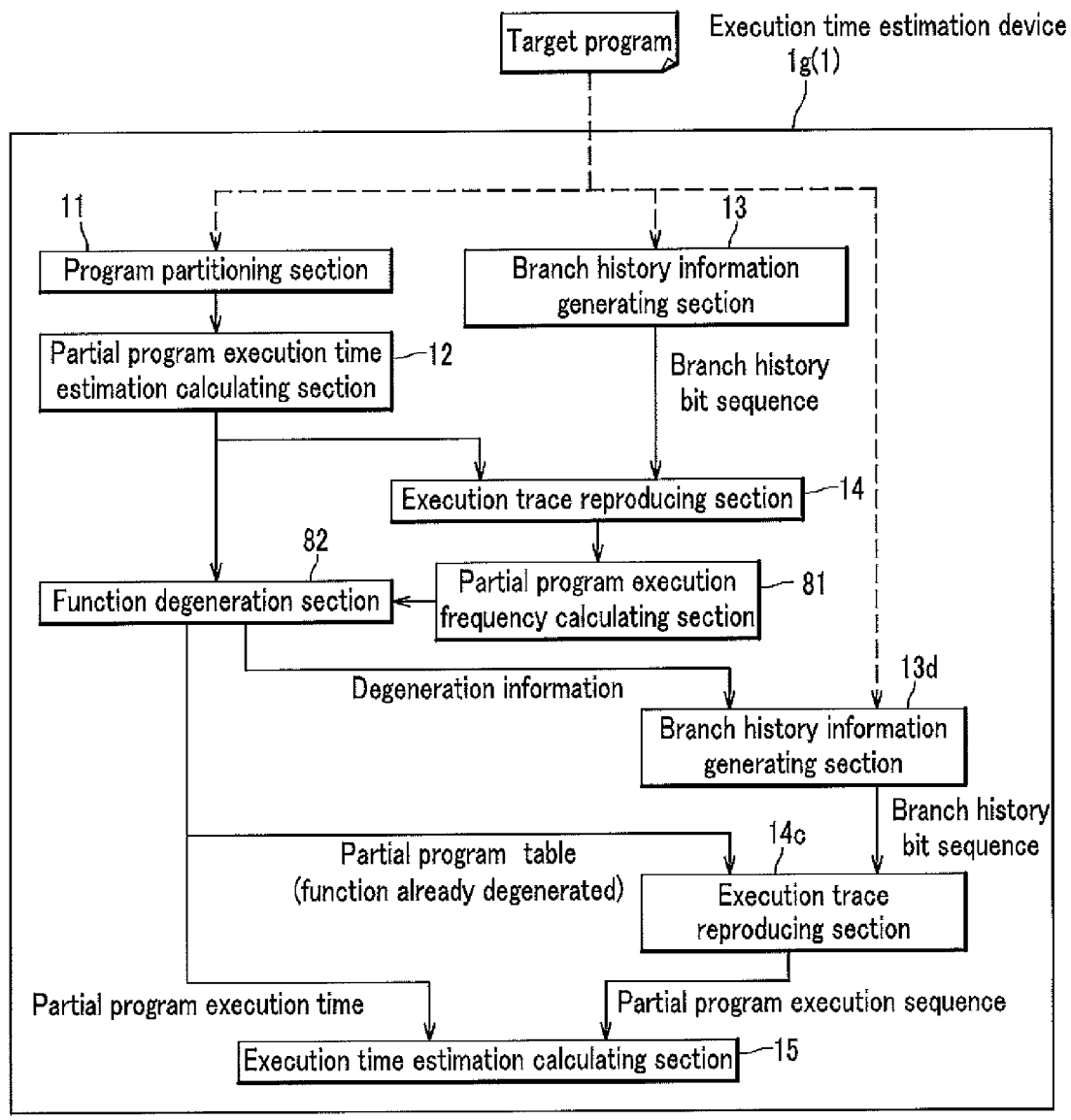
FIG. 35 A diagram illustrating a configuration example of a execution time estimation device according to a fifth embodiment.

FIG. 35 is a diagram illustrating a configuration example of an execution time estimation device according to a fifth embodiment.

An execution time estimation device 1*g* (1) includes the program partitioning section 11, the partial program execution time estimation calculating section 12, the branch history information generating sections 13 and 13*d*, the execution trace reproducing sections 14 and 14*c*, and the execution time estimation calculating section 15. These components operate similarly to those in the aforementioned embodiments. Thus, the same reference numerals are given to the components and description thereof is omitted herefrom.

The execution time estimation device 1*g* further includes: a partial program execution frequency calculating section 81 that calculates a partial program execution frequency which is an appearance frequency of each partial program in a partial program execution sequence; and a function degeneration section 82 that performs a degeneration processing of a function, based on a partial program execution time estimate value and a partial program execution frequency.

In other words, the execution time estimation device 1*g* shown in FIG. 35 has a configuration in which, compared to the execution time estimation device 1*d* shown in FIG. 27, the probability calculation by condition variables section 311 of the device 1*d* is replaced by the partial program execution frequency calculating section 81, and the multiple loop degenerating section 41 of the device 1*d* is replaced by the function degeneration section 82.

Further, the branch history information generating section 13*d* generates a branch history bit sequence using the degeneration information and the target program transmitted from the function degeneration section 82.

Respective components 11, 12, 13, 13*d*, 14, 14*c*, 15, 81, and 82 shown in FIG. 35 are embodied when an execution time estimation program stored in the storage unit 170 of FIG. 2 or the like is loaded into the RAM 153 and the CPU 151 executes the loaded program.

Next is described an outline of processings in the fifth embodiment, prior to detailed description thereof.

FIG. 36 is a diagram illustrating an example of a target program having a loop including a "break" statement and a "return" statement.

The target program shown in FIG. 36 has, for example, a "loop 10" including a "break" statement and a "loop 11" including a "return" statement. This means that the both loops are not type IV loops and cannot be degenerated using techniques described in the aforementioned embodiments.

Even in such a target program, however, a function including the "loop 10" and the "loop 11" as shown in FIG. 36 can be degenerated according to techniques to be described in this embodiment.

Figure 37:
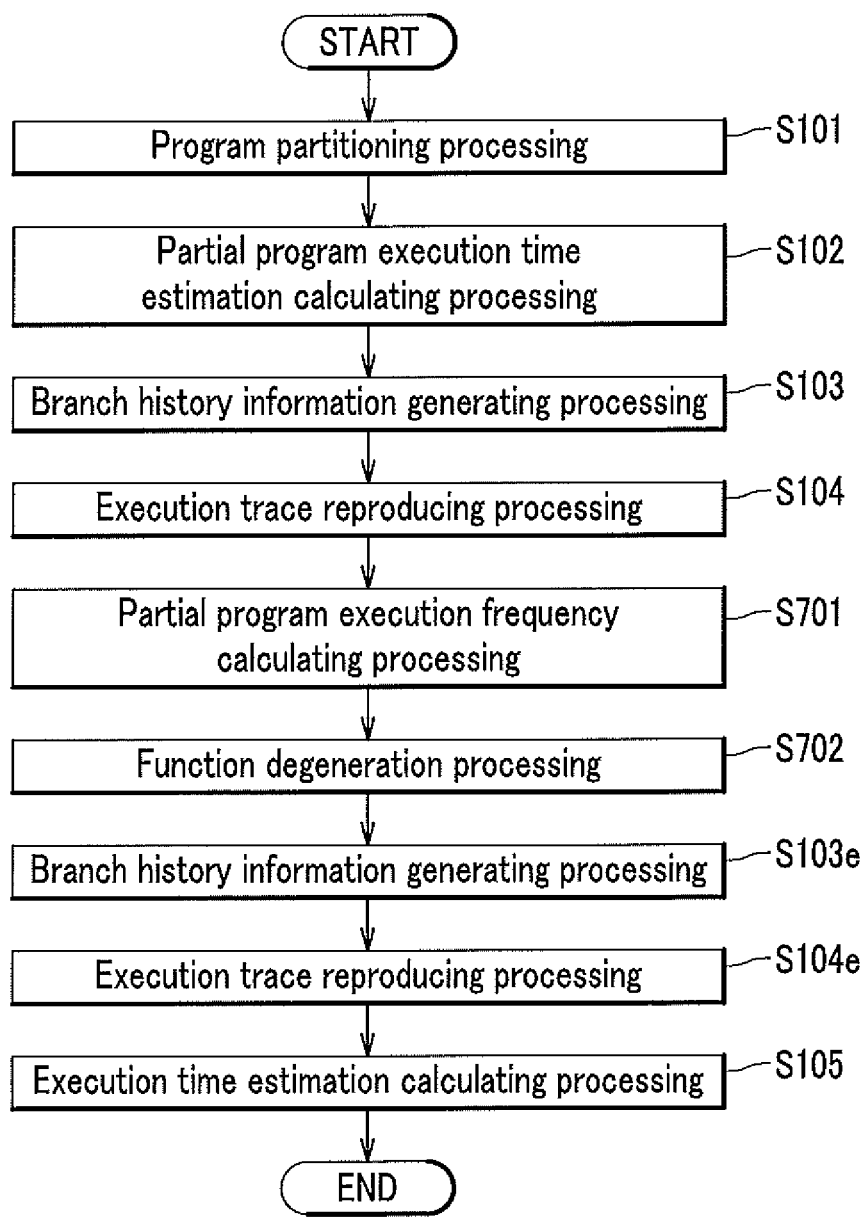
FIG. 37 A flowchart illustrating a flow of a program execution time estimation method according to the fifth embodiment.

Next is described a program execution time estimation method according to the fifth embodiment with reference to FIG. 37 as well as FIG. 35.

FIG. 37 is a flowchart illustrating a flow of the program execution time estimation method according to the fifth embodiment.

In FIG. 37, processings in steps S101 to S105 are similar to those in the aforementioned embodiment, and description is omitted herefrom. After the execution trace reproducing processing of step S104 is completed, the partial program execution frequency calculating section 81 performs a partial program execution frequency calculating processing (S701). The function degeneration processing section 72 then performs a function degeneration processing (S702).

The branch history information generating section 13*d* performs a branch history information generating processing based on degeneration information acquired from the function degeneration section 82 and the target program, to thereby generate a branch history bit sequence (S103*e*). Subsequent processings are similar to those of FIG. 29, and description is omitted herefrom.

<<Details of Partial Program Execution Frequency Calculating Processing>>

Next are described details of a partial program execution frequency calculating processing using a partial program table of FIG. 38 corresponding to the target program of FIG. 36.

FIG. 38 is a diagram illustrating an example of a partial program table in which information on partial program execution frequency is written.

The "partial program execution frequency" used herein is defined as an appearance frequency of each partial program in a "partial program execution sequence". That is, the partial program execution frequency is calculated from an occurrence frequency of "True" and "False" in a conditional branch in a partial program. Note that, if a partial program starts with a branch instruction, the partial program execution frequency is the same as the "frequency of "True" and "False" of the calculation expression of the branch probability described in the third embodiment.

Condition U: True frequency=C61, False frequency=C62
Condition V: True frequency=C63, False frequency=C64
Condition W: True frequency=C66, False frequency=C67
Condition Z: True frequency=C68, False frequency=C69

Herein, "U", "V", "W", and "Z" are branch conditions in the target program of FIG. 36.

FIG. 38 illustrates an example in which the partial program execution frequency calculated as described is made to be associated with a partial program ID and is stored in the partial program table.

<<Function Degeneration Processing>>

Next is described in detail the function degeneration processing using a partial program table of FIG. 39 corresponding to the target program of FIG. 36.

FIGS. 39A to 39C are diagrams illustrating examples in which the partial program table of FIG. 38 is subjected to the degeneration processing. FIG. 39A illustrates an example in which a function "func4" degeneration processing is performed. FIG. 39B illustrates an example in which a degeneration processing of a partial program "63" is performed. FIG. 39C illustrates an example of a resultant partial program table after the degeneration processing is completed.

A "partial program entire execution time estimate value" is defined by Expression (5.1) as follows:

"Partial program entire execution time estimate value"="Partial program execution time estimate value"דPartial program execution frequency" (5.1)

An "entire execution time estimate value of a function" can be calculated by summing up "partial program entire execution time estimate values in the function". However, a "partial program in the function" used herein does not include a function call instruction. For example, a main function at this time includes a partial program for calling the "func4", and thus, the entire execution time estimate value of the function cannot be calculated as it is.

The entire execution time estimate value of the function "func4" is calculated from the table of FIG. 38 by Expression (5.2) as follows:

Total_func4='$C65 \times T65 + C66 \times T66 + C67 \times T67 + C68 \times T68 + C69 \times T69$ (5.2)

Therefore, an "average execution time estimate value of a function" can be calculated by Expression (5.3) as follows:

"Average execution time estimate value of a function"="Entire execution time estimate value of the function"/"Function execution frequency" (5.3)

The "function execution frequency" used herein means an execution frequency of a partial program which has a "start" of the partial program as a leading instruction.

For example, an average execution time estimate value of the function "func4" in FIG. 36 can be calculated by Expression (5.4) as follows:

$T\_func4 = Total\_func4/C65$ (5.4)

After the average execution time estimate value of the function "func4" using the calculations described above, the partial program table is translated into the table of FIG. 39A in which the function "func4" is degenerated.

Then, if a partial program "63" which includes a function call of the degenerated function "func4" is degenerated, the partial program table of FIG. 39A is translated into the table of FIG. 39B.

Similarly, an average execution time estimate value of the main function can be calculated by Expression (5.5) as follows:

Total_main=$c60 \times T60 + c61 \times T61 + c62 \times T62 + c63' \times T63' + c64 \times T64$ (5.5)

The partial program table can be finally degenerated into the table shown in FIG. 39C.

Note that C60=1 because the main function is called only once.

The function degeneration section 82 transmits the partial program table having the degenerated function (FIG. 39C) to the execution trace reproducing section 14c.

Information on a partial program corresponding to the degenerated function (which may also be referred to as degeneration information) is transmitted from the function degeneration section 82 to the branch history information generating section 13e. The branch history information generating section 13d generates a branch history bit sequence which skips a write of a branch history bit of the partial program included in the degeneration information (S103d).

Subsequent processings are similar to those in the aforementioned embodiments, and description thereof is omitted here from.

(Advantageous Effects of Fifth Embodiment)

According to the fifth embodiment, if a program does not include a recursive function call (for example, in a case where a function itself is called in the function), the entire program can always be degenerated into one partial program.

(Sixth Embodiment)

Figure 40A:
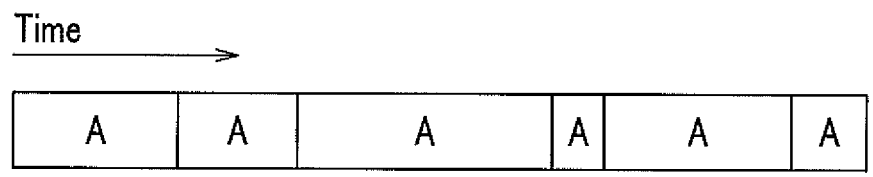
FIG. 40A is an example in which the second embodiment is applied.
Figure 40B:
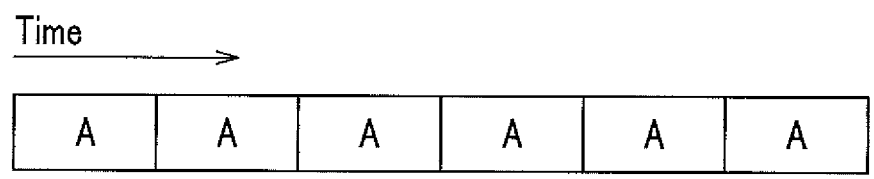
FIG. 40B is an example in which the fourth embodiment is applied.

Next is described a method according to a sixth embodiment with reference to FIG. 40A and FIG. 40B.

FIG. 40A and FIG. 40B are schematic diagrams each illustrating a code execution time if a code in a target program is repeatedly executed. FIG. 40A is an example to which the second embodiment is applied. FIG. 40B is an example to which the fourth embodiment is applied.

According to any of the techniques described in the second embodiment to the fourth embodiment, an execution time of an entire target program can be accurately estimated. Thus, if what is required is only an accurate estimation of the execution time of an entire target program, implementation according to the fourth embodiment is optimal because a branch history bit sequence length can be drastically reduced, and a required amount of memory. A time required for calculating an execution time estimation are also appropriate. However, the implementation according to the fourth embodiment adopts an average processing time with respect to all loops. Local fluctuations of an execution time attributed to a complicated conditional branch during execution of the program cannot be thus reproduced.

For example, if a code area "A" is repeatedly executed, a complicated conditional branch causes fluctuations in an execution time of the code area "A" each time the code area "A" is executed, as shown in FIG. 40A. The technique described in the second embodiment can completely reproduce fluctuations of the execution time and reflects the fluctuations in an execution time estimate value of a target program.

Meanwhile, in the technique described in the fourth embodiment, all processings are averaged and an execution time estimate value is then calculated, as shown in FIG. 40B. Local fluctuations of an execution time (local execution time) cannot be thus completely reproduced.

The averaging of the local execution time cause a problem, if a target is, for example, simulation of an entire system including a processor and an external unit (such as a memory, a device driver, a network port, and an interprocessor communication in a multiprocessor system). That is, in order to simulate the entire system, it is important to reproduce a local timing of a data traffic or a memory access traffic in a system bus. However, if the fourth embodiment alone is applied, accuracy of local timing reproduction is relatively low.

The accuracy of local timing reproduction used herein is a degree of fluctuation when a code area is actually executed. If fluctuation of each execution time can be precisely estimated as shown in FIG. 40A, the accuracy of local timing reproduction is high. On the other hand, if fluctuation of each execution time disappears as shown in FIG. 40B, the accuracy of local timing reproduction is low.

Herein, the techniques according to the first to fourth embodiments are wrapped up in terms of the accuracy of local timing reproduction. In the first and second embodiments, a local timing cannot be exactly reproduced because of lack of averaging mechanism (lack of a processing of calculating an average).

In the third embodiment, the accuracy of local timing reproduction is slightly lowered because an averaging processing is performed when an execution time of a type III loop is estimated.

The fourth embodiment has the lowest accuracy of local timing reproduction of the first to the fourth embodiments because an averaging processing is performed when an iteration count of a type IV loop is calculated or an execution time is estimated.

In the sixth embodiment, an execution time estimation device 1e is provided which flexibly deals with a different simulation target (that is, a degree of needs for the accuracy of local timing reproduction).

(Configuration)

Figure 41:
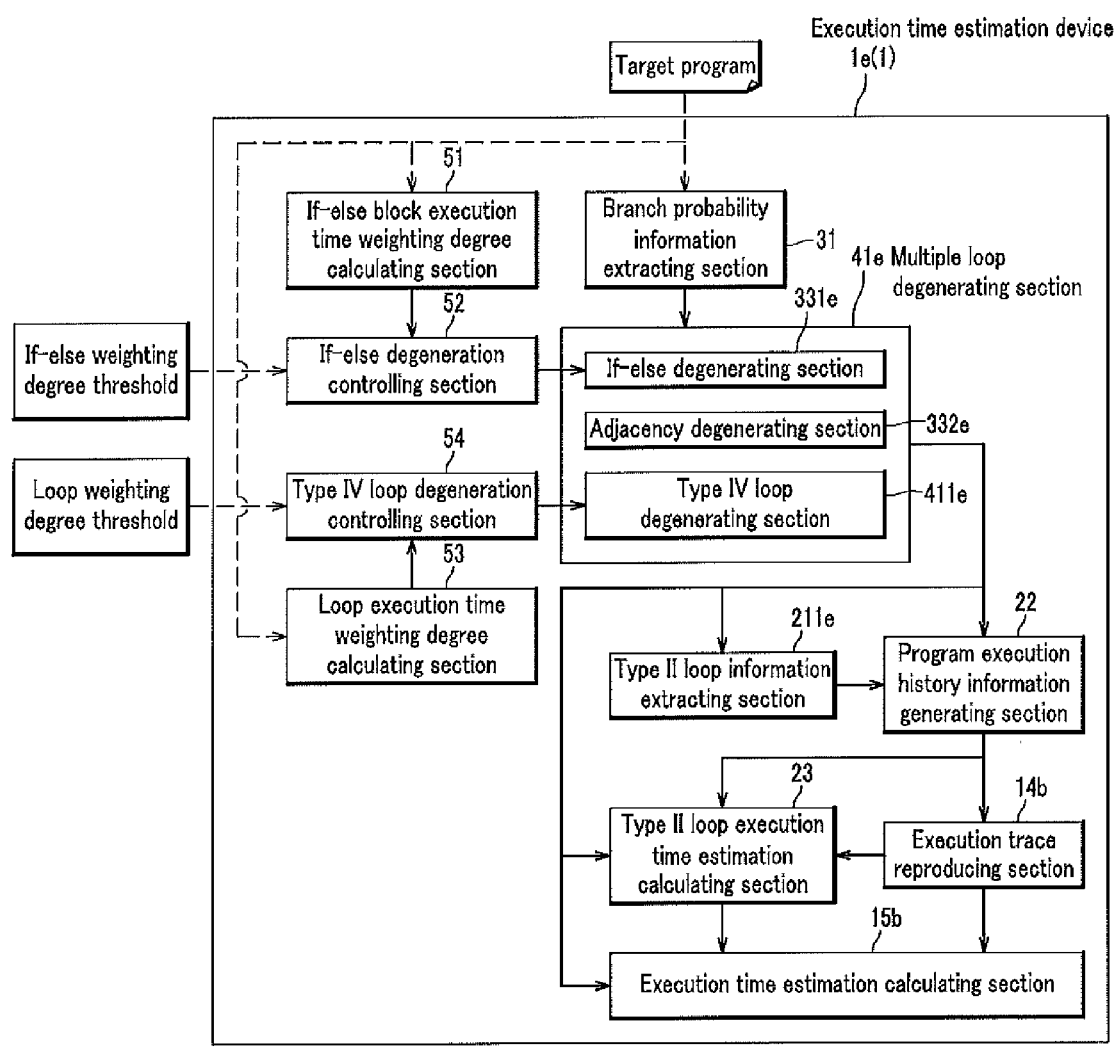
FIG. 41 A diagram illustrating a configuration example of a execution time estimation device according to a sixth embodiment of the present invention.

FIG. 41 is a diagram illustrating a configuration example of an execution time estimation device according to the sixth embodiment.

As shown in FIG. 41, the execution time estimation device 1e (1) has a configuration combining the components in the first to fourth embodiments, in addition to a configuration to be described below. Note that, in FIG. 41, the same reference numerals are given to the components similar to those in the aforementioned embodiments, and description of a detailed configuration thereof is omitted herefrom.

The execution time estimation device 1e (1) includes the branch probability information extracting section 31, the program execution history information generating section 22, the execution trace reproducing section 14b, the type II loop execution time estimation calculating section 23, and the execution time estimation calculating section 15b. These components operate similarly to those in the aforementioned embodiments. Thus, the same reference numerals are given to the components and description thereof is omitted herefrom. Note that, compared to the type I/type II loop determination processing section 211 in the aforementioned embodiments, the type II loop information extracting section 21e operates only in determining a type II loop and issuing a type II loop ID.

The execution time estimation device 1e further includes an if-else block execution time weighting degree calculating section 51, an if-else degeneration controlling section 52, a loop execution time weighting degree calculating section 53, and a type IV loop degeneration controlling section 54.

The if-else block execution time weighting degree calculating section 51 calculates an if-else block execution time weighting degree. The if-else block execution time weighting degree will be described later.

The if-else degeneration controlling section 52: compares the calculated if-else block execution time weighting degree to an if-else weighting degree threshold inputted via the input section 156 (FIG. 2); and outputs an if-else degeneration disable flag which is information on whether or not an if-else degenerating processing performed by the if-else degenerating section 331e is prohibited.

The loop execution time weighting degree calculating section 53 calculates a loop execution time weighting degree. The loop execution time weighting degree will be described later.

The type IV loop degeneration controlling section 54: compares the loop execution time weighting degree to a loop weighting degree threshold inputted via the input section 156 (FIG. 2); and outputs a type IV loop degeneration disable flag which is information on whether or not a type IV loop degenerating processing performed by the type IV loop degenerating section 411e is prohibited.

Components 331e, 332e, 411e of the multiple loop degenerating section 41e operate similarly to respective correspondents in the aforementioned embodiments and also control execution of an if-else degenerating processing or a multiple loop degenerating processing, based on an if-else degeneration disable flag or a type IV loop degeneration disable flag transmitted from the if-else degeneration controlling section 52 or the type IV loop degeneration controlling section 54, respectively.

Respective components 14b, 15b, 22, 23, 31, 41e, 51, 2, 53, 54, 211e, 331e, 332e, and 411e shown in FIG. 41 are embodied when an execution time estimation program stored in the storage unit 170 or the like is loaded into the RAM 153 and the CPU 151 executes the loaded program.

Figure 42:
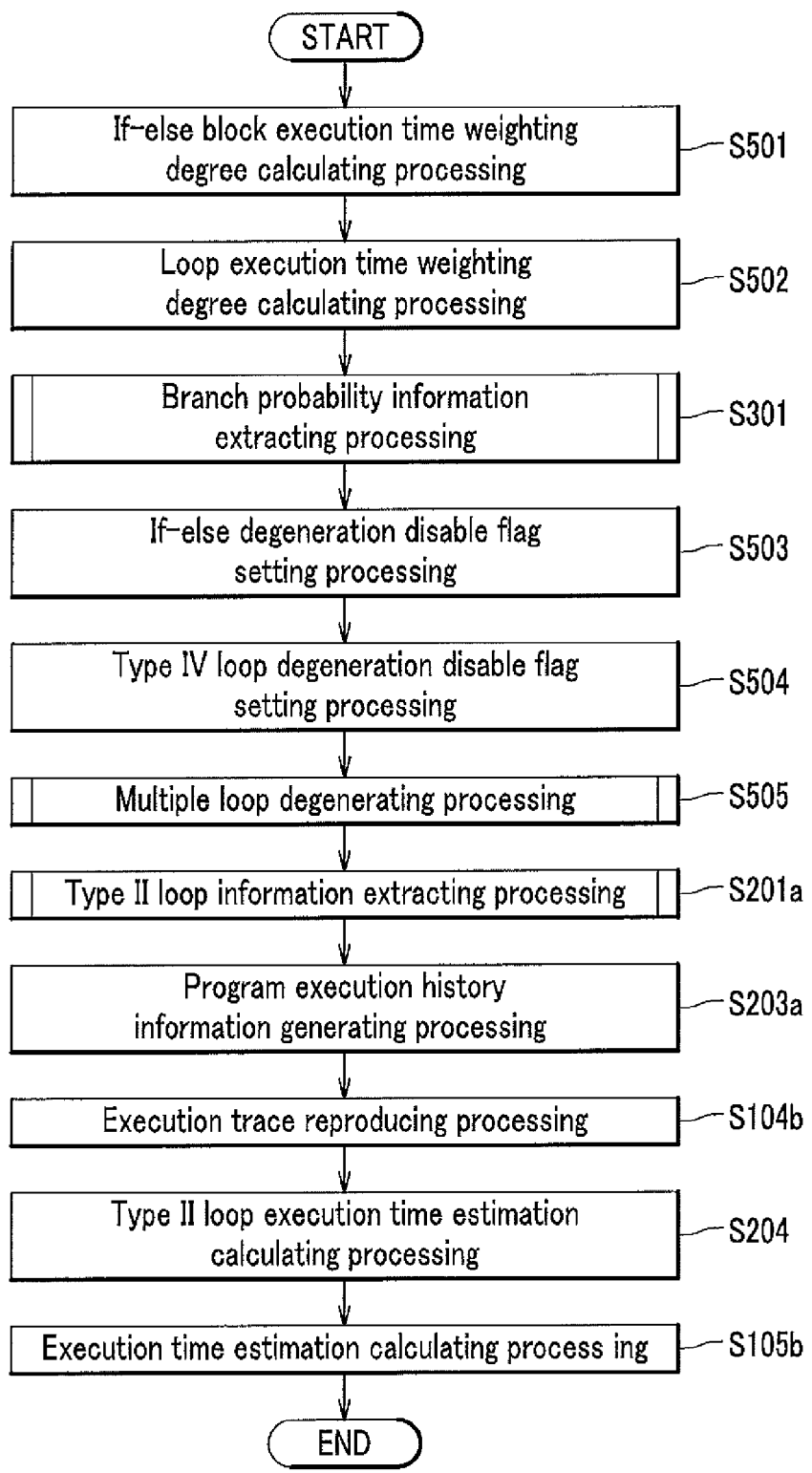
FIG. 42 A flowchart illustrating a flow of a program execution time estimation method according to the sixth embodiment.

Next is described a program execution time estimation method according to the sixth embodiment with reference to FIG. 42 as well as FIG. 41.

FIG. 42 is a flowchart illustrating a flow of the program execution time estimation method according to the sixth embodiment. Note that, in FIG. 42, the same step numbers are given to the processings similar to those in the aforementioned embodiments, and description thereof is omitted herefrom.

The if-else block execution time weighting degree calculating section 51 performs an if-else block execution time weighting degree calculating processing to all if-else branch blocks (S501).

In the third embodiment, in a case where a difference between execution times of an if-else branch instruction is "True" and if "False" is large and an execution frequency thereof is high, if such an if-else block is degenerated, an accuracy of local timing reproduction decreases owing to the averaging mechanism of an execution time. Thus, a product of an absolute difference between the execution times of "True" and "False" and an if-else block execution frequency is defined as an if-else block execution time weighting degree of the if-else block. The if-else block execution time weighting degree is calculated by the if-else block execution time weighting degree calculating section 51. For example, the if-else block execution time weighting degree calculating section 51 calculates Expression (6.1) and Expression (6.2), using an execution time "Tt" if the condition "C" is "True", an execution time "Tf" if "False", and an execution frequency "Mc" of the condition "C", to thereby obtain an execution time weighting degree of the condition "C". Note that the larger the execution time weighting degree, the lower the accuracy of local timing reproduction.

$$g(C)=|Tt-Tf|\times Mc \tag{6.1}$$

After step S501, the loop execution time weighting degree calculating section 53 performs a loop execution time weighting degree calculating processing in which the section 53 calculates a loop execution time weighting degree (S502).

In the technique described in the fourth embodiment, if a distribution of iteration counts of a degenerated loop is highly imbalanced, a loop execution frequency is high, and an average loop execution time is also long, then the accuracy of local timing reproduction is lowered in degenerating the loop. Therefore, a "loop execution time weighting degree" of a loop is defined as a weighting degree of an iteration count of the loop, by obtaining a product of a dispersion of an iteration count distribution and a loop execution frequency. For example, if a loop L is executed "N" times, each iteration count is (L1, L2, . . . Ln), and an average execution time is Tmean, then the loop execution time weighting degree calculating section 53 calculates a loop execution time weighting degree in the loop L by Expression (6.2). The larger the loop execution time weighting degree, the lower the accuracy of local timing reproduction.

$$g(L) = \sigma^2 \times N \times T_{Lmean} = T_{Lmean} \times \sum_{n=1}^{N}(L_n - L_{mean})^2 \quad \text{[Formula 1]}$$

In Expression (6.2), σ2 is a distribution of iteration counts of the loop L, and Lmean is an average value of the iteration counts of the loop L.

After step S502, the branch probability information extracting section 31 performs the branch probability information extracting processing (S301). The processing of step S301 is similar to those in the aforementioned embodiments, and description thereof is omitted herefrom.

The if-else degeneration controlling section 52 compares, for each of all if-else blocks, an if-else weighting degree threshold having been previously inputted and set according to the accuracy of local timing reproduction, to the if-else block weighting degree calculated in step S501. If the if-else block weighting degree is larger than the if-else weighting degree threshold, the if-else degeneration controlling section 52 performs an if-else degeneration disable flag setting processing in which the section 52 sets a flag which prohibits a corresponding if-else degenerating processing (an if-else degeneration disable flag) in the partial program table (S503). In step S503, if the if-else block weighting degree is larger than the if-else weighting degree threshold, the section 52 also registers "1" in an appropriate field of the degeneration disable flag in the partial program table. Meanwhile, in step S503, if the if-else block weighting degree is not larger than the if-else weighting degree threshold, the section 52 registers "0" in an appropriate field of the degeneration disable flag in the partial program table.

After step S503, the type IV loop degeneration controlling section 54 compares, for each of all if-else blocks, an loop weighting degree threshold having been previously inputted and set according to the accuracy of local timing reproduction, to the loop execution time weighting degree calculated in step S502. If the loop execution time weighting degree is larger than the weighting degree threshold, the type IV loop degeneration controlling section 54 performs a type IV loop degeneration disable flag setting processing in which the section 54 sets a flag which prohibits a corresponding type IV loop degenerating processing (type IV loop degeneration disable flag) in the partial program table (S504). Note that, in step S504, the type IV loop degeneration controlling section 54 operates similarly to the above-described type I/type II loop determination processing section 211 (FIG. 9), and thus, does not set a type IV loop degeneration disable flag in a partial program determined to be a type II loop.

In step S504, if the loop execution time weighting degree is larger than the loop weighting degree threshold, the section 54 registers "1" in an appropriate field of the degeneration disable flag in the partial program table. Meanwhile, in step S504, if the loop execution time weighting degree is not larger than the loop weighting degree threshold, the section 54 registers "0" in an appropriate field of the degeneration disable flag in the partial program table.

FIG. 43 is a diagram illustrating an example of a partial program table generated as a result of operations in step S503 and step S504.

The partial program table of FIG. 43 has a field of a degeneration disable flag in addition to the configuration of the partial program table of FIG. 5. Note that the type IV loop degeneration controlling section 54 registers "0" in all blank fields of the degeneration disable flag after completion of the type IV loop degeneration disable flag setting processing (step S504 of FIG. 42).

The multiple loop degenerating section 41e then performs the multiple loop degenerating processing (S505). Operations of step S505 will be described later with reference to FIG. 44.

Figure 44:
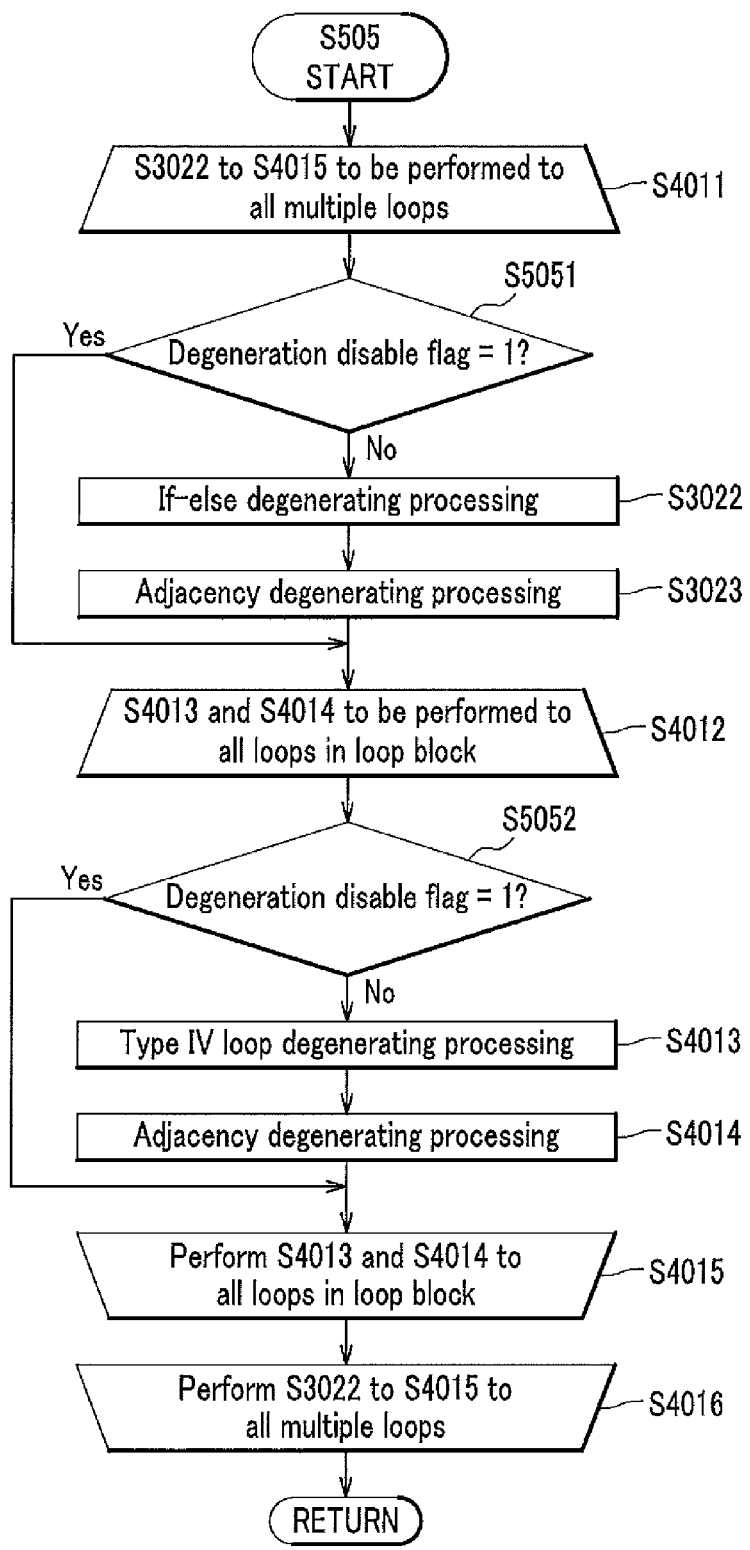
FIG. 44 A flowchart illustrating a flow of a multiple loop degenerating processing according to the sixth embodiment.

Next is described in detail the processing of step S505 with reference to FIG. 44 as well as FIG. 41.

FIG. 44 is a flowchart illustrating a flow of the multiple loop degenerating processing according to the sixth embodiment. Note that, in FIG. 44, the same step numbers are given to the processings similar to those in the aforementioned embodiments, and description thereof is omitted herefrom. Note that, the multiple loop degenerating section 41e operates similarly to the above-described type I/type II loop determination processing section 211 (FIG. 9), and thus, does not perform following processings in steps S5051 to S4016, to a loop which is determined to be a type II loop.

Prior to step S3021, the if-else degenerating section 331e references the partial program table and thereby determines whether or not a degeneration disable flag of a partial program corresponding to the searched if-else block is "1" (S5051).

If the degeneration disable flag is determined to be "1" in step S5051 (if Yes in S5051), the if-else degenerating section 331e and the adjacency degenerating section 332e skip step S3022 and step S3023 (that is, prohibit the if-else degenerating processing) and advance to step S4012.

If the degeneration disable flag is not determined to be "1" in step S5051 (if No in S5051), the if-else degenerating section 331e and the adjacency degenerating section 332e perform the processings of step S3021 and step S3022.

Prior to step S4013, the type IV loop degenerating section 411e references the partial program table and thereby determines whether or not a degeneration disable flag of a partial program corresponding to the searched type IV loop is "1" (S5052).

If the degeneration disable flag is determined to be "1" in step S5052 (if Yes in S5052), the type IV loop degenerating section 411e and the adjacency degenerating section 332e skip step S4013 and step S4014 (that is, prohibit the type IV loop degenerating processing) and advance to step S4015.

If the degeneration disable flag is not determined to be "1" in step S5052 (if No in S5052), the type IV loop degenerating section 411e and the adjacency degenerating section 332e performs the processings of step S4013 and step S4014.

After step S401a, the type II loop information extracting section 21e performs a type II loop information extracting processing (S201a). In step S201a, the section 21e performs determination of a type II loop in a manner similar to step S2011 of FIG. 11 and registers an appropriate type II loop ID in the partial program table in a manner similar to step S2012. Thus, detail description thereof is omitted herefrom.

Note that, in step S201a, a reason why a processing of extracting information on a type I loop is not performed is as follows: An iteration count of a type I loop remains unchanged throughout the entire target program (a constant number of times). A loop execution time weighting degree of the type I loop is always "0". An average iteration count is always identical to an actual iteration count "the constant number of times". Therefore, every degeneration processing of a type I loop is executed in a type IV loop degenerating processing, and, in principle, a type I loop not yet having been subjected to the processing does not exist at step S201a.

Subsequent processings are the same as those described in the aforementioned embodiments, and description thereof is omitted herefrom.

(Advantageous Effects of Sixth Embodiment)

According to the sixth embodiment, the execution time estimation device 1e which has a configuration combining those of the second to the fourth embodiments can control an excessive elimination of the accuracy of local timing reproduction in the third and fourth embodiments.

(Experimental Example)

Next is described an experimental example of the execution time estimation device 1 provided in the first to fourth embodiments and the sixth embodiment with reference to FIG. 45 to FIG. 49.

A computer used in experiments (simulation) shown in FIG. 45 to FIG. 49 has a CPU with clock ticks of 3.2 GHz and a 1 GB main memory.

Test programs subjected to the experiments (target programs) are: a prime number calculation program which enumerates prime numbers less than 500000 ("Prime500000"); a calculation program of alphabet appearance frequency in an English file "Alphabet"); a permutation and combination enumeration program with 10 elements ("Permutation"); and a JPEG encoder program having an image size of 800×600 pixels ("JPEG").

FIG. 45 is a table illustrating experimental results using an instruction set simulator as a comparative example.

The instruction set simulator used is an instruction set simulator which estimates a program execution processing time in a 32-bit RISC (Reduced Instruction Set Computer) processor with cycle accuracy (however, not including cache simulation).

In FIG. 45, with respect to the above-described four target programs, a target program size represents the number of instructions in the target program. A program execution time represents a total number of clock cycles when the target program is executed. An instruction set simulator execution time represents a time required if an execution time of the target program is estimated in an instruction set simulator, and is measured in the "second". An instruction set simulator processing speed represents a processing speed when an execution time of the target program is measured, and is measured in the "clock cycle/second".

FIG. 46 illustrates an example of experimental results according to the first embodiment.

Note that, in FIG. 46 and FIG. 47, a partial program table size represents the number of lines of a partial program table. A branch history bit sequence length represents a length (a bit count) of a branch history bit sequence. A partial program average execution time represents an execution time of a partial program (an average execution time from a branch instruction to a subsequent branch instruction) in the target program and is calculated by target program execution time/ (branch history bit sequence length +1). An execution time estimate calculation time estimate calculation time represents a time required for calculation of an execution time of the target program and is measured in the "second". A speed improvement ratio to instruction set simulator is a value calculated by (Execution time in instruction set simulator/Execution time in execution time estimation device 1).

Referring to FIG. 45 and FIG. 46, in particular, as seen from the speed improvement ratio to instruction set simulator of FIG. 46, it is demonstrated that an execution time of the execution time estimation device 1a (FIG. 1) according to the first embodiment can estimate an execution time at a speed from 16.16 times to 45.75 times higher than the instruction set simulator. Additionally, the obtained execution time estimate value completely agrees with results obtained by the instruction set simulator with respect to any of the target programs.

FIG. 47 is a table illustrating experimental results according to the fourth embodiment. Note that description of experimental results according to the second and third embodiments is herein omitted because the description will be made later with reference to FIG. 48.

In FIG. 47, the branch history bit sequence length of "Prime500000" has been little reduced, compared to that according to the first embodiment (FIG. 46), because an undegeneratable loop is present inside a multiple loop. The branch history bit sequence length of "Alphabet" has been drastically reduced compared to that according to the first embodiment (FIG. 46) because almost all loops but an internal loop other than an outermost loop have been degenerated. It is notable that the branch history bit sequence length of "Permutation" has become "0" because all loops and if-else block are degenerated. The branch history bit sequence length of "JPEG" has also been drastically reduced compared to that according to the first embodiment (FIG. 46) because most of loops and if-else blocks are degenerated.

In FIG. 47, the speed improvement ratios to instruction set simulator of "Permutation" and "JPEG" are both "–". This means that estimate calculation of the each ratio was finished within a time less than a time measurement accuracy (0.001 seconds).

In both calculations, the execution time estimate value of the target program completely agrees with results obtained by the instruction set simulator.

FIG. 48 is a table wrapping up the experimental results according to the first to fourth, and sixth embodiments.

FIG. 48 shows partial program table sizes, branch history bit sequence lengths (bit count), estimate calculation times of program execution time (second), and speed improvement ratios to instruction set simulator according to the respective embodiments, when "JPEG" was used as the target program. Note that, the if-else weighting degree threshold (FIG. 41) in the sixth embodiment was "400.000", and the weighting degree threshold (FIG. 41) was "10.000".

Respective items in a horizontal axis of FIG. 48 are similar to those in vertical axes of FIG. 46 and FIG. 47, and description thereof is omitted herefrom. The items of the speed improvement ratios to instruction set simulator reveal that the third embodiment demonstrates the best result to the instruction set simulator.

Any of the execution time estimate values of the target program of the first to fourth and sixth embodiments agree with the results of the instruction set simulator. However, as described above, "accuracies of local timing reproduction (not shown)" in the first to fourth and sixth embodiments differ from one another.

Figure 49:
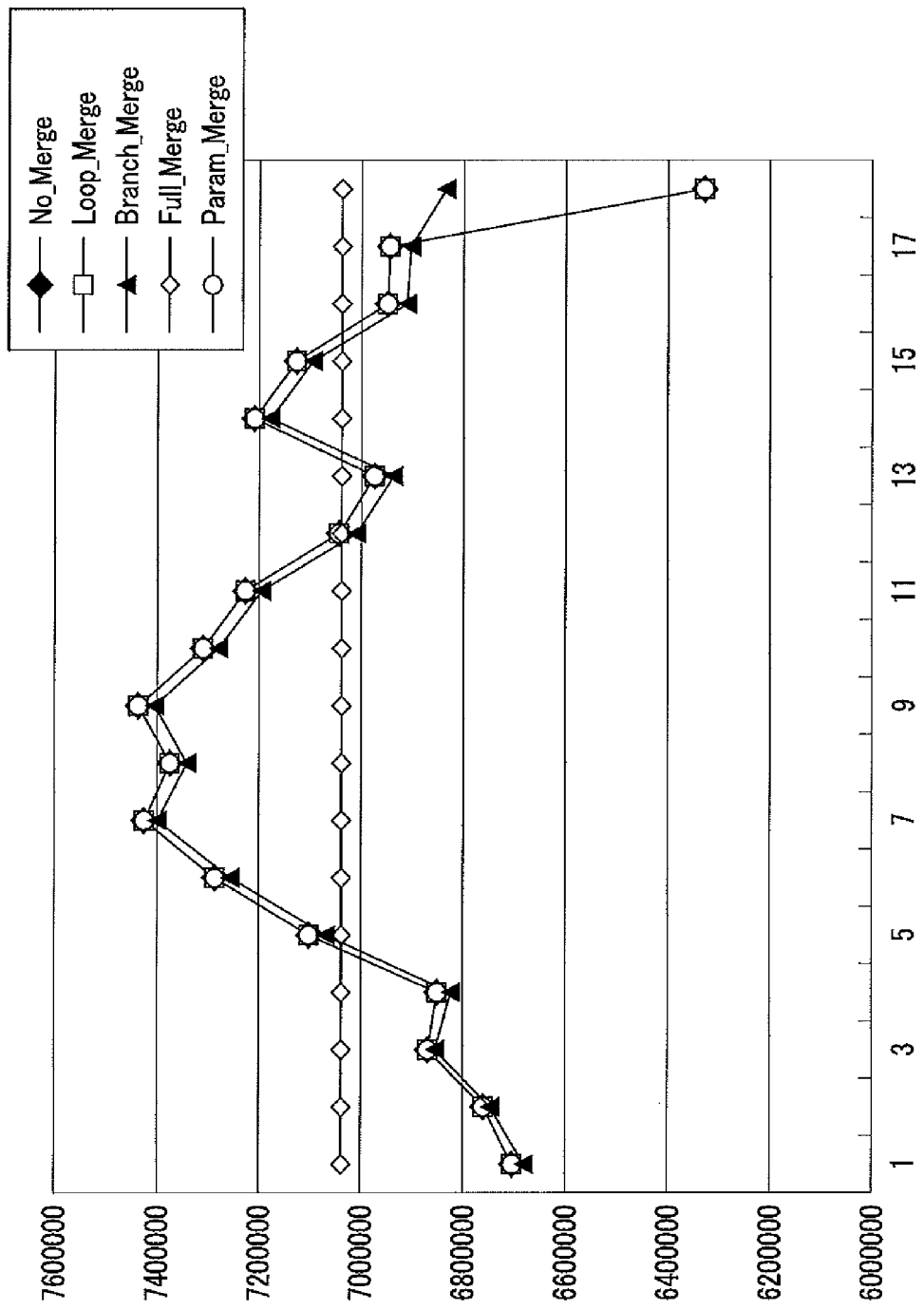
FIG. 49 A graph illustrating the experimental results according to the first to fourth and the sixth embodiments.

FIG. 49 is a graph showing experimental results in the first to fourth and sixth embodiments. In FIG. 49, a vertical axis represents the number of clock cycles and a horizontal axis represents a time (second).

The graph of FIG. 49 is created so as to evaluate the "accuracy of local timing reproduction" by: selecting one function which is repeatedly called inside the program "JPEG"; recording a time each time the function is called 100 times; and graphically indicating intervals of the recorded times.

Lines of the first embodiment ("No_Merge") and the second embodiment ("Loop_Merge") completely agree with results obtained from the instruction set simulator not shown because local timings thereof do not sacrifice prediction accuracy.

The third embodiment ("Branch_Merge") can basically reproduce an outline of the local timing fluctuation, though some errors are brought about in the "accuracy of local timing reproduction" because the accuracy of local timing reproduction in the degenerated portion is lost due to a degeneration processing of an if-else block.

In the fourth embodiment ("Full_Merge"), the local timing fluctuation completely disappears due to averaging mechanism.

In the sixth embodiment ("Param_Merge"), an error in accuracy of local timing reproduction is almost zero (that is, same as the first embodiment "No_Merge"). Moreover, the branch history bit sequence length is shorter than that of "Loop_Merge" (the second embodiment).

That is, in the sixth embodiment, as shown in FIG. 49, a tradeoff point between control of an accuracy of local timing reproduction and control of a branch history bit sequence length can be set arbitrarily, by adjusting the "if-else weighting degree threshold (FIG. 41)" and the "loop weighting degree threshold (FIG. 41)".

(Seventh Embodiment: Multiprocessor)

It is assumed in the first to sixth embodiments that respective processors used in the execution time estimation device $1a$ to $1e$, and $1g$ (FIG. 1, FIG. 9, FIG. 18, FIG. 27, FIG. 35, and FIG. 41) are each a single processor. However, a multiprocessor can also be used. Next is described a seventh embodiment in which the execution time estimation device $1a$ (FIG. 1) according to the first embodiment is a multiprocessor.

Next is described a multiprocessor used in the seventh embodiment.

In the seventh embodiment, a multiprocessor program used herein means a gathering of programs (target programs) each individually executed in each processor constituting a multiprocessor system (or a "parallel processing program"). Some multiprocessor programs are assumed to embed therein an interprocessor (interprocess) communication processing or a synchronous processing as an explicit instruction.

A multiprocessor program can be created by the following techniques: a technique using an automatic parallel compiler of a sequential program (see "Okamoto, Aida, Miyazawa, Honda, Kasahara, "Hierarchical Macro Dataflow Processing in OSCAR Multigrain Compiler", Journal of Information Processing Society of Japan, Vol. 35, No. 4, pp. 513-521 (1994)", "Eigenmann, Hoeflinger, Padua, "On the Automatic Parallelization of the Perfect Benchmarks", IEEE Trans. on Parallel and Distributed Systems, Vol. 9, No. 1, pp. 5-21 (1998)", and "Hall, Anderson, Amarasinghe, Murphy, Liao, Bugnion, Lam, "Maximizing Multiprocessor Performance with the SUIF compiler", IEEE computer, Vol. 29, No. 12, pp. 84-89 (1996)); a technique using parallel processing language which is extended from a sequential processing language (see "Iwashita, "A View of VPP Fortran in Contrast with HPF", Information Processing, Vol. 38, No. 2, pp. 114-121 (February 1997)", ""HPF Promotion Council (HPFPC)", [online], [searched on Aug. 10, 2005], Internet <URL:http://www.hpfpc.org/>", "Gehani, et al, "Concurrent C", Software, Practice and Experience, Vol. 16, No. 9, pp. 821-844, 1986, ""Message Passing Interface Forum", [online], [searched on Aug. 10, 2005], Internet <URL: http://www-.mpi-forum.org/index.html>", and ""PVM", [online], [searched on Aug. 10, 2005], Internet <URL: http://www.cs-m.ornl.gov/pvm/pvm_home.html>"; and a technique using a parallel processing compiler which automatically generates a communication synchronization instruction from a program with only a "thread description" added to a sequential program (see Japanese Laid-Open Patent Application, Publication No. 2007-193423 and Japanese Laid-Open Patent Application, Publication No. 2007-193430).

A configuration of the multiprocessor in the seventh embodiment may be a symmetric multiprocessor system in which all processors are of the same type or an asymmetric multiprocessor system in which there are processors of different types. Either case can be easily handled in the seventh embodiment. That is, the partial program execution time estimation calculating section $12f$ (to be described hereinafter with reference to FIG. 52) switches target processor models for executing target programs to appropriate processors constituting a target multiprocessor system.

Next is described a configuration of an execution time estimation device $1f$ according to the seventh embodiment with reference to FIG. 50 through FIG. 53.

Figure 50:
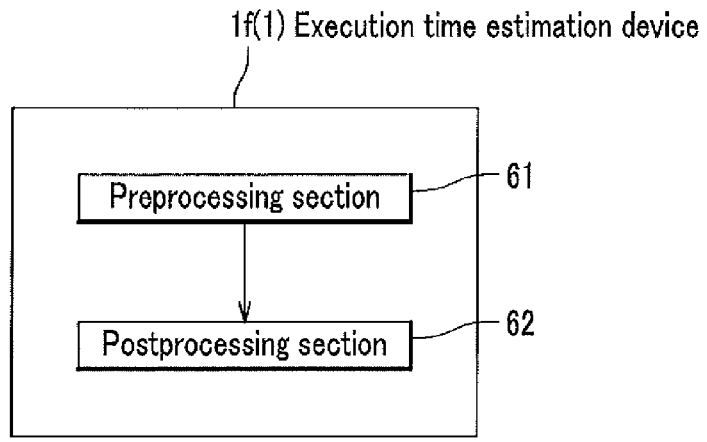
FIG. 50 A diagram illustrating a configuration example of a execution time estimation device according to a seventh embodiment of the present invention.

FIG. 50 is a diagram illustrating a configuration example of an execution time estimation device according to the seventh embodiment.

The execution time estimation device $1f$ (1) includes a preprocessing section 61 to be described hereinafter with reference to FIG. 52 and a postprocessing section 62 to be described hereinafter with reference to FIG. 53. The preprocessing section 61: generates and calculates, for each target program, a partial program table, a branch history bit sequence, and a partial program execution time, from a plurality of target programs, by performing a parallel processing using a multiprocessor; and inputs the obtained results in the postprocessing section 62. The postprocessing section 62 calculates an execution time estimate value of the each target program, based on the partial program table, the branch history bit sequence, and the partial program execution time generated and calculated by the preprocessing section 61 by performing the parallel processing using the multiprocessor. The postprocessing section 62 also calculates a highly-accurate execution time estimate value while the postprocessing section 62 precisely reproduces synchronization between processes and data communication, if a target program for an execution time estimation corresponds to a process, and a plurality of processes forms a single parent program in which the processes are unitarily combined.

Figure 51:
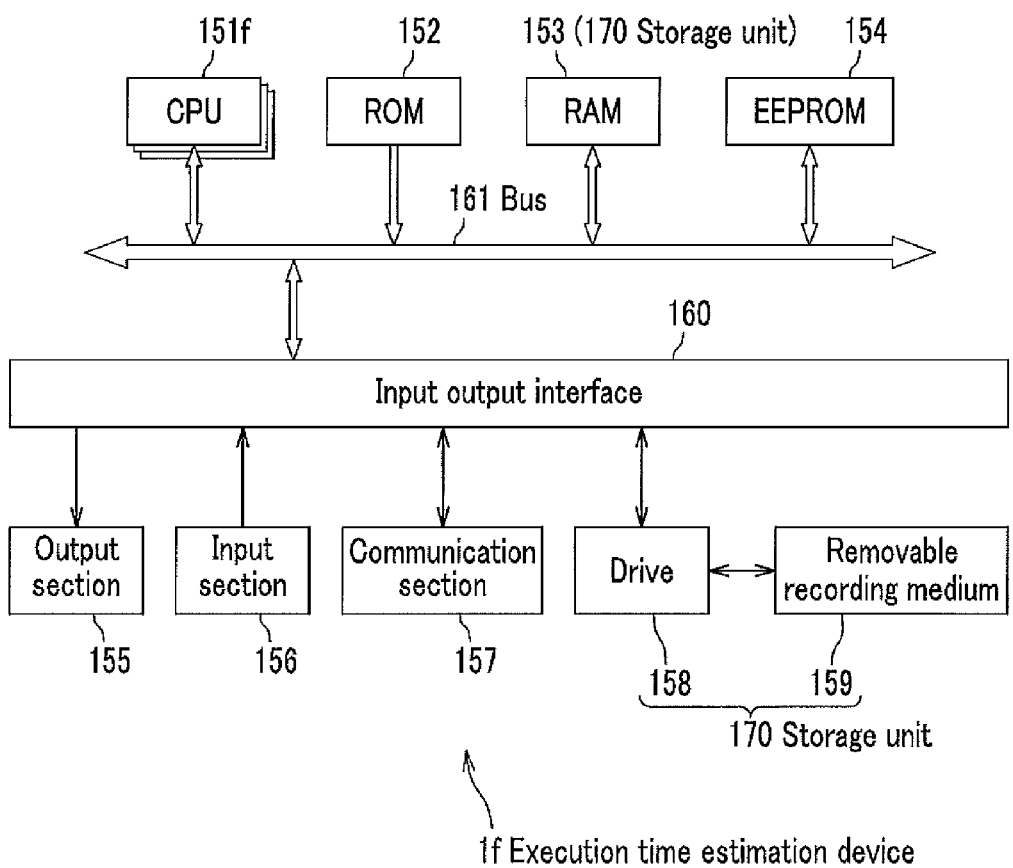
FIG. 51 A diagram illustrating a hardware configuration of an execution time estimation device according to the seventh embodiment.

FIG. 51 is a diagram illustrating a hardware configuration of an execution time estimation device according to the seventh embodiment.

The configuration of FIG. 51 differs from that of FIG. 2 in that the former includes a multiprocessor having a plurality of CPUs $151f$. Except this, the same reference numerals are given to the components similar to those shown in FIG. 2, and description thereof is omitted herefrom.

Figure 52:
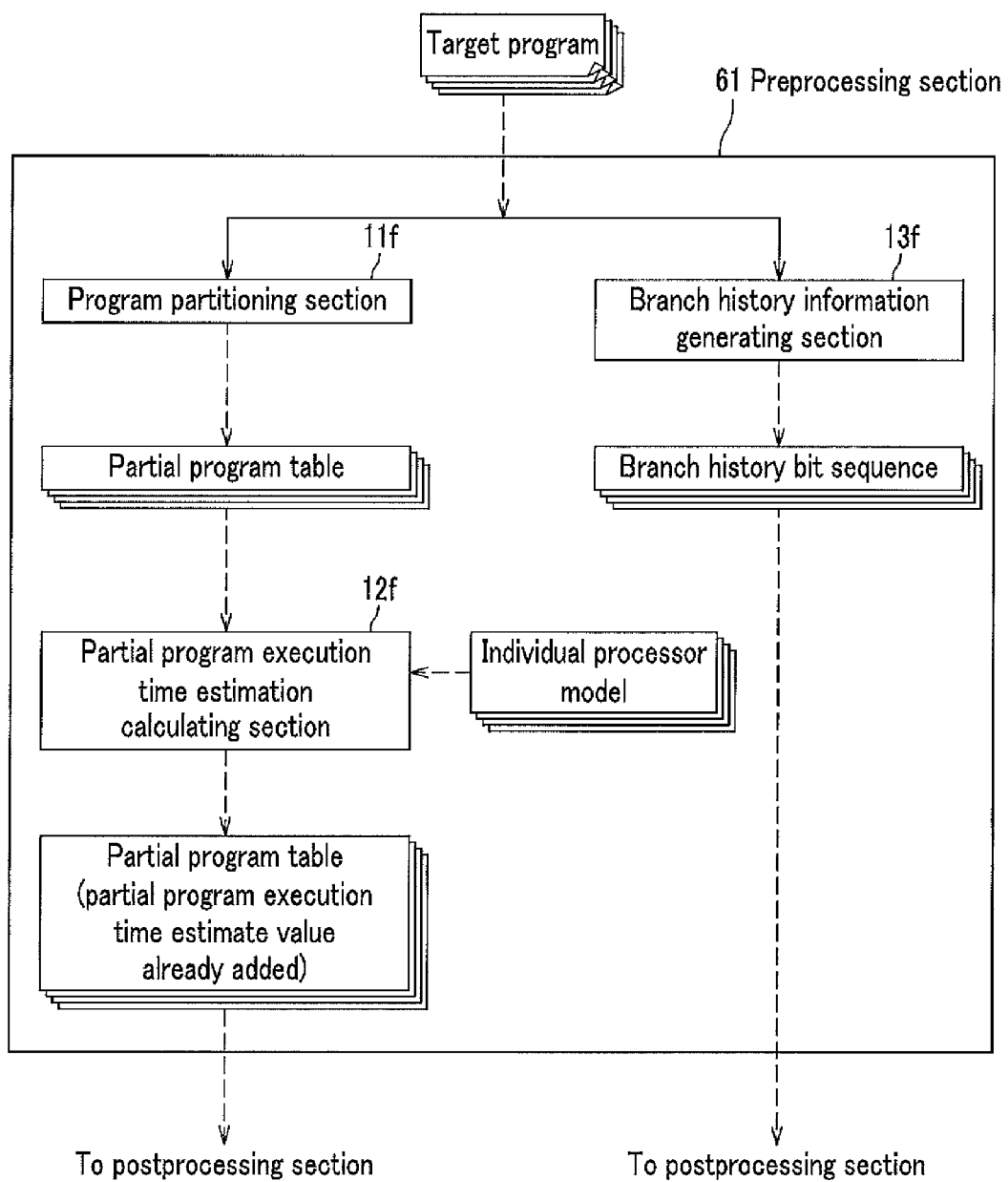
FIG. 52 A diagram illustrating an example of a detailed configuration of a preprocessing section according to the seventh embodiment.

FIG. 52 is a diagram illustrating a detailed configuration example of a preprocessing section according to the seventh embodiment.

The preprocessing section 61 includes: a program partitioning section $11f$, a partial program execution time estimation calculating section $12f$, and a branch history information generating section $13f$.

The program partitioning section $11f$ generates a partial program table for each target program from a plurality of target programs using a parallel processing by a multiprocessor.

The program partitioning section $11f$ according to the seventh embodiment operates similarly to the program partitioning section 11 (FIG. 1) according to the first embodiment (herein, each processor performs a necessary processing of an appropriate program) and further deals with a communication synchronization instruction. The communication synchronization instruction becomes a factor for changing an execution state of a processor. In order to estimate an execution time of a multiprocessor system with a high degree of accuracy, it is thus necessary to precisely identify an execution time of a communication synchronization instruction. That is, if a plurality of target programs execute a single program while the target programs are synchronized with one another as processes, a communication synchronization instruction is present in each of the target programs.

An example of a multiprocessor program which is generated based on a technique according to Japanese Laid-Open Patent Application, Publication No. 2007-193430 refers to four types of communication synchronization instructions described below.

The communication synchronization instructions are, namely, a data transmission instruction, a data reception synchronization instruction, a thread start-up instruction, and a thread terminate instruction. The thread terminate instruction herein is an instruction for activating a receive buffer updating processing at a time of termination of a thread processing and starting execution of a subsequent thread processing.

Description hereinafter is made using the four types of instructions as specific examples of the "communication synchronization instruction".

If target programs performed by each processor are partitioned into partial programs, the program partitioning section 11 (FIG. 1) in the first embodiment uses a conditional branch instruction and a function call instruction as a boundary point for the program division. The program partitioning section 11$f$ in the seventh embodiment performs the division also using a communication synchronization instruction as a boundary point. This makes the communication synchronization instruction a leading instruction of the partial program without fail. Such a partial program whose leading instruction is a communication synchronization instruction is referred to as a "communication synchronization partial program" hereinafter.

The partial program execution time estimation calculating section 12$f$ calculates a partial program execution time for each target program using a parallel processing by the multiprocessor, based on the partial program table generated by the program partitioning section 11$f$ and an individual processor model which has been previously inputted. Note that the calculated partial program execution time is written as an "execution time estimate value" in the partial program table. If an asymmetric multiprocessor system is used, plural types of target programs may be present for each processor.

The individual processor model herein means a model of a processor for executing a program. As described above, processors constituting a multiprocessor system includes a model having one and the same type of the processors (symmetrical type) or a model having plural types of the processors (asymmetrical type). Either of the models can be used in the seventh embodiment. The individual processor model is information on a model of a processor which handles each individual program.

The branch history information generating section 13$f$ generates a branch history bit sequence for each target program from a plurality of target programs, using a parallel processing by a multiprocessor.

In the seventh embodiment, the branch history information generating section 13$f$: executes a plurality of target programs in an "executable computer environment (for example, a multiprocessor simulator)"; and stores a "branch history bit sequence ("True" or "False": 1 bit information)" which is generated by combining execution results of all conditional branch instructions during program execution for each processor in order of execution in the each processor, into the storage unit 170 (FIG. 51) such as the RAM 153. That is, "M" pieces of target programs generate "M" pieces of independent "branch history bit sequences".

Next is described a partial program table according to the seventh embodiment.

The partial program table in the seventh embodiment stores therein, in addition to the information stored in the partial program table of FIG. 5, information on a communication synchronization partial program (a data transmission instruction, a thread start-up instruction, a receive processor ID, a receive buffer ID, a data reception synchronization instruction, and a receive buffer ID). Note that the information on a communication synchronization partial program is necessary for updating a processor execution state or a communication synchronization resource state when an initial communication synchronization instruction is executed.

The partial program table to which the partial program execution time estimate value has already been added, the branch history bit sequence, and the partial program execution time which are generated in the preprocessing section 61 are inputted in the postprocessing section 62.

Figure 53:
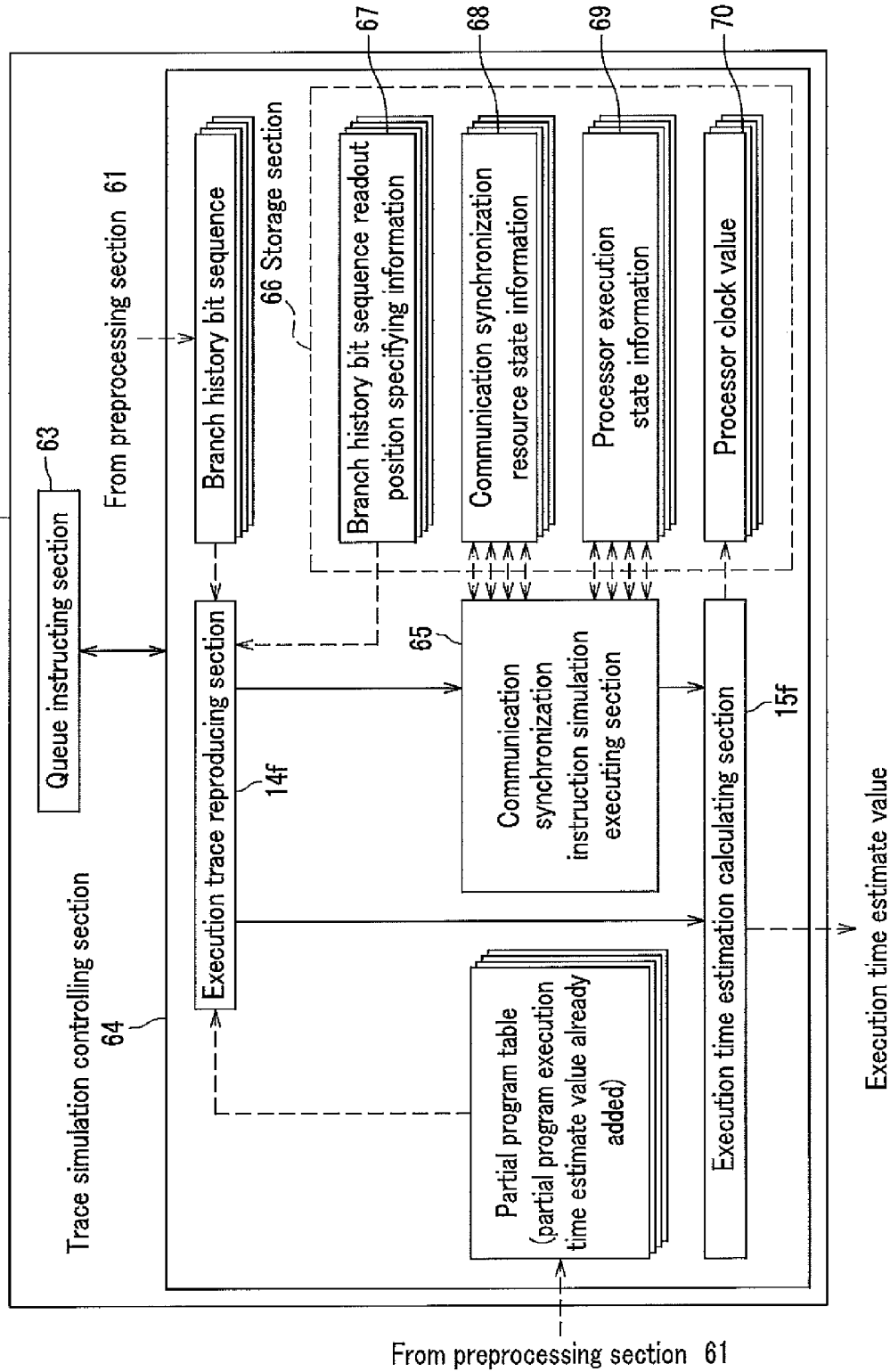
FIG. 53 A diagram illustrating an example of a detailed configuration of a postprocessing section according to the seventh embodiment.

FIG. 53 is a diagram illustrating a detailed configuration example of a postprocessing section 62 according to the seventh embodiment.

The postprocessing section 62 includes a queue instructing section 63, and a trace simulation controlling section 64.

The queue instructing section 63 manages a processor queue which stores an "executable" processor maintaining an ascending order of processor clock values 70 at any time (what is actually stored is a processor ID). The queue instructing section 63 temporarily deletes an initial processor in the "processor queue" therefrom and makes another processor indicated by a subsequent processor queue execute a trace simulation (the processor being in execution is referred to as a "currently-executing processor" hereinafter).

The trace simulation controlling section 64 includes an execution trace reproducing section 14$f$, an execution time estimation calculating section 15$f$, and a communication synchronization instruction simulation executing section 65.

The trace simulation controlling section 64: generates a partial program execution sequence in each processor with the execution trace reproducing section 14$f$ and the execution time estimation calculating section 15$f$; performs an execution time estimation calculating processing; and updates the processor clock value 70 by substituting an obtained execution time estimate value.

That is, the trace simulation controlling section 64 simulates an operation of the processor.

The storage section 66 (which corresponds to the removable recording medium 159 of FIG. 51) includes: a branch history bit sequence readout position specifying information 67; a communication synchronization resource state information 68; a processor execution state information 69 (executable and execution standby state); and the processor clock value 70.

The execution trace reproducing section 14$f$: generates a partial program execution sequence, using the branch history bit sequence readout position specifying information 67 similarly to the aforementioned embodiments, and based on the partial program table and the branch history bit sequence for each target program inputted from the preprocessing section 61; and sequentially transmits partial program execution time estimate values according to the generated partial program execution sequence, to the execution time estimation calculating section 15$f$.

The communication synchronization instruction simulation executing section 65 makes simulation of all communication synchronization instructions performed in temporal order, so as to ensure that causal relationship in updating the communication synchronization resource state information 68 or the processor execution state information 69 is accurately reproduced.

Respective components 11*f* to 15*f* and 61 to 70 shown in FIG. 50, FIG. 52, or FIG. 53 are embodied when an execution time estimation program stored in the storage unit 170 shown in FIG. 51 or the like is loaded into the RAM 153 and is executed by the CPU 151*f*.

Figure 54:
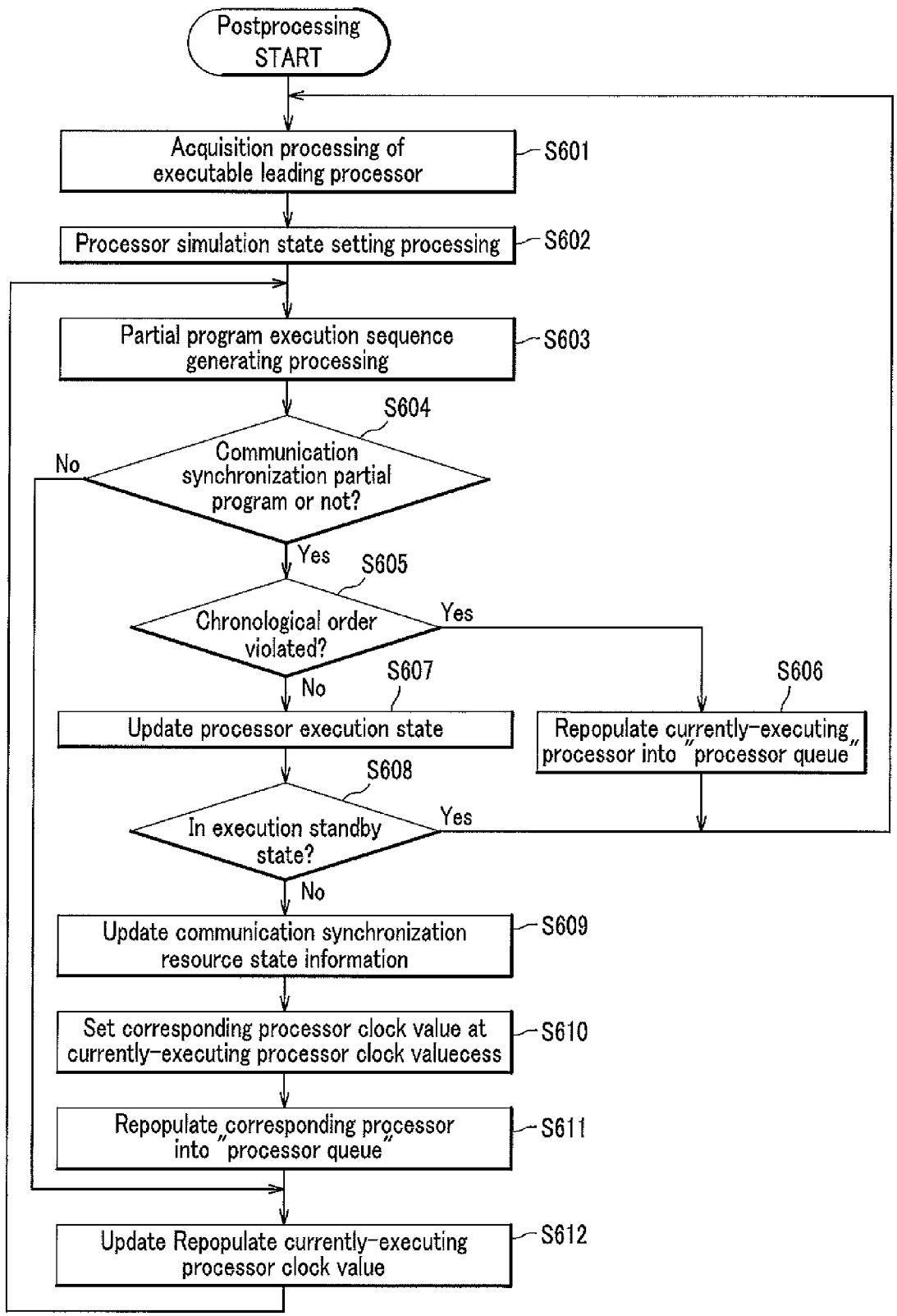
FIG. 54 A flowchart illustrating a flow of a program execution time estimation method according to the seventh embodiment.

Next is described a flow of a processing in the postprocessing section 62 according to the seventh embodiment with reference to FIG. 54 as well as FIG. 53.

FIG. 54 is a flow of the processing in the postprocessing section 62 according to the seventh embodiment. Note that description of the processing in the preprocessing section 61 is omitted herefrom because the processing corresponds to the processings of steps S101 to S103 of FIG. 2 in the first embodiment which are performed in parallel to each target program in each processor. Additionally, the processings in the execution trace reproducing section 14*f* and the execution time estimation calculating section 15*f* correspond to the processings of steps S104 and S105 of FIG. 2 in the first embodiment which are performed in parallel to each target program in each processor. Thus, description with reference to FIG. 50 is made mainly focusing on processings specific in the seventh embodiment.

The trace simulation controlling section 64 performs an acquisition processing of an executable leading processor (S601). In the processing, the trace simulation controlling section 64 acquires a leading processor ID of a processor queue from the queue instructing section 63 and sets the ID as a "currently-executing processor". The queue instructing section 63 also deletes the currently-executing processor from a queue. That is, the queue instructing section 63 substitutes another processor for a processor currently-targeted for simulation.

The trace simulation controlling section 64 then performs a processor simulation state setting processing (S602). Herein, the trace simulation controlling section 64 sets information on its own internal state as information on a processor simulation state of the currently-executing processor. The information on the internal state used herein includes a readout position of a branch history bit sequence (branch history bit sequence readout position specifying information 67), a processor clock value 70, processor execution state information 69, and communication synchronization resource state information 68.

The branch history bit sequence readout position specifying information 67 stores therein information on a readout position (that is, a position of a bit to be read next) of a branch history bit sequence for each processor.

The processor execution state information 69 used herein is defined as follows. Each processor constituting a multiprocessor system has either an ordinary "executable state" or an "execution standby state" which is a temporal state taken during execution of an interprocessor communication processing, a synchronous processing, or the like. Information on such a state is the processor execution state information 69. In the multiprocessor system, it is required to perform an execution time estimate calculation while accurately reproducing not only an execution time estimate calculation in an interval where each processor is always "executable" but also the "execution standby state" caused by interaction between the processors.

The communication synchronization resource state information 68 herein refers to an internal state managed in the each processor so as to control a processor execution state transition. In an example using the above-described four types of communication synchronization instructions, a receive buffer state (the number of data reserved in a receive buffer) corresponds to a "communication synchronization resource state".

The processor clock value 70 herein refers to a time required when a processor executes a target program. More specifically, a calculated execution time estimate value of the target program is stored as the processor clock value 70.

After step S602, the execution trace reproducing section 14*f*: generates a partial program execution sequence, based on a branch history execution sequence and the partial program table (S603); and sequentially transmits a partial program execution time estimate value to the execution time estimation calculating section 15*f* according to the partial program execution sequence. Note that, actually, the execution trace reproducing section 14*f* generates a partial program execution sequence, and in parallel, acquires a corresponding partial program execution time estimate value from the partial program table, in a similar manner to that in the aforementioned embodiments. Then, the section 14*f* transmits the partial program execution time estimate value to the execution time estimation calculating section in order of the acquisition. The processing of step S603 corresponds to a processing in which the partial program execution sequence generating processing in the first embodiment is performed for each target program. In order to generate partial program execution sequences in a plurality of the target programs, the execution trace reproducing section 14*f*: acquires the branch history bit sequence readout position specifying information 67 in an appropriate processor; and reads a bit indicated by the branch history bit sequence readout position specifying information 67 from the branch history bit sequence. The execution trace reproducing section 14*f* reads a partial program execution time estimate value according to the read bit, from the partial program table and adds the partial program execution time estimate value to the partial program execution sequence. The execution trace reproducing section 14*f* also transmits the partial program execution time estimate value to the execution time estimation calculating section 15*f*. After the addition to the partial program execution sequence (transmission of the partial program execution time estimate value) is completed, the execution trace reproducing section 14*f* shifts the branch history bit sequence readout position specifying information 67 of a corresponding processor by one bit backward.

The communication synchronization instruction simulation executing section 65 acquires the partial program ID added to the partial program execution sequence step S603, from the execution trace reproducing section 14*f*. The communication synchronization instruction simulation executing section 65 determines whether or not the acquired partial program ID is an ID relevant to a communication synchronization partial program and thereby determines whether or not the currently-processed partial program is a communication synchronization partial program (S604). As described above, the partial program table stores therein, in addition to the information shown in FIG. 5, an ID of a communication synchronization partial program (a data transmission instruction, a thread start-up instruction, a receive processor ID, a receive buffer ID, a data receive synchronization instruction, and a receive buffer ID), based on which the communication synchronization instruction simulation executing section 65 performs the determination.

If it is not determined in step S604 that the program is a communication synchronization partial program (if No in S604), the trace simulation controlling section 64 advances the processing to step 5612.

If it is determined in step S604 that the program is a communication synchronization partial program (if Yes in S604), the communication synchronization instruction simulation executing section 65 determines whether or not a chronological order of a communication synchronization instruction thereof is violated (S605). The determination is made such that, if the processor clock value 70 of a currently-executing processor is not more than a simulation synchronization time, the communication synchronization instruction simulation executing section 65 determines that "the chronological order is not violated (if No in step S605)". In a case other than that, the section 65 determines that "the chronological order is violated (if Yes in step S605)". Note that, if "the chronological order is not violated", there is a possibility that a communication synchronization instruction which is executable at a time prior to an execution time of the communication synchronization instruction is present.

The simulation synchronization time means the processor clock value 70 of a leading processor in a processor queue (other than a currently-executing processor). If the "processor queue" is empty (that is, if an executable processor is not present other than a currently-executing processor), the "simulation synchronization time" takes an infinite value.

If it is determined in step S605 that chronological order is violated (if Yes in S605), the trace simulation controlling section 64 repopulates a currently-executing processor state into a "processor queue" (S606) and returns to the processing of step S601. That is, the trace simulation controlling section 64 postpones a trace simulation execution of the currently-executing processor so as to prevent a chronological order of communication synchronization instructions from becoming confused.

If it is determined in step S605 that chronological order is not violated (If No in S605), namely, that the chronological order of the communication synchronization instruction is ensured, the trace simulation controlling section 64 updates the processor execution state information 69 of a processor caused by execution of the communication synchronization instruction, according to FIG. 55 (S607).

FIG. 55 is a table illustrating a condition under which a processor transfers from an executable state to an execution standby state according to the seventh embodiment. As shown in FIG. 55, conditions of transition of a processor from an executable state to an execution standby state are previously set for each communication synchronization instruction.

After step S607, the communication synchronization instruction simulation executing section 65 references the processor execution state information 69 and thereby determines whether or not the currently-executing processor is in an execution standby state (S608).

If it is determined in step S608 that the currently-executing processor is in the execution standby state (if Yes in S608), the trace simulation controlling section 64 returns the processing to step S601.

If it is not determined in step S608 that execution standby state (if No in S608), the communication synchronization instruction simulation executing section 65 updates the communication synchronization resource state information 68 according to FIG. 56 (S609).

FIG. 56 is a table illustrating update contents of communication synchronization resource state information and conditions of a processor for returning from the execution standby state to the executable state. As shown in FIG. 56, update contents of the communication synchronization resource state information 68 and conditions of a processor for returning from an execution standby state to an executable state are previously set for each communication synchronization instruction.

As a result of step S609, the communication synchronization instruction simulation executing section 65 performs a processing as follows to all the other processor which transit from the execution standby state to the executable state.

The communication synchronization instruction simulation executing section 65 sets the processor clock value 70 of a corresponding processor at a clock value of the currently-executing processor (processor clock value 70) (S610) so as to reflect a processor standby time. The queue instructing section 63 then populates the corresponding processor to the "processor queue" (S611). In parallel, the execution time estimation calculating section 15f adds up partial program execution time estimate values acquired from the execution trace reproducing section 14f for each processor.

The communication synchronization instruction simulation executing section 65 updates, in the execution time estimation calculating section 15f, the processor clock value 70 of the currently-executing processor, taking the calculated execution time estimate value as a currently-executing processor clock value (S612). The trace simulation controlling section 64 then returns the processing to step S603. Note that, if the processing to all partial programs in the partial program table are completed at a stage of step S612, the trace simulation controlling section 64 terminates the processing.

In the seventh embodiment, the processings in the first embodiment is performed by the multiprocessor processing. However, without limiting to the foregoing, the processings in the second to sixth embodiments may be performed by a multiprocessor. In this case, it will be easily understood that respective processings of FIG. 10, FIG. 11, FIG. 15, FIG. 19, FIG. 20, FIG. 23, FIG. 29, FIG. 30, FIG. 36, FIG. 42, and FIG. 44 are subjected to parallel processings by the multiprocessor.

(Advantageous Effects of Seventh Embodiment)

According to the seventh embodiment, execution times of a plurality of target programs can be estimated in parallel using a multiprocessor. This allows an efficient estimation of execution times.

Japanese Laid-Open Patent Application, Publication No. 2007-193430 teaches that "after the program processing part completes a current thread processing, the program processing part transmits a thread processing end signal to the data receive part". On the other hand, the seventh embodiment describes that "a thread terminate instruction" starts up a receive buffer updating processing. Further, the Publication No. 2007-193430 fails to explain how to specifically realize a "thread start-up instruction" and describes that the thread start-up instruction is implemented by a communication protocol same as the data transmission instruction. That is, in the Publication No. 2007-193430, the "thread start-up instruction" transmits not a data but a "thread activation token". Also, a receive buffer for thread start-up token is provided in a data receive part of a receive processor, similarly to other data receive buffer.

(Experimental Example)

Figure 59:
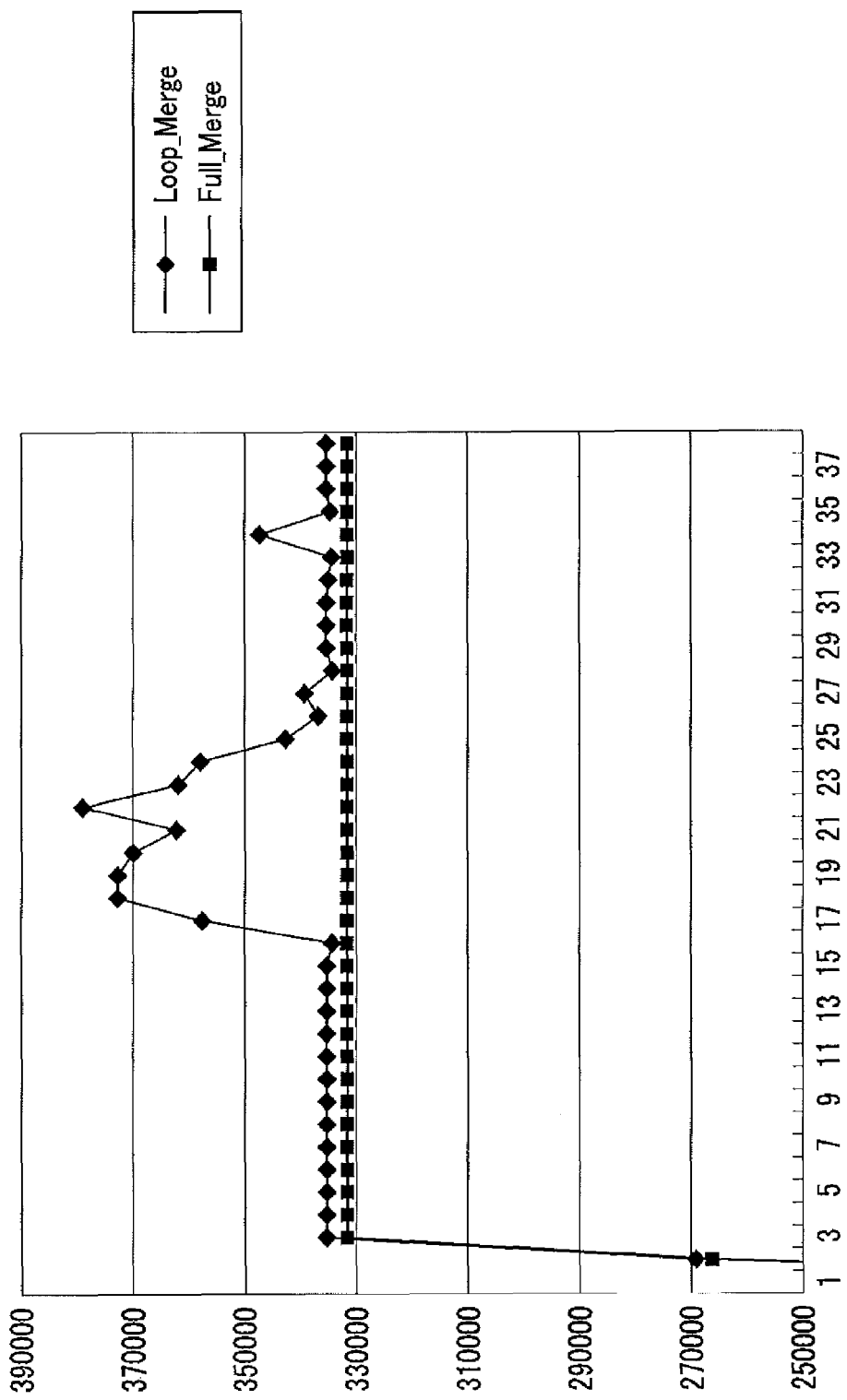
FIG. 59 A graph illustrating accuracies of local timing reproduction.

Next are described experimental results in the seventh embodiment with reference to FIG. 57 to FIG. 59.

Specs of a computed used in FIG. 57 to FIG. 59 are those in which a CPU of a computer used in FIG. 45 to FIG. 49 is a multiprocessor, and description thereof is omitted herefrom.

FIG. 57 is a table illustrating experimental results using an instruction set simulator as a comparative example.

The instruction set simulator is an instruction set simulator which estimates a parallel program execution processing time in a multiprocessor system having a 32-bit RISC processor with cycle accuracy including a communication synchronous processing (however, not including cache simulation).

Test programs (target programs) used in FIG. 57 and FIG. 58 are a 64-tap FIR (Finite Impulse Response) filter program ("FIR") with 5 processors and a JPEG encoder program ("JPEG") with 19 processors and an image size of 800×600 pixels.

In FIG. 57, a target program size of each of the two target programs is the number of instructions in a target program. A program sequential execution time is a sum of the number of clock cycles in all processors upon execution of the target program. That is, the program sequential execution time is an execution time if the target program is serially executed in each processor which is indicated by a total number of clocks. A program parallel execution time is an execution time if the target program is executed parallelly in a multiprocessor which is indicated by a total number of clocks. A parallel processing speed improvement ratio is a value calculated by (program sequential execution time/program parallel execution time). A multiprocessor instruction set simulator execution time is a time required for estimating an execution time of each target program in an instruction set simulator in a multiprocessor and is measured in the "second". An instruction set simulator processing speed is a processing speed when an execution time of each target program in a multiprocessor system which is indicated by the number of clock cycles and is measured by the "clock cycle/second".

FIG. 58 is a diagram illustrating an example of experimental results in the seventh embodiment.

In FIG. 58, a partial program table size means a total value of lines of the partial program table generated in the program partitioning section 11f (FIG. 52) in all processors. A branch history bit sequence length is a total value of branch history bit sequence length (bit counts) generated by the branch history information generating section 13f (FIG. 52) in all processors. A target program parallel execution time estimate value is a parallel execution time estimate value of a target program calculated by the execution time estimation device 1f (FIG. 50) in the seventh embodiment which is indicated by the total number of clock cycles. A target program parallel execution time estimate error is an error between a calculated execution time estimate value and an actual execution time of the target program and is measured by the "second". An estimate calculation time of program execution time is a time required for calculating an execution time of a target program by the execution time estimation device 1f according to the seventh embodiment and is measured by the "second". A speed improvement ratio to instruction set simulator is a value calculated by (execution time in an instruction set simulator/ execution time in an execution time estimation device 1f).

In FIG. 58, results obtained by applying the second embodiment ("Loop_Merge") to a multiprocessor are shown in "FIR". Results obtained by applying the second embodiment ("Loop_Merge") and the fourth embodiment ("Full_Merge") to a multiprocessor are shown in "JPEG".

As seen from the speed improvement ratios to instruction set simulator in FIG. 58, the ratios are as high as from 41.21 to 149.91. This means a drastic improvement in the processing time.

FIG. 59 is a graph illustrating accuracies of local timing reproduction.

FIG. 59 a graph for comparing, with respect to the JPEG in FIG. 58, an accuracy of local timing reproduction when the second embodiment is applied to a multiprocessor (which is referred to as a modified second embodiment), to an accuracy of local timing reproduction when the fourth embodiment is applied to a multiprocessor (which is referred to as a modified fourth embodiment). A vertical axis represents the number of clock cycles in a code processing in a target program. A horizontal axis represents a time.

The modified second embodiment ("Loop_Merge") has different numbers of clock cycles as the time elapses. This means that the numbers of clock cycles in the code processing in the target program are accurately reproduced and that the accuracy of local timing reproduction is high. The modified second embodiment ("Loop_Merge") can accurately reproduce local fluctuations of processing loads because a prediction accuracy in local timing is not sacrificed. In the modified fourth embodiment ("Full_Merge"), the numbers of clock cycles are averaged. However, even if the numbers of clock cycles in the code processing are averaged, an influence thereof on processing results accounts for only several percentage points. Therefore, the modified fourth embodiment can keep a prediction accuracy of an execution time estimate value high, compared to the methods described in Non-Patent Documents 7 to 10.

[Description of Reference Characters]
1, 1a to 1g execution time estimation device
11, 11f program partitioning section
12, 12f partial program execution time estimation calculating section
13, 13b, 13c, 13f branch history information generating section
14, 14b, 14c, 14f execution trace reproducing section
15, 15b, 15f execution time estimation calculating section
21 loop information extracting section
21e type II loop information extracting section
22 program execution history information generating section
23 type II loop execution time estimation calculating section
31 branch probability information extracting section
32 type III loop degenerating section
33 multiple if-else degenerating section
41 multiple loop degenerating section
51 if-else block execution time weighting degree calculating section
52 if-else degeneration controlling section
53 loop execution time weighting degree calculating section
54 type IV loop degeneration controlling section
61 preprocessing section
62 postprocessing section
63 queue instructing section
64 trace simulation controlling section
65 communication synchronization instruction simulation executing section
66 storage section
67 position specifying information
68 communication synchronization resource state information
69 processor execution state information
70 processor clock value
81 partial program execution frequency calculating section
82 function degeneration section
211 type I/type II loop determination processing section
212 type I loop degenerating section
221 type II loop count data sequence generating section
311 probability calculation by condition variable section
331 if-else degenerating section
332 adjacency degenerating section
411 type IV loop degenerating section

The invention claimed is:

1. An execution time estimation method performed by an execution time estimation device which estimates an execution time of a program, comprising the steps, performed by the execution time estimation device, of:

extracting, from the program, a plurality of partial programs which are obtained by partitioning the program using at least one of a conditional branch instruction and a function call instruction as a boundary point, wherein at least one partial program of the plurality of partial programs includes a loop which is repeated a constant number of times;

calculating an execution time of each partial program and storing the calculated execution time in a storage section, wherein, for the at least one partial program, calculating an execution time includes performing a first partial program degeneration processing and a second partial program degeneration processing with respect to the loop;

in the first partial program degeneration processing,
if the at least one partial program includes at least one first loop, and if a first loop is a multiple loop which is constituted only by a loop including one loop continue conditional instruction which is a branch for determining whether or not a repeat processing in the first loop is continued, calculating, if the first loop includes therein an if-else branch instruction, a probability that the if-else branch instruction is "True" and a probability that the if-else branch instruction is "False";

sequentially calculating an average execution time of the first loop in an order of loop position from innermost to outermost, based on the probabilities, and degenerating the calculated average execution times of the first loop into one execution time of the at least one partial program; and in the second partial program degeneration processing,
if the at least one partial program includes therein at least one second loop, and if the second loop does not include therein the conditional branch instruction, if an iteration count in each second loop is a constant number of times, generating a sequence of an iteration count of the at least one partial program in each second loop;

calculating a loop execution time estimate value by multiplying an execution time of a partial program corresponding to the second loop by an iteration count in the sequence of the iteration count;

adding up the calculated execution time estimate value of each second loop;

storing a leading instruction and an end instruction of the each partial program, and the calculated execution time of each of the partial programs, in the storage section, such that the leading instruction, the end instruction, and the execution time are associated with each other;

if the program is executed, generating a branch history bit sequence which is a sequence of "True" and "False" on the conditional branch instruction, and storing the generated branch history bit sequence in the storage section but skipping a write of a sequence corresponding to the first loop and the second loop, in the branch history bit sequence;

generating a partial program execution sequence in which an execution order of the partial programs is written, based on the branch history bit sequence; and adding up the execution times of the partial programs, based on the partial program execution sequence.

2. The execution time estimation method according to claim 1,
wherein, in a function including a plurality of the partial programs, are performed the steps of:
calculating an appearance frequency of the partial program;
calculating an entire execution time estimate value of the partial programs in the function by multiplying the calculated execution time of the partial program by the appearance frequency of the partial program;
calculating an entire execution time estimate value of the function by calculating a sum of the entire execution time estimate values of the partial programs in the function; and
skipping a write of a sequence corresponding to the function of which entire execution time estimate value has been calculated, in the branch history bit sequence.

3. The execution time estimation method according to claim 1, further comprising the steps of:
calculating an if-else execution time weighting degree which is a weighting degree of an execution time of the partial program depending on "True" or "False" of the if-else branch instruction; and
skipping an execution of the first partial program degeneration processing, if the if-else execution time weighting degree is not less than a prescribed value.

4. The execution time estimation method according to claim 3,
wherein the if-else execution time weighting degree is a value obtained by multiplying an absolute value of a difference between an execution time of the partial program if the if-else branch instruction is "True" and an execution time of the partial program if the if-else branch instruction is "False", by the number of executions of the if-else branch instruction.

5. The execution time estimation method according to claim 1, further comprising the steps of:
calculating a loop execution time weighting degree based on a weighting degree of an iteration count of the each first loop; and
skipping an execution of the second partial program degeneration processing, if the loop execution time weighting degree is larger than a prescribed value.

6. The execution time estimation method according to claim 5,
wherein the loop execution time weighting degree is a value obtained by multiplying a variance of an iteration count in each executed loop in the first loop, by the iteration count of the executed loop, and by an average execution time of the executed loop.

7. The execution time estimation method according to claim 1,
wherein the execution time estimation device is a single processor computer.

8. The execution time estimation method according to claim 1,
wherein the execution time estimation device is a multi-processor computer, and
wherein estimated execution times of a plurality of programs are calculated in parallel.

9. The execution time estimation method according to claim 8,
wherein the program is a program which is executed in conjunction with other program while performing communication synchronization, wherein the partial program includes a communication synchronization partial program which is a program that instructs communication synchronization with other program, and wherein the execution time estimation device updates an execution state of a processor constituting the multiprocessor according to a type of the communication synchronization partial program, when an execution sequence of the partial program is generated based on the branch history bit sequence, if the partial program targeted for the processing is the communication synchronization partial program.

10. An execution time estimation device which estimates an execution time of a program, comprising:

a program partitioning section that extracts, from the program, a plurality of partial programs which are obtained by partitioning the program using at least one of a conditional branch instruction and a function call instruction as a boundary point wherein at least one partial program of the plurality of partial programs is a loop which is repeated a constant number of times;

a partial program execution time estimation calculating section that calculates an execution time of each partial program and stores a leading instruction and an end instruction of the each partial program, and the calculated execution time of each of the partial programs, in a storage section, such that the leading instruction, the end instruction, and the execution time are associated with each other, wherein, for the at least one partial program, the partial program execution time estimation calculating section includes a first partial program degeneration processing section and a second partial program degeneration processing section with respect to the loop;

in the first partial program degeneration processing section, if the at least one partial program includes at least one first loop, and if a first loop is a multiple loop which is constituted only by a loop including one loop continue conditional instruction which is a branch for determining whether or not a repeat processing in the first loop is continued, the first partial program degeneration processing section:

calculates, if the first loop includes therein an if-else branch instruction, a probability that the if-else branch instruction is "True" and a probability that the if-else branch instruction is "False"; and sequentially calculates an average execution time of the first loop in an order of loop position from innermost to outermost, based on the probabilities, and degenerating the calculated average execution times of the first loop into one execution time of the at least one partial program;

in the second partial program degeneration processing section, if the at least one partial program includes therein at least one second loop, and if the second loop does not include therein the conditional branch instruction, if an iteration count in each second loop is a constant number of times, the second partial program degeneration processing section:

generates a sequence of an iteration count of the at least one partial program in the each second loop;

calculates a loop execution time estimate value by multiplying an execution time of a partial program corresponding to the second loop by an iteration count in the sequence of the iteration count; and adds up the calculated execution time estimate value of the each second loop;

a branch history information generating section that generates a branch history bit sequence which is a sequence of "True" and "False" on the conditional branch instruction if the program is executed, and stores the generated branch history bit sequence in the storage section but skips a write of a sequence corresponding to the first loop and the second loop in the branch history bit sequence;

an execution trace reproducing section that generates a partial program execution sequence in which an execution order of the partial programs is written, based on the branch history bit sequence; and an execution time estimation calculating section that adds up the execution times of the partial programs, based on the partial program execution sequence.

* * * * *